United States Patent
Burrell

(10) Patent No.: US 12,472,102 B2
(45) Date of Patent: Nov. 18, 2025

(54) PROCESS FOR MAKING ANTIINFLAMMATORY, ANTIBACTERIAL, ANTIFUNGAL AND VIRICIDAL MATERIALS

(71) Applicant: Kheprion, Inc., Novato, CA (US)

(72) Inventor: Robert E. Burrell, Sherwood Park (CA)

(73) Assignee: Kheprion, Inc., San Diego, CA (US)

( * ) Notice: Subject to any disclaimer, the term of this patent is extended or adjusted under 35 U.S.C. 154(b) by 505 days.

(21) Appl. No.: 17/937,747

(22) Filed: Oct. 3, 2022

(65) Prior Publication Data

US 2023/0172759 A1   Jun. 8, 2023

Related U.S. Application Data

(63) Continuation of application No. PCT/IB2021/000245, filed on Apr. 5, 2021.

(60) Provisional application No. 63/006,044, filed on Apr. 6, 2020.

(51) Int. Cl.
    *A61F 13/00* (2024.01)

(52) U.S. Cl.
    CPC ............. *A61F 13/00063* (2013.01); *A61F 2013/00225* (2013.01); *A61F 2013/00234* (2013.01)

(58) Field of Classification Search
    CPC ........................... C23C 30/00; C23C 14/14
    See application file for complete search history.

(56) References Cited

U.S. PATENT DOCUMENTS

| | | | |
|---|---|---|---|
| 5,372,660 A | 12/1994 | Davidson et al. | |
| 5,837,275 A | 11/1998 | Burrell et al. | |
| 2004/0229034 A1 | 11/2004 | Djokic | |

FOREIGN PATENT DOCUMENTS

| | | | | |
|---|---|---|---|---|
| CA | 2134217 A1 | 10/1993 | | |
| CA | 2136454 A1 | 5/1995 | | |
| CA | 2428922 A1 | 11/2004 | | |
| CA | 2572598 A1 | 7/2007 | | |
| CN | 101820766 A | 9/2010 | | |
| CN | 107635591 A | 1/2018 | | |
| JP | H08500392 A | 1/1996 | | |
| JP | H09505112 A | 5/1997 | | |
| JP | 2007229445 A | 9/2007 | | |
| JP | 2010540651 A | 12/2010 | | |
| WO | WO-9513704 A1 | * | 5/1995 | ............. C23C 14/06 |
| WO | WO-2007087269 A2 | 8/2007 | | |
| WO | WO-2021205232 A1 | 10/2021 | | |

OTHER PUBLICATIONS

PCT/IB2021/000245 International Search Report and Written Opinion dated Aug. 9, 2021.
Rezaei et al.: Applications of Plasma-Liquid Systems: A Review. Materials (Basel) 12(17):2751:1-69 doi:10.3390/ma12172751 (2019).
Shuaibov et al.: Optical characteristics of the plasma of a glow discharge in a He/H2O mixture. Plasma Physics Reports 27(10):897-900. doi: 10.1134/1.1409723 (2001).
Wikipedia: Metal matrix composite, pp. 1-10 URL: https://en.wikipedia.org/wiki/Metal_matrix_composite [retrieved online Apr. 6, 2023] (2017).
EP21784162.6 Extended European Search Report dated Jun. 13, 2024.
Rice, Kevin, et al., A review of the antimicrobial potential of precious metal derived nanoparticle constructs. Nanotechnology 30:37200 (18pp) (2019).
Abe, Yoshio. Utilization of Water Vapor for Sputter Deposition of Thin Films. Journal of the Vacuum Society of Japan 53(9):515-520 (2010). DOI: 10.3131/jvsj2.53.515.
Noguchi, Daisuke, et al. Photocatalytic Characteristics of TiO2 Thin Films Prepared by Dc Reactive Magnetron Sputtering with added H2O. Japanese Journal of Applied Physics 42(8):5255-5258 (2003). DOI:10.1143/JJAP.42.5255.

* cited by examiner

*Primary Examiner* — Jessee R Roe
(74) *Attorney, Agent, or Firm* — WILSON SONSINI GOODRICH & ROSATI

(57) ABSTRACT

Provided herein are methods for preparing a metal matrix composite material by a deposition process. The metal matrix composite materials described herein are useful for anti-inflammatory, antibacterial, antifungal and viricidal applications.

28 Claims, 10 Drawing Sheets

PROCESS FOR MAKING ANTIINFLAMMATORY, ANTIBACTERIAL, ANTIFUNGAL AND VIRICIDAL MATERIALS

CROSS-REFERENCE

This application is a continuation of PCT Application No. PCT/IB2021/000245, filed Apr. 5, 2021, which claims the benefit of U.S. Provisional Application No. 63/006,044, filed Apr. 6, 2020, which is incorporated by reference herein in its entirety.

SUMMARY

Described here are various methods for preparing various metal matrix composite materials, the methods comprising depositing one or more of a metal and a metal oxide from a source onto a substrate in a deposition chamber in the presence of water vapor and one or more gases, the one or more gases comprising oxygen gas, wherein the source is separated from the substrate by a distance of at least 5 centimeters, further wherein the method does not include a step of reducing internal pressure of the deposition chamber below about $10^{-4}$ torr prior to and/or during said depositing. In some embodiments, the base pressure during said depositing is at or greater than about $10^{-7}$ Torr. In some embodiments, the method does not include a step of reducing internal pressure of the deposition chamber below about $10^{-7}$ Torr within 24 hours, 12 hours, 6 hours, 3 hours prior to said depositing. In some embodiments, the one or more gases further comprise an inert gas. In some embodiments, the liquid water is injected into a stream of the inert gas, outside of the deposition chamber, entering the deposition chamber as the water vapor. In some embodiments, the oxygen gas comprises molecular oxygen gas. In some embodiments, the molecular oxygen gas comprises molecular oxygen gas in any form. In some embodiments, the molecular oxygen gas is selected from the group consisting of $O_2$, $O_3$, $O_3^+$, $O_2^+$, $O_2^-$, $O_3$, $O$, $O^+$, $O^-$, ionised ozone, metastable excited oxygen, free electrons, $H_2O_2$ and OH. In some embodiments, the liquid water is injected into the stream of the inert gas, upstream of an inert gas mass flow controller. In some embodiments, the inert gas is present between about 80% to about 100%, the oxygen gas is present between about 1% to about 10% and the water vapor is present between about 1% to about 15% of the total molar composition of the one or more gases. In some embodiments, the inert gas is present between about 92% to about 94%, the oxygen gas is present between about 3% to about 5% and the water vapor is present between about 2% to about 3% of the total composition of the one or more gases. In some embodiments, the inert gas is present at about 92.95%, the oxygen gas is present at about 4.25% and the water vapor is at about 2.8% of the total composition of the one or more gases. In some embodiments, the liquid water is injected into the stream of the inert gas, by a syringe pump. In some embodiments, the liquid water is injected into the stream of inert gas, by the syringe pump at a flow rate between about 0.5 microliters per minute and about 11 microliters per minute. In some embodiments, the liquid water is injected into the stream of inert gas, by the syringe pump at a flow rate between about 7 microliters per minute and about 10 microliters per minute. In some embodiments, the liquid water is injected into the stream of inert gas, by the syringe pump at a flow rate of about 9 microliters per minute. In some embodiments, the liquid water is injected into the stream of the inert gas upstream of the inert gas mass flow controller. In some embodiments, the liquid water is injected into the stream of the inert gas downstream of the inert gas mass flow controller. In some embodiments, the liquid water is injected into the stream of the inert gas downstream of the inert gas mass flow controller, when the water is above 1.02 percent composition of the total composition. In some embodiments, steam is injected directly into the deposition chamber. In some embodiments, the inert gas mass flow controller controls the flow rate of the inert gas into the deposition chamber between about 100 SCCM and about 600 SCCM. In some embodiments, the inert gas mass flow controller controls the flow rate of the inert gas into the deposition chamber between about 350 SCCM and about 450 SCCM. In some embodiments, an oxygen gas mass flow controller controls the flow rate of the oxygen gas into the deposition chamber between about 0.1 SCCM and about 100 SCCM. In some embodiments, an oxygen gas mass flow controller controls the flow rate of the oxygen gas into the deposition chamber between about 1 SCCM and about 20 SCCM. In some embodiments, an oxygen gas mass flow controller controls the flow rate of the oxygen gas into the deposition chamber between about 5 SCCM and about 10 SCCM. In some embodiments, an oxygen gas mass flow controller controls the flow rate of the oxygen gas into the deposition chamber at about 8 SCCM. In some embodiments, the liquid water is heated to a temperature between about 20° C. and about 80° C. in a region between the syringe pump and the mass flow controller. In some embodiments, the liquid water is heated to a temperature between about 40° C. and about 60° C. in a region between the syringe pump and the mass flow controller. In some embodiments, the liquid water is heated to a temperature of about 50° C. in a region between the syringe pump and the mass flow controller. In some embodiments, the distance is between about 1 centimeter to about 20 centimeters. In some embodiments, the distance is between about 5 centimeters to about 15 centimeters. In some embodiments, the distance is about 10 centimeters. In some embodiments, the method does not include a step of reducing internal pressure of the deposition chamber below about $10^{-7}$, $10^{-6}$, $10^{-5}$, $10^{-4}$, 10–3, 0.01, 0.1, 1, 10, 100, 760 torr, or atmospheric pressure. In some embodiments, the metal is a noble metal. In some embodiments, the noble metal is silver, gold, platinum, palladium, or a combination thereof. In some embodiments, the method comprises depositing at least two metals on the substrate. In some embodiments, the at least two metals comprise silver and gold. In some embodiments, the at least two metals comprise silver and gold, wherein the silver is present at 65 percent and the gold is present at 35 percent. In some embodiments, the at least two metals comprise silver and gold, wherein the silver is present at 35 percent and the gold is present at 65 percent. In some embodiments, the method further comprises depositing additional metals or metal oxides on the substrate. In some embodiments, the inert gas is Argon. In some embodiments, the internal pressure of the deposition chamber during the depositing is maintained between about 5 millitorr and about 50 millitorr. In some embodiments, the internal pressure of the deposition chamber during the depositing is maintained between about 35 millitorr and about 45 millitorr. In some embodiments, the internal pressure of the deposition chamber during the depositing is maintained at about 40 millitorr. In some embodiments, the substrate is a solid. In some embodiments, the solid comprises metal foil, glass, or silicon. In some embodiments, the substrate exhibits low outgassing. In some embodiments, the substrate is an implant. In some embodiments, the implant is a stent. In some embodiments, the stent is a metal stent. In some embodiments, the substrate comprises a polymer. In some embodiments, the polymer is high-density polyethylene. In some embodiments, the substrates comprises a mesh structure made from high density polyethylene. In some embodiments, a dressing comprises the mesh structure made from high density polyethylene. In some embodiments, the dressing comprises an absorbent layer between two of the mesh structures made from high density polyethylene. In some embodiments, the depositing comprises sputtering. In some embodiments, the sputtering is DC magnetron sputtering. In some embodiments, a sputtering power is about 190 Watts to about 950 Watts. In some embodiments, the sputtering power is about 380 Watts to about 760 Watts. In some embodiments, the sputtering power is about 570 Watts to about 684 Watts. In some embodiments, the sputtering power density is between about 0.7 Watts/cm$^2$ to about 3.3 Watts/cm$^2$. In some embodiments, the sputtering power density is between about 1.3 to about 2.7 Watts/cm$^2$. In some embodiments, the sputtering power density is between about 2.0 to about 2.4 Watts/cm$^2$. In some embodiments, the sputtering power density is about 2.4 Watts/cm$^2$. In some embodiments, the inert gas is present between about 95 to about 96 percent, the oxygen gas is present between about 1 to about 4.5 percent and the water vapor is about 2.8 percent, and wherein the sputtering power density is about 2.4 W/cm$^2$. In some embodiments, the metal matrix composite material is exposed to at least a 200 ppm carbon dioxide environment after the depositing.

Described here are various methods for preparing a metal matrix composite material, the method comprising depositing one or more of a metal and a metal oxide on a substrate in a deposition chamber in the presence of one or more gases, the one or more gases comprising oxygen gas, wherein the method does not include a step of reducing internal pressure of the deposition chamber below about 10$^{-7}$ torr prior to and/or during said depositing.

Described here are various metal matrix composite materials, comprising intergrain atoms of a metal, a metal oxide and crystal grains of the metal, wherein the crystal grains have a median size between about 2 nm and about 15 nm, wherein the intergrain atoms comprise about 50 to about 20 percent per unit surface area of the metal matrix composite material. In some embodiments, the intergrain atoms of a metal, a metal oxide, oxygen, water and crystal grains of the metal, wherein the crystal grains have a median size between about 2 nm and about 15 nm, wherein the intergrain atoms comprise about 50 to about 20 percent per unit surface area of the metal matrix composite material, and wherein the oxygen comprises at least 2 percent by weight of the metal matrix composite material. In some embodiments, the intergrain atoms of a metal, a metal oxide, oxygen, water and crystal grains of the metal, wherein the crystal grains have a median size between about 2 nm and about 15 nm, wherein the intergrain atoms comprise about 50 to about 20 percent per unit surface area of the metal matrix composite material, and wherein the water comprises less than 4 percent by weight of the metal matrix composite material. In some embodiments, the median size of the crystal grains is between about 2 nm and about 15 nm and intergrain atoms of the metal comprise between about 50 percent per unit surface area of the material to about 20 percent per unit surface area of the material. In some embodiments, the median size of the crystal grains is between about 5 nm and about 15 nm and intergrain atoms of the metal comprise between about 40 percent per unit surface area of the material to about 20 percent per unit surface area of the material. In some embodiments, the intergrain atoms of a second metal and crystal grains of the second metal having a median size between about 2 nm and about 15 nm, wherein the intergrain atoms of the second metal comprise about 50 to about 20 percent per unit surface area of the metal matrix composite material. In some embodiments, the metal matrix composite comprises $Ag_2CO_3$.

Described herein are various methods for preparing metal matrix composite materials, comprising depositing one or more of a metal and a metal oxide on a substrate in a deposition chamber in the presence of water vapor and one or more gases, the one or more gases comprising oxygen gas, wherein the depositing of the at least one metal and metal oxide originates from a source, separated from the substrate by a distance of at least 5 centimeters, further wherein the method does not include a step of reducing internal pressure of the deposition chamber below about 10$^{-7}$ torr within 24 hours, 12 hours, 6 hours, 3 hours prior to said depositing.

Described herein are various metal matrix composite materials, comprising intergrain atoms of a metal, a metal oxide, oxygen, water and crystal grains of the metal having a median size between about 2 nm and about 15 nm, wherein the intergrain atoms comprise about 50 to about 20 percent per unit surface area of the metal matrix composite material, wherein the metal matrix composite material is made by a method comprising the steps of depositing one or more of a metal and a metal oxide on a substrate in a deposition chamber in the presence of water vapor and one or more gases, the one or more gases comprising oxygen gas, wherein the depositing of the at least one metal and metal oxide originates from a source, separated from the substrate by a distance of at least 5 centimeters, further wherein the method does not include a step of reducing internal pressure of the deposition chamber below about 10$^{-7}$ torr within 24 hours, 12 hours, 6 hours, 3 hours prior to said depositing. In some embodiments, the internal pressure of the deposition chamber during the depositing is maintained between about 5 millitorr and about 50 millitorr. In some embodiments, the internal pressure of the deposition chamber during the depositing is maintained between about 35 millitorr and about 45 millitorr. In some embodiments, the internal pressure of the deposition chamber during the depositing is maintained at about 40 millitorr. In some embodiments, the oxygen gas comprises molecular oxygen gas. In some embodiments, the molecular oxygen gas comprises molecular oxygen gas in any form. In some embodiments, the molecular oxygen gas is selected from the group consisting of $O_2$, $O_3$, $O_3^+$, $O_2^+$, $O_2^-$, $O_3$, O, $O^+$, $O^-$, ionized ozone, metastable excited oxygen, free electrons, $H_2O_2$ and OH.

INCORPORATION BY REFERENCE

All publications, patents, and patent applications mentioned in this specification are herein incorporated by reference to the same extent as if each individual publication, patent, or patent application was specifically and individually indicated to be incorporated by reference.

BRIEF DESCRIPTION OF THE DRAWINGS

The novel features of the invention are set forth with particularity in the appended claims. A better understanding of the features and advantages of the present invention will be obtained by reference to the following detailed description that sets forth illustrative embodiments, in which the principles of the invention are utilized, and the accompanying drawings of which:

DETAILED DESCRIPTION

I. General Overview

Figure 1:
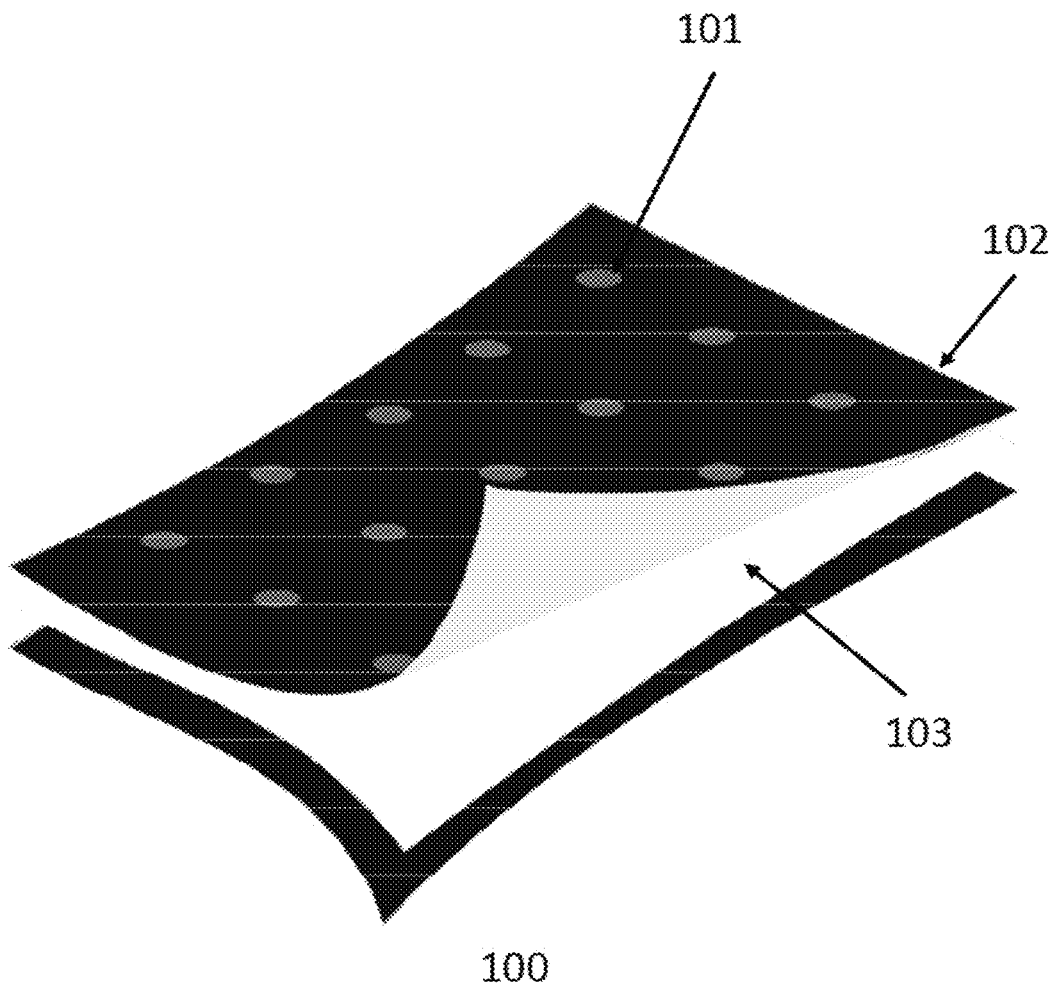
FIG. 1 shows a dressing made from two mesh layers enclosing a absorption layer. The mesh layers are coated with the metal matrix composite. The dressing is adhered together by ultrasonic welds.

Provided herein are methods preparing a metal matrix composite material by a deposition process. The metal matrix composite materials disclosed herein are useful for antiinflammatory, antibacterial, antifungal and viricidal applications. Dressings, solutions and kits for wounds The metal matrix composites described herein can be used applications involving dressings, solutions and kits for the treatment of inflammatory skin conditions including burns, chronic wounds, surgical scars, psoriasis eczema and atopic dermatitis). Dressings, coatings, solutions and kits, including the preparation of solutions, are useful for site specific applications including bladder conditions (e.g. urinary tract infections, ureteral biofilms and interstitial cystitis), lungs (e.g. acute respiratory distress syndrome, viral and bacterial pneumonia), ophthalmology (e.g. viral conjunctivitis, chronic eye infections and eye surgery), general surgery (e.g orthopedic surgery, surgical adhesions, laparoscopy and robotic surgery), verruca, heart, traumatic injury, transplants and infected implants.".

Disclosed herein are various methods involving a physical vapor deposition process that uses a complex working gas mixture. In some embodiments, a working gas composition includes Argon (80-99.9%), oxygen (0-20%) and water vapor. In some embodiments, the water vapor is controlled by the water temperature, from 0-100 C, in the argon flow line which controls the vapor pressure of the water and allows more or less to be entrained in the working as is required. A water temperature from 50-90 C is typically used. Alternatively, a lower water temperature can be used with a sparger to introduce small bubbles to entrain more water into the working gas flow.

In certain aspects, disclosed herein are methods utilizing a deposition process. In some embodiments, the deposition process is a sputtering process, involving a unique structure and composition of metal-based plasma, forming a unique nanostructured metal matrix. In some embodiments, the metal matrix composite can be composed of silver, silver oxide and silver hydroxide. In various aspects, the oxides and hydroxides, that are formed during the deposition process, limit the adatom diffusion of incoming silver atoms effectively trapping these atoms in positions of higher energy as nanostructures. In some embodiments, this has the added benefit of creating a large number of intergrain atoms. Typically, these atoms are found in all materials but as the crystal of grain size drops below 20 nm they become significant in numbers as the number of grain boundaries increases. In some aspects, intergrain atoms can approach 40-50% of the matrix composition when the grain size approaches 5 nm. The amount of intergrain atoms affect the chemical and physical properties of the material which dramatically alters the biological properties.

Described herein are methods for preparing metal matrix composite materials that do not require pumping down the system to low pressures (high vacuum) to remove water. In some embodiments, water is included in the deposition process. In addition to changing the biological properties of the material the various methods described herein are significantly less expensive to run than other physical vapor deposition processes. In these other physical vapor deposition process, not involving the methods described herein, deposition chambers are evacuated to pressures of $10^{-7}$ Torr before the processes are started to remove water from the system as it will "poison" targets such as Al and Ta by forming oxides on the surface. In this instance Ag—O bonds are weaker than Ag—Ag bonds and so they are sputtered off the surface as they are formed so the target is never poisoned. The inclusion of water in some embodiments of the various methods described herein thus allow less evacuation of the deposition chamber (higher base pressures) before sputtering is initiated since water does not have to be removed. In some embodiments, less evacuation of the deposition chamber prior to depositing allows for more economical processes.

II. Definitions

As used in this specification and the appended claims, the singular forms "a", "an", and "the" include plural references unless the context clearly dictates otherwise. Thus, for example, references to [["the method" includes one or more methods, and/or steps of the type described herein which will become apparent to those persons skilled in the art upon reading this disclosure and so forth.

"About" as used herein w % ben referring to a measurable value such as an amount, a temporal duration, and the like, is meant to encompass variations of ±20% or ±10%, or ±5%, or even ±1% from the specified value, as such variations are appropriate for the disclosed compositions or to perform the disclosed methods In certain aspects, disclosed herein is a method for.

A metal matrix composite (MMC) is composite material with at least two constituent parts, one being a metal necessarily, the other material may be a different metal or another material, such as a ceramic or organic compound. When at least three materials are present, it is called a hybrid composite. (https://en.wikipedia.org/wiki/Metal_matrix_composite).

Plasmas are quasi-neutral ionized gases. Hence, they consist of positive and negative ions, electrons, free radicals, photons, metastables as well as excited and neutral atoms and molecules. (Fatemeh Rezaei,1,* Patrick Vanraes,2 Anton Nikiforov,1 Rino Morent,1 and Nathalie De Geyter1. Applications of Plasma-Liquid Systems: A Review. Materials (Basel). 2019 September; 12(17): 2751. Pub. online 2019 Aug. 27. doi: 10.3390/ma12172751, PMCID: PMC674778, PMID: 31461960 https://www.ncbi.nlm.nih.gov/pmc/articles/PMC6747786/).

Oxygen species created in the plasma (O2+, O2−, O3, O, O+, O−, ionized ozone, metastable excited oxygen, and free electrons (https://allwin21.com/plasma-cleaning/).

Water is known to undergo decomposition to primarily hydrogen atoms and hydroxyl radicals, and the hydroxyl radicals can further form hydrogen and oxygen atoms. (Shuaibov, A K & Shimon, L. & Dashchenko, A I & Shevera, Igor. (2001). Optical characteristics of the plasma of a glow discharge in a He/H2O mixture. Plasma Physics Reports. 27. 897-900. 10.1134/1.1409723.)

"SCCM" refers to standard cubic centimeters per minute.

"CFU" refers to colony forming units.

AAS" refers to atomic absorption spectroscopy.

Unless defined otherwise, all technical and scientific terms used herein have the same meaning as is commonly understood by one of skill in the art to which this invention belongs.

III. Process

Described herein are various methods for preparing a metal matrix composite material, the method comprising depositing one or more of a metal and a metal oxide from a source onto a substrate in a deposition chamber in the presence of water vapor and one or more gases, the one or more gases comprising oxygen gas, wherein the source is separated from the substrate by a distance of at least 5 centimeters, further wherein the method does not include a step of reducing internal pressure of the deposition chamber below about $10^{-7}$ torr during said depositing. In some embodiments the method does not include a step of reducing internal pressure of the deposition chamber below about $10^{-7}$ torr prior to said depositing. In some embodiments, the method does not include a step of reducing internal pressure of the deposition chamber below about $10^{-7}$ torr within 24 hours, 12 hours, 6 hours, 3 hours prior to said depositing.

Described herein are various methods for preparing a metal matrix composite material, wherein liquid water is injected into a stream of inert gas, outside of the deposition chamber, entering the deposition chamber as water vapor. In some embodiments, the liquid water is injected into the stream of the inert gas, upstream of an inert gas mass flow controller. In some embodiments, the liquid water is injected into the stream of the inert gas, by a syringe pump. In some embodiments, wherein the liquid water is injected into the stream of inert gas, by the syringe pump at a flow rate between about 0.5 microliters per minute and about 11 microliters per minute. In some embodiments, the liquid water is injected into the stream of inert gas, by the syringe pump at a flow rate between about 7 microliters per minute and about 10 microliters per minute. In some embodiments, the liquid water is injected into the stream of inert gas, by the syringe pump at a flow rate of about 9 microliters per minute.

Described herein are various methods for preparing a metal matrix composite material, wherein the liquid water is heated to a temperature between about 20° C. and about 90° C. in a region between the syringe pump and the mass flow controller. In some embodiments, the liquid water is heated to a temperature between about 40° C. and about 60° C. in a region between the syringe pump and the mass flow controller. In some embodiments, the liquid water is heated to a temperature of about 50° C. in a region between the syringe pump and the mass flow controller.

Described herein are various methods for preparing a metal matrix composite material, wherein one or more gases is present in the deposition chamber. In some embodiments, the one or more gases is an inert gas. In some embodiments, the inert gas is argon. In some embodiments, an inert gas mass flow controller controls the flow rate of the inert gas into the deposition chamber between about 100 SCCM and about 600 SCCM. In some embodiments, the inert gas mass flow controller controls the flow rate of the inert gas into the deposition chamber between about 350 SCCM and about 450 SCCM. In some embodiments, an oxygen gas mass flow controller controls the flow rate of the oxygen gas into the deposition chamber between about 0.1 SCCM and about 100 SCCM. In some embodiments, an oxygen gas mass flow controller controls the flow rate of the oxygen gas into the deposition chamber between about 1 SCCM and about 20 SCCM. In some embodiments, an oxygen gas mass flow controller controls the flow rate of the oxygen gas into the deposition chamber between about 5 SCCM and about 10 SCCM. In some embodiments, an oxygen gas mass flow controller controls the flow rate of the oxygen gas into the deposition chamber at about 8 SCCM.

Described herein are various methods for preparing a metal matrix composite material, wherein one or more gases is present in the deposition chamber. In some embodiments, the one or more gases is an inert gas. In some embodiments, the inert gas is argon. In some embodiments, an inert gas mass flow controller controls the flow rate of the inert gas into the deposition chamber between about 100 SCCM and about 600 SCCM, where the active area of target is between about 100 $cm^2$ and 1000 $cm^2$. In some embodiments, the inert gas mass flow controller controls the flow rate of the inert gas into the deposition chamber between about 350 SCCM and about 450 SCCM, where the active area of target is between about 100 $cm^2$ and 1000 $cm^2$. In some embodiments, an oxygen gas mass flow controller controls the flow rate of the oxygen gas into the deposition chamber between about 0.1 SCCM and about 100 SCCM, where the active area of target is between about 100 $cm^2$ and 1000 $cm^2$. In some embodiments, an oxygen gas mass flow controller controls the flow rate of the oxygen gas into the deposition chamber between about 1 SCCM and about 20 SCCM, where the active area of target is between about 100 $cm^2$ and 1000 $cm^2$. In some embodiments, an oxygen gas mass flow controller controls the flow rate of the oxygen gas into the deposition chamber between about 5 SCCM and about 10 SCCM, where the active area of target is between about 100 $cm^2$ and 1000 $cm^2$. In some embodiments, an oxygen gas mass flow controller controls the flow rate of the oxygen gas into the deposition chamber at about 8 SCCM, where the active area of target is between about 100 $cm^2$ and 1000 $cm^2$.

Described herein are various methods for preparing a metal matrix composite material, wherein one or more gases is present in the deposition chamber. In some embodiments, the one or more gases is an inert gas. In some embodiments, the inert gas is argon. In some embodiments, an inert gas mass flow controller controls the flow rate of the inert gas into the deposition chamber between about 100 SCCM and about 600 SCCM, where the active area of target is between about 250 cm$^2$ to about 300 cm$^2$. In some embodiments, the inert gas mass flow controller controls the flow rate of the inert gas into the deposition chamber between about 350 SCCM and about 450 SCCM, where the active area of target is between about 250 cm$^2$ to about 300 cm$^2$. In some embodiments, an oxygen gas mass flow controller controls the flow rate of the oxygen gas into the deposition chamber between about 0.1 SCCM and about 100 SCCM, where the active area of target is between about 250 cm$^2$ to about 300 cm$^2$. In some embodiments, an oxygen gas mass flow controller controls the flow rate of the oxygen gas into the deposition chamber between about 1 SCCM and about 20 SCCM, where the active area of target is between about 250 cm$^2$ to about 300 cm$^2$. In some embodiments, an oxygen gas mass flow controller controls the flow rate of the oxygen gas into the deposition chamber between about 5 SCCM and about 10 SCCM, where the active area of target is between about 250 cm$^2$ to about 300 cm$^2$. In some embodiments, an oxygen gas mass flow controller controls the flow rate of the oxygen gas into the deposition chamber at about 8 SCCM, where the active area of target is between about 250 cm$^2$ to about 300 cm$^2$.

Described herein are various methods for preparing a metal matrix composite material, wherein one or more gases is present in the deposition chamber. In some embodiments, the one or more gases is an inert gas. In some embodiments, the inert gas is argon. In some embodiments, an inert gas mass flow controller controls the flow rate of the inert gas into the deposition chamber between about 100 SCCM and about 600 SCCM, where the active area of target is about 284 cm$^2$. In some embodiments, the inert gas mass flow controller controls the flow rate of the inert gas into the deposition chamber between about 350 SCCM and about 450 SCCM, where the active area of target is about 284 cm$^2$. In some embodiments, an oxygen gas mass flow controller controls the flow rate of the oxygen gas into the deposition chamber between about 0.1 SCCM and about 100 SCCM, where the active area of target is about 284 cm$^2$. In some embodiments, an oxygen gas mass flow controller controls the flow rate of the oxygen gas into the deposition chamber between about 1 SCCM and about 20 SCCM, where the active area of target is about 284 cm$^2$. In some embodiments, an oxygen gas mass flow controller controls the flow rate of the oxygen gas into the deposition chamber between about 5 SCCM and about 10 SCCM, where the active area of target is about 284 cm$^2$. In some embodiments, an oxygen gas mass flow controller controls the flow rate of the oxygen gas into the deposition chamber at about 8 SCCM, where the active area of target is about 284 cm$^2$.

Described herein are various methods for preparing a metal matrix composite material, wherein a source and the substrate are separated by a distance. In some embodiments, the source is a target comprising a metal. In some embodiments, the distance is between about 1 centimeter to about 20 centimeters. In some embodiments, the distance is between about 5 centimeters to about 15 centimeters. In some embodiments, distance is about 10 centimeters.

Described herein are methods for preparing a metal matrix composite material, wherein the methods do not include a step of reducing internal pressure of the deposition chamber below about $1\times10^{-7}$, $1\times10^{-6}$, $1\times10^{-5}$, $1\times10^{-4}$, $1\times10^{-3}$, 0.01, 0.1, 1, 10, 100, 760 torr, or atmospheric pressure.

In some embodiments, the method does not include a step of reducing internal pressure of the deposition chamber below about $1\times10^{-8}$ torr within 24 hours, 12 hours, 6 hours, 3 hours prior to said depositing. In some embodiments, the method does not include a step of reducing internal pressure of the deposition chamber below about $1\times10^{-7}$ torr within 24 hours, 12 hours, 6 hours, 3 hours prior to said depositing. In some embodiments, the method does not include a step of reducing internal pressure of the deposition chamber below about $1\times10^{-6}$ torr within 24 hours, 12 hours, 6 hours, 3 hours prior to said depositing. In some embodiments, the method does not include a step of reducing internal pressure of the deposition chamber below about $1\times10^{-5}$ torr within 24 hours, 12 hours, 6 hours, 3 hours prior to said depositing. In some embodiments, the method does not include a step of reducing internal pressure of the deposition chamber below about $1\times10^{-5}$ torr within 24 hours, 12 hours, 6 hours, 3 hours prior to said depositing. In some embodiments, the method does not include a step of reducing internal pressure of the deposition chamber below about $1\times10^{-4}$ torr within 24 hours, 12 hours, 6 hours, 3 hours prior to said depositing. In some embodiments, the method does not include a step of reducing internal pressure of the deposition chamber below about $1\times10^{-3}$ torr within 24 hours, 12 hours, 6 hours, 3 hours prior to said depositing. In some embodiments, the method does not include a step of reducing internal pressure of the deposition chamber below about $1\times10^{-2}$ torr within 24 hours, 12 hours, 6 hours, 3 hours prior to said depositing. In some embodiments, the method does not include a step of reducing internal pressure of the deposition chamber below about 0.1 torr within 24 hours, 12 hours, 6 hours, 3 hours prior to said depositing. In some embodiments, the method does not include a step of reducing internal pressure of the deposition chamber below about 1 torr within 24 hours, 12 hours, 6 hours, 3 hours prior to said depositing. In some embodiments, the method does not include a step of reducing internal pressure of the deposition chamber below about 10 torr within 24 hours, 12 hours, 6 hours, 3 hours prior to said depositing. In some embodiments, the method does not include a step of reducing internal pressure of the deposition chamber below about 100 torr within 24 hours, 12 hours, 6 hours, 3 hours prior to said depositing. In some embodiments, the method does not include a step of reducing internal pressure of the deposition chamber below about 760 torr within 24 hours, 12 hours, 6 hours, 3 hours prior to said depositing. In some embodiments, the method does not include a step of reducing internal pressure of the deposition chamber below atmospheric pressure within 24 hours, 12 hours, 6 hours, 3 hours prior to said depositing Described herein are methods for depositing metals. In some embodiments, the metal is a noble metal. In some embodiments, the noble metal is silver, gold, platinum, palladium, or a combination thereof. In some embodiments, the method comprises depositing at least two metals on the substrate. In some embodiments, the at least two metals comprise silver and gold. In some embodiments, the at least two metals comprise silver and gold, wherein the silver is present at 65 percent and the gold is present at 35 percent. In some embodiments, the at least two metals comprise silver and gold, wherein the silver is present at 35 percent and the gold is present at 65 percent.

In some embodiments, the method further comprises depositing additional metals or metal oxides on the substrate.

Described herein are various methods for preparing a metal matrix material, wherein one or more gases are introduced into a deposition chamber. In some embodiments, the one or more gases comprise an inert gas. In some embodiments, the inert gas is Argon. In some embodiments, internal pressure of the deposition chamber during the depositing is maintained between about 5 millitorr and about 50 millitorr. In some embodiments, the internal pressure of the deposition chamber during the depositing is maintained between about 35 millitorr and about 45 millitorr. In some embodiments, the internal pressure of the deposition chamber during the depositing is maintained at about 40 millitorr. In some embodiments, the internal pressure of the deposition chamber is about 1 millitorr to about 100 millitorr. In some embodiments, the internal pressure of the deposition chamber is about 1 millitorr to about 10 millitorr, about 1 millitorr to about 20 millitorr, about 1 millitorr to about 30 millitorr, about 1 millitorr to about 40 millitorr, about 1 millitorr to about 50 millitorr, about 1 millitorr to about 100 millitorr, about 10 millitorr to about 20 millitorr, about 10 millitorr to about 30 millitorr, about 10 millitorr to about 40 millitorr, about 10 millitorr to about 50 millitorr, about 10 millitorr to about 100 millitorr, about 20 millitorr to about 30 millitorr, about 20 millitorr to about 40 millitorr, about 20 millitorr to about 50 millitorr, about 20 millitorr to about 100 millitorr, about 30 millitorr to about 40 millitorr, about 30 millitorr to about 50 millitorr, about 30 millitorr to about 100 millitorr, about 40 millitorr to about 50 millitorr, about 40 millitorr to about 100 millitorr, or about 50 millitorr to about 100 millitorr. In some embodiments, the internal pressure of the deposition chamber is about 1 millitorr, about 10 millitorr, about 20 millitorr, about 30 millitorr, about 40 millitorr, about 50 millitorr, or about 100 millitorr. In some embodiments, the internal pressure of the deposition chamber is at least about 1 millitorr, about 10 millitorr, about 20 millitorr, about 30 millitorr, about 40 millitorr, or about 50 millitorr. In some embodiments, the internal pressure of the deposition chamber is at most about 10 millitorr, about 20 millitorr, about 30 millitorr, about 40 millitorr, about 50 millitorr, or about 100 millitorr.

Described herein are various methods for preparing a metal matrix composite material, deposited onto a substrate. In some embodiments, the substrate is a solid. In some embodiments, the solid comprises metal foil, glass, or silicon. In some embodiments, the substrate exhibits low outgassing. In some embodiments, the substrate is an implant. In some embodiments, the implant is a stent. In some embodiments, the stent is a metal stent. In some embodiments, the substrate comprises a polymer. In some embodiments, the polymer is high-density polyethylene. In some embodiments, the substrates comprise a mesh structure made from high density polyethylene. In some embodiments, a dressing comprises the mesh structure made from high density polyethylene. In some embodiments, the dressing comprises an absorbent layer between two of the mesh structures made from high density polyethylene. In some embodiments, the substrate is moving in a linear fashion inside the deposition chamber. In some embodiments, the substrate is moving in a rotational fashion inside the deposition chamber.

Described herein are methods for preparing a metal matrix composite wherein the method comprises a step of depositing a metal. In some embodiments, the depositing comprises sputtering. In some embodiments, the sputtering is DC magnetron sputtering. In some embodiments, sputtering power is about 190 Watts to about 950 Watts (0.5 to 2.5 Amps at 380 Volts). In some embodiments, the sputtering power is about 380 Watts to about 760 Watts (1 Amps to 2 Amps at 380 V). In some embodiments, the sputtering power is about 571 Watts (1.5 Amps at 380 Volts). In some embodiments, sputter power is about 10 watts to about 1,000 watts. In some embodiments, sputter power is about 10 watts to about 100 watts, about 10 watts to about 200 watts, about 10 watts to about 500 watts, about 10 watts to about 1,000 watts, about 100 watts to about 200 watts, about 100 watts to about 500 watts, about 100 watts to about 1,000 watts, about 200 watts to about 500 watts, about 200 watts to about 1,000 watts, or about 500 watts to about 1,000 watts. In some embodiments, sputter power is about 10 watts, about 100 watts, about 200 watts, about 500 watts, or about 1.000 watts. In some embodiments, sputter power is at least about 10 watts, about 100 watts, about 200 watts, or about 500 watts. In some embodiments, sputter power is at most about 100 watts, about 200 watts, about 500 watts, or about 1,000 watts.

Described herein are methods for preparing a metal matrix composite wherein the method comprises a step of depositing a metal. In some embodiments, the depositing comprises sputtering. In some embodiments, the sputtering is DC magnetron sputtering. $cm^2$In some embodiments, sputtering power density is about In some embodiments, the power density is about 0.1 $W/cm^2$ to about 3 $W/cm^2$. In some embodiments, the power density is about 0.1 $W/cm^2$ to about 0.9 $W/cm^2$, about 0.1 $W/cm^2$ to about 1.5 $W/cm^2$, about 0.1 $W/cm^2$ to about 1.8 $W/cm^2$, about 0.1 $W/cm^2$ to about 2 $W/cm^2$, about 0.1 $W/cm^2$ to about 2.5 $W/cm^2$, about 0.1 $W/cm^2$ to about 3 $W/cm^2$, about 0.9 $W/cm^2$ to about 1.5 $W/cm^2$, about 0.9 $W/cm^2$ to about 1.8 $W/cm^2$, about 0.9 $W/cm^2$ to about 2 $W/cm^2$, about 0.9 $W/cm^2$ to about 2.5 $W/cm^2$, about 0.9 $W/cm^2$ to about 3 $W/cm^2$, about 1.5 $W/cm^2$ to about 1.8 $W/cm^2$, about 1.5 $W/cm^2$ to about 2 $W/cm^2$, about 1.5 $W/cm^2$ to about 2.5 $W/cm^2$, about 1.5 $W/cm^2$ to about 3 $W/cm^2$, about 1.8 $W/cm^2$ to about 2 $W/cm^2$, about 1.8 $W/cm^2$ to about 2.5 $W/cm^2$, about 1.8 $W/cm^2$ to about 3 $W/cm^2$, about 2 $W/cm^2$ to about 2.5 $W/cm^2$, about 2 $W/cm^2$ to about 3 $W/cm^2$, or about 2.5 $W/cm^2$ to about 3 $W/cm^2$. In some embodiments, the power density is about 0.1 $W/cm^2$, about 0.9 $W/cm^2$, about 1.5 $W/cm^2$, about 1.8 $W/cm^2$, about 2 $W/cm^2$, about 2.5 $W/cm^2$, or about 3 $W/cm^2$. In some embodiments, the power density is at least about 0.1 $W/cm^2$, about 0.9 $W/cm^2$, about 1.5 $W/cm^2$, about 1.8 $W/cm^2$, about 2 $W/cm^2$, or about 2.5 $W/cm^2$. In some embodiments, the power density is at most about 0.9 $W/cm^2$, about 1.5 $W/cm^2$, about 1.8 $W/cm^2$, about 2 $W/cm^2$, about 2.5 $W/cm^2$, or about 3 $W/cm^2$.

Described herein are methods for preparing a metal matrix composite material, the method comprising depositing one or more of a metal and a metal oxide on a substrate in a deposition chamber in the presence of one or more gases, the one or more gases comprising oxygen gas, wherein the method does not include a step of reducing internal pressure of the deposition chamber below about $10^{-7}$ millitorr.

Described herein are methods for preparing a metal matrix composite material, the method comprising depositing one or more of a metal and a metal oxide on a substrate in a deposition chamber, the method comprising pressurization of the deposition chamber with a combination of one or more inert gases and oxygen gas, wherein the depositing of the at least one metal and metal oxide originates from a source, separated from the substrate by a distance of at least 5 centimeters.

Described herein are methods for preparing a metal matrix composite material, the method comprising depositing one or more of a metal and a metal oxide on a substrate in a deposition chamber, wherein a complex working gas mixture comprises an inert gas, oxygen gas and water vapor.

In some embodiments, the duration of the depositing is about 0.01 hours to about 100 hours. In some embodiments, the duration of the depositing is about 0.01 hours to about 0.1 hours, about 0.01 hours to about 1 hour, about 0.01 hours to about 50 hours, about 0.01 hours to about 100 hours, about 0.1 hours to about 1 hour, about 0.1 hours to about 50 hours, about 0.1 hours to about 100 hours, about 1 hour to about 50 hours, about 1 hour to about 100 hours, or about 50 hours to about 100 hours. In some embodiments, the duration of the depositing is about 0.01 hours, about 0.1 hours, about 1 hour, about 50 hours, or about 100 hours. In some embodiments, the duration of the depositing is at least about 0.01 hours, about 0.1 hours, about 1 hour, or about 50 hours. In some embodiments, the duration of the depositing is at most about 0.1 hours, about 1 hour, about 50 hours, or about 100 hours.

In some embodiments, the depositing is greater than 100 hours. In some embodiments, is 50 hours long in a machine with 20 cathodes, where the substrate, in a roll to roll process, is moving at a linear rate of 20.8 meters per hour.

In some embodiments, the use of water with oxygen and an inert gas to deposit nanocrystalline noble metals on a substrate. In some embodiments, the method utilizes a synergistic relationship between water and oxygen in the presence of an inert gas.

In some embodiments, the presence of water and oxygen allows for the deposition of the metal matrix composite materials as described herein at much higher power than is possible if only oxygen is used. In such embodiments, higher power results in higher speeds of reaction. In such embodiments, argon is present at 95.75% and oxygen 4.25% are used at 2.4 Watts/cm$^2$.

In some embodiments, a low base pressure prior to sputtering is obtained. In such an embodiment, the process is initiated by introducing oxygen in the working gas prior to striking the plasma.

Described herein are methods for preparing a metal matrix composite material. In some embodiments, the metal matrix composite material is exposed to a carbon dioxide environment after the depositing step of the methods as described herein. In some embodiments, carbon dioxide is present in the carbon dioxide environment at about 100 ppm to about 1,000,000 ppm. In some embodiments, carbon dioxide is present in the carbon dioxide environment at about 100 ppm to about 200 ppm, about 100 ppm to about 400 ppm, about 100 ppm to about 1,000 ppm, about 100 ppm to about 1,000,000 ppm, about 200 ppm to about 400 ppm, about 200 ppm to about 1,000 ppm, about 200 ppm to about 1,000,000 ppm, about 400 ppm to about 1,000 ppm, about 400 ppm to about 1,000,000 ppm, or about 1,000 ppm to about 1,000.000 ppm. In some embodiments, carbon dioxide is present in the carbon dioxide environment at about 100 ppm, about 200 ppm, about 400 ppm, about 1,000 ppm, or about 1,000,000 ppm. In some embodiments, carbon dioxide is present in the carbon dioxide environment at least about 100 ppm, about 200 ppm, about 400 ppm, or about 1,000 ppm. In some embodiments, carbon dioxide is present in the carbon dioxide environment at most about 200 ppm, about 400 ppm, about 1,000 ppm, or about 1,000,000 ppm. In some embodiments, the carbon dioxide environment is pure carbon dioxide.

A. Assay for Antimicrobial Effects

Described herein are various methods for assaying the antimicrobial effects of the metal matrix composite material.

In some embodiments, the antimicrobial effect of the coating was tested using a log reduction test. In some embodiment, a bacterial inoculum was generated in calf serum at 37° C. by inoculating 50 mL of calf serum with a 16-hour old culture of *P. aeruginosa* and incubated for 16 h. In some embodiments, the method produced a $1.05 \times 10^9$ CFU inoculum. In some embodiments, dressings were prepared from two silver coated pieces of HDPE (2.5×2.5 cm) with a piece (2.5×2.5 cm) of cotton gauze in between. In some embodiments, dressings were placed on a sterile piece of plastic (3.2×3.2 cm) in the inverted lid of a Petri dish in a Class 2 Laminar Flow hood. In some embodiments, 200 uL of inoculum were applied to the dressings in a Petri dish which were then covered with a second piece of plastic (3.2×3.2 cm) and incubated for one hour at 37° C. In some embodiments, dressings, including the plastic base and cover pieces, with the bacteria were then placed in 1.8 mL of sodium thioglycolate saline (STS) to inactivate the silver, then further diluted using peptone water, and plated on Mueller-Hinton agar. In some embodiments, plates are checked after 24 h of incubation and the total bacterial colonies forming units were calculated. In some embodiments, the following equation was used:

$$1/(ID \times SD \times FD) \times 50 \times CFU = CFU/mL \qquad \text{Equation 1}$$

Where ID is the initial dilution, SD are subsequent dilutions, FD is the final dilution, 50 converts to mL and CFU is the colony forming units counted at the dilution used for the calculation.

In some embodiments, the CFU/mL was then converted to a log number. The log reduction was calculated by subtracting the log of the recovered CFU from the log of the inoculum. A log reduction greater than 3 is considered bactericidal.

B. Determining Total Amount of Silver in Dressing

Described herein are various methods to determine the total amount of silver in the dressing. In some embodiments, a 1 square inch of dressing was dissolved in 20 mL of a 50% solution of nitric acid in distilled water for 20 minutes, then diluted in an additional 20 mL of distilled water and analyzed using Atomic Absorption Spectrophotometer (AAS).

C. Determining the Amount of Ammonium Hydroxide Soluble Silver in Dressing

Described herein are various methods to determine the amount of ammonium hydroxide soluble silver. In some embodiments, an estimate of the amount of silver oxide in the dressing was made by dissolving the metal matrix composite material. In some embodiments, 1 square inch of dressing was immersed in 20 mL of 14.5 molar ammonium hydroxide, for 10 minutes. In some embodiments, 10 mL of this solution was diluted in 40 mL of water and analyzed using atomic absorption spectroscopy (AAS).

Figure 2A:
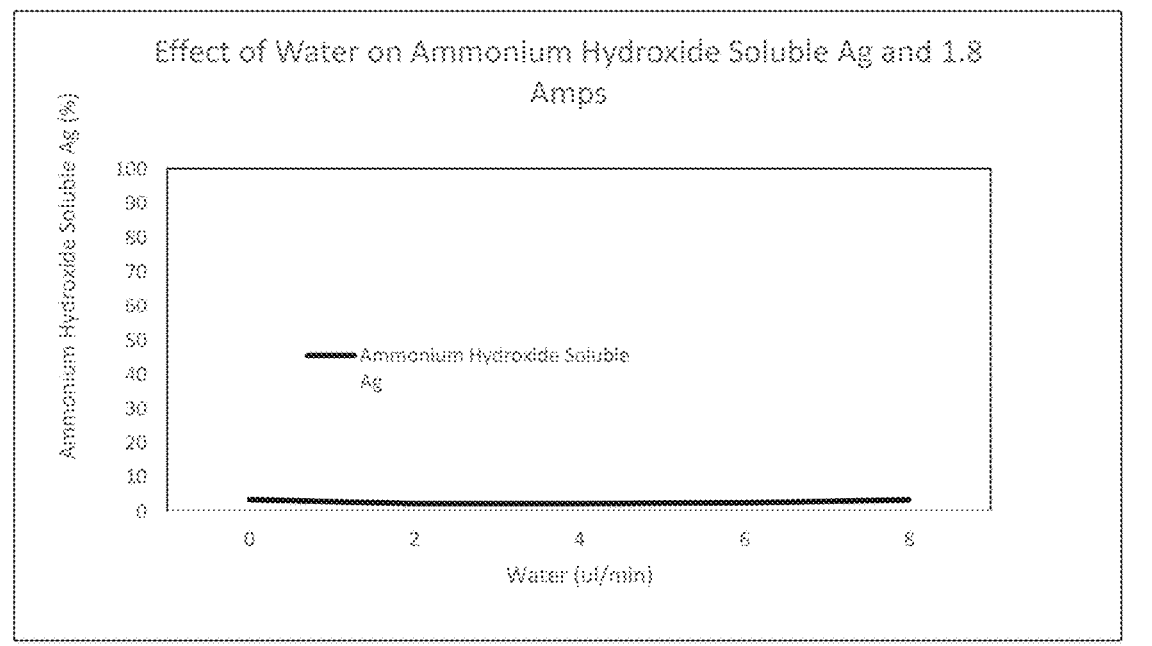
FIG. 2A shows the effect of water added to an argon working gas on ammonium hydroxide soluble silver and 684 Watts (1.8 Amps at 380 Volts) of sputter power.
Figure 2B:
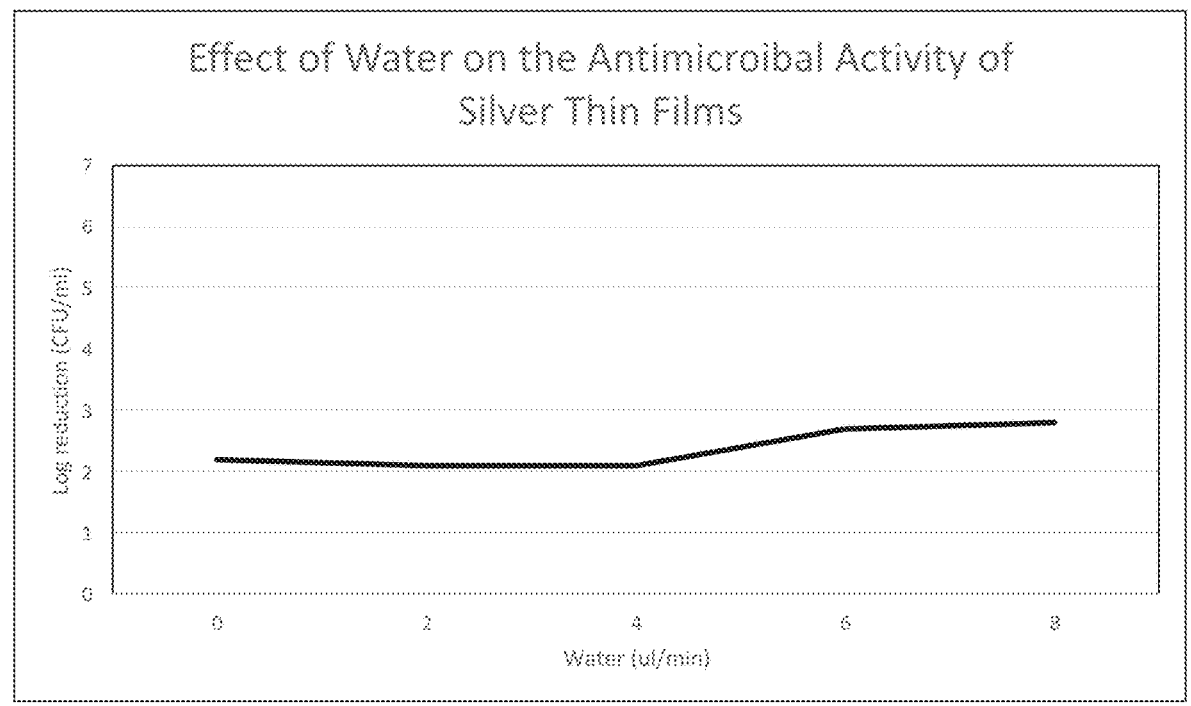
FIG. 2B shows the performance of an antimicrobial assay.

Generally, the methods of the disclosure comprise preparing a metal matrix composite. Typically, the metal matrix composite is characterized by dissolving it in ammonium hydroxide and analyzing the dissolved material using AAS. FIG. 2A shows the effect of water on ammonium hydroxide soluble silver and 684 Watts (1.8 Amps at 380 Volts). The y-axis plots the percentage of ammonium hydroxide soluble silver as characterized by AAS. The x-axis plots the flow rate of liquid water used in the method, forming water vapor upon or prior to entry into the deposition chamber. FIG. 2B shows the effect of water on the antimicrobial activity of the metal matrix composite, when in some cases, 684 Watts is used, and liquid water is introduced various flow rates in microliters per minute. The y-axis plots the log reduction of CFU per milliliter. The x-axis plots the flow rate of liquid water used in the method, forming water vapor upon, or prior to, entry into the deposition chamber.

Figure 3A:
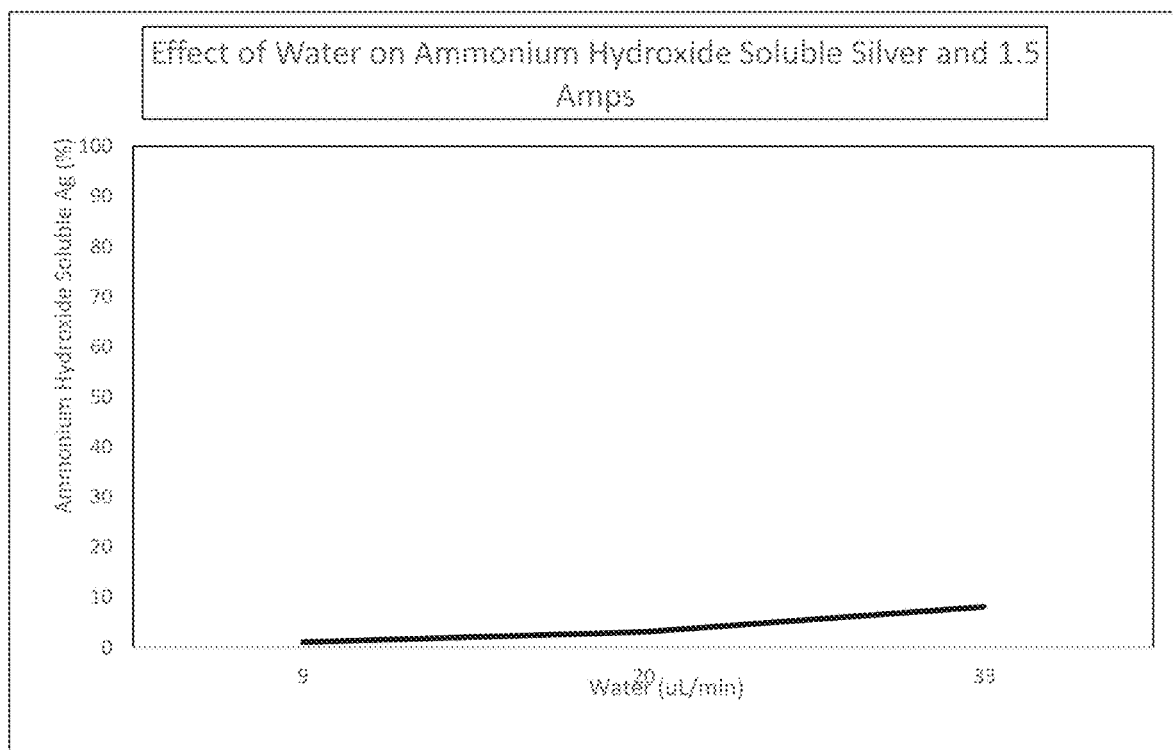
FIG. 3A shows the effect of water added to an argon working gas on ammonium hydroxide soluble silver and 571 Watts (1.5 Amps at 380 Volts) of sputter power.
Figure 3B:
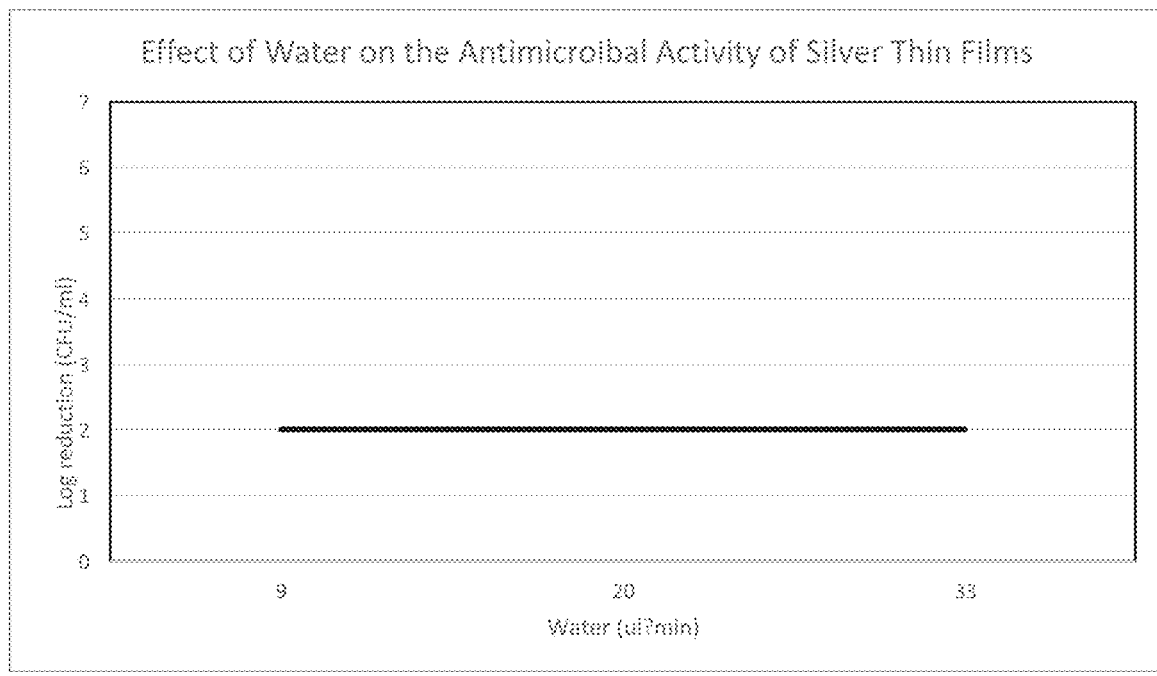
FIG. 3B shows the effect of water added to an argon working gas on the antimicrobial activity of silver thin films.

In various instances, described herein the methods of the disclosure comprise preparing a metal matrix composite. Typically, the metal matrix composite is characterized by dissolving it in ammonium hydroxide and analyzing the dissolved material using AAS. FIG. 3A shows the effect of water on ammonium hydroxide soluble silver and 571 Watts (1.5 Amps at 380 Volts). The y-axis plots the percentage of ammonium hydroxide soluble silver as characterized by AAS. The x-axis plots the flow rate of liquid water used in the method, forming water vapor upon or prior to entry into the deposition chamber. FIG. 3B shows the effect of water on the antimicrobial activity of the metal matrix composite, when in some cases, a sputter power of 685 Watts (1.8 Amps at 380 Volts) is used and liquid water is introduced at and liquid water is introduced at various flow rates in microliters per minute. The y-axis plots the log reduction of CFU per/mL. The x-axis plots the flow rate of liquid water used in the method, forming water vapor upon, or prior to, entry into the deposition chamber.

Figure 4:
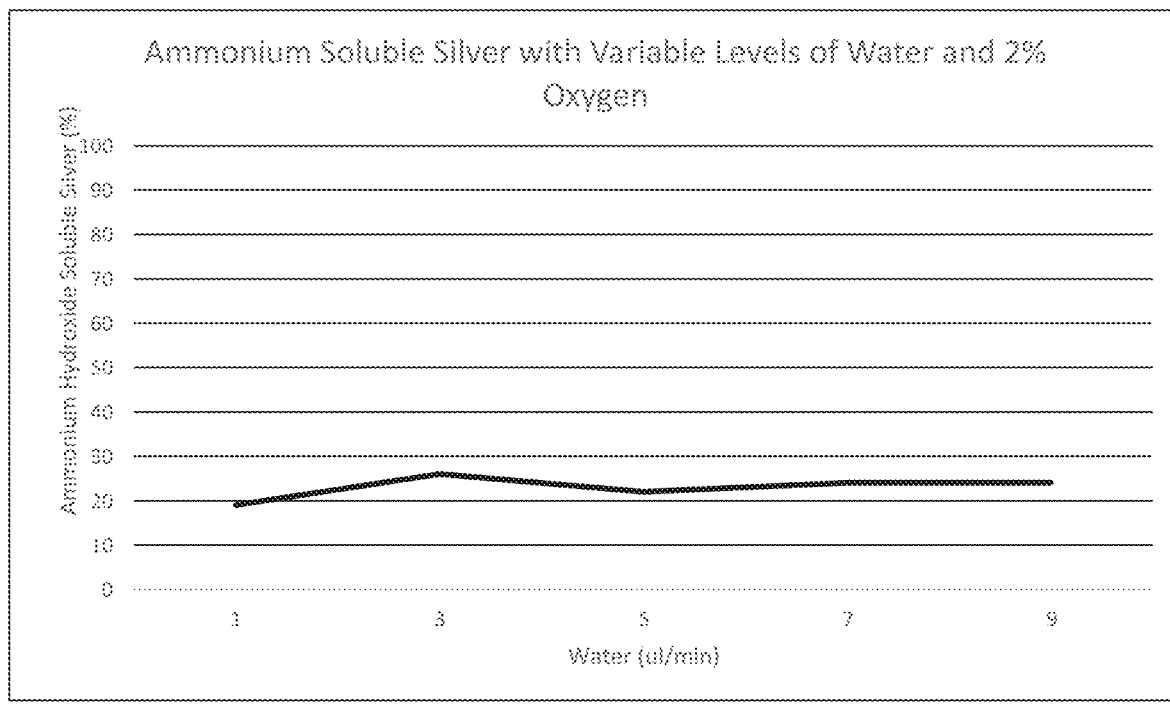
FIG. 4 shows the effect on the amount of ammonium soluble silver produced by variable levels of water added to an argon working gas and 2% oxygen.

In various instances, described herein the methods of the disclosure comprise preparing a metal matrix composite. Typically, the metal matrix composite is characterized by dissolving it in ammonium hydroxide analyzing the dissolved material using AAS. FIG. 4 shows the effect on the amount of ammonium soluble silver produced by variable levels of liquid water and a constant 2% oxygen used per run. The y-axis plots the percentage of ammonium hydroxide soluble silver as characterized by AAS. The x-axis plots the flow rate of liquid water used in the method, forming water vapor upon or prior to entry into the deposition chamber.

Figure 5A:
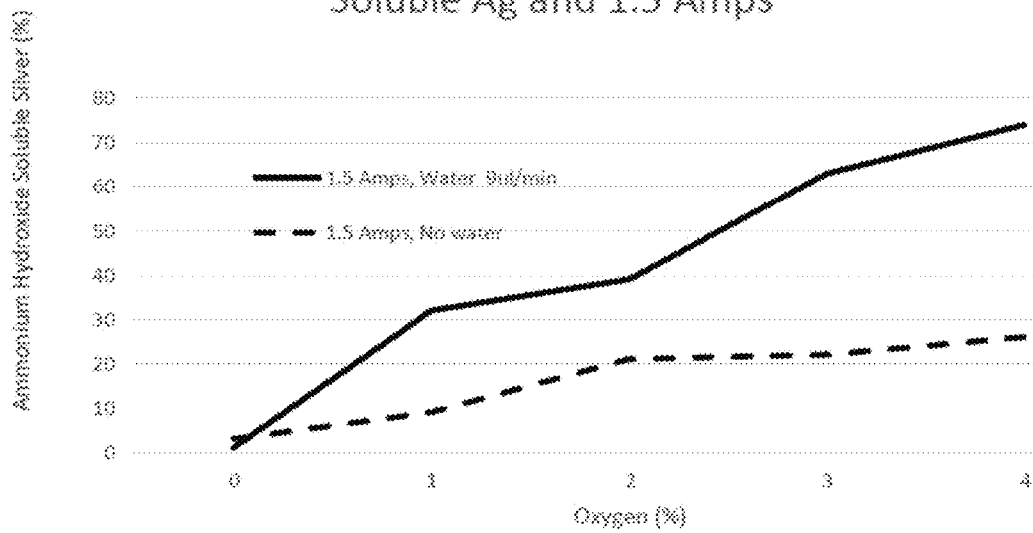
FIG. 5A shows the effect of water and oxygen added to an argon working gas on ammonium hydroxide soluble Ag and 571 Watts (1.5 Amps at 380 Volts) of sputter power.
Figure 5B:
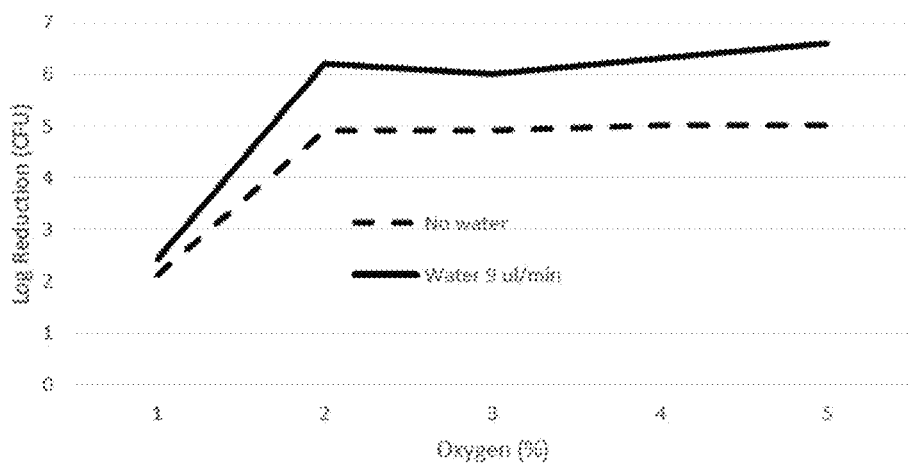
FIG. 5B shows the performance of an antimicrobial assay.

Described herein are various methods for preparing a metal matrix composite. In some embodiments, the metal matrix composite is characterized for the amount of ammonium hydroxide soluble silver. FIG. 5A shows the effect of H$_2$O and O$_2$ on ammonium hydroxide soluble Ag and 571 Watts (1.5 Amps at 380 Volts). The y-axis plots the percentage of ammonium hydroxide soluble silver as characterized by AAS. The x-axis plots various percentages of oxygen streamed into the deposition chamber. The solid trace plots data taken from metal matrix composites formed, in some embodiments of the method using 571 Watts of sputter power and a liquid water flow rate of 9 microliters per minute. The dashed trace plots data taken from metal matrix composites formed, in some embodiments, of the method using 571 Watts of sputter power and no liquid water. FIG. 5B shows log reduction of *P. aeruginosa* vs oxygen concentration with and without water. The y-axis plots the log reduction of CFU per milliliter. The x-axis plots various percentages of oxygen streamed into the deposition chamber. The dashed trace plots data taken from metal matrix composites formed, in some embodiments of the method, using 571 Watts of sputter power and no liquid water. The solid trace plots data taken from metal matrix composites formed, in some embodiments of the method using 571 Watts of sputter power and a liquid water flow rate of 9 microliters per minute.

Figure 6A:
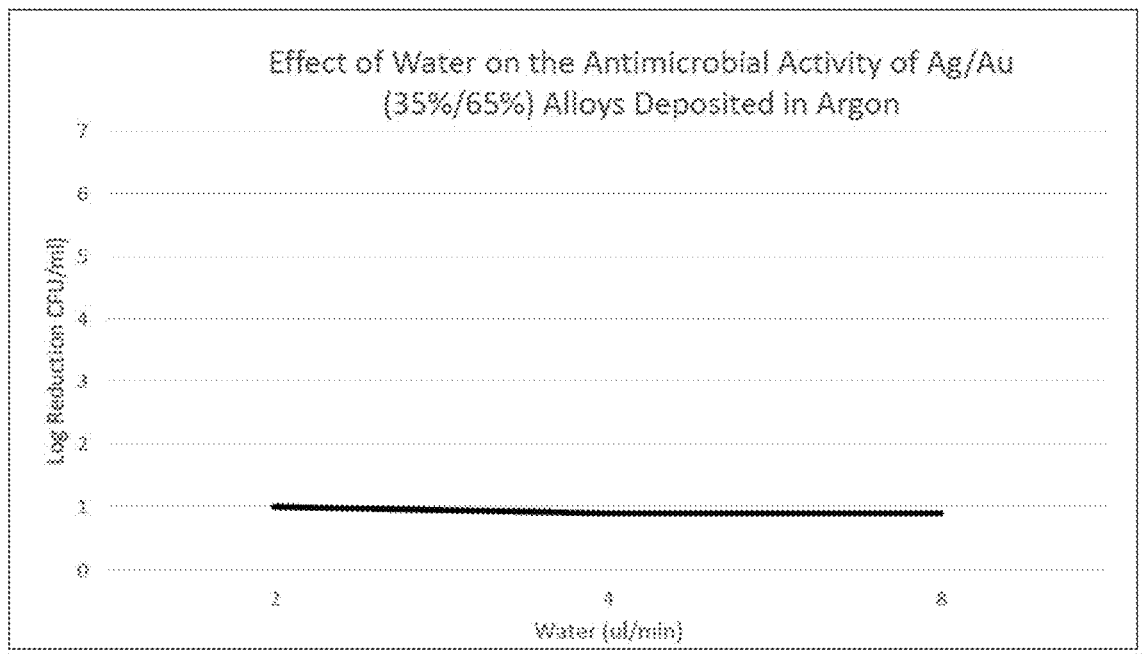
FIG. 6A shows the effect of water added to an argon working gas on the antimicrobial activity of a metal matrix composite composed of an alloy of 35% silver and 65% gold deposited in Argon with no oxygen present at various flow rates of liquid water.
Figure 6B:
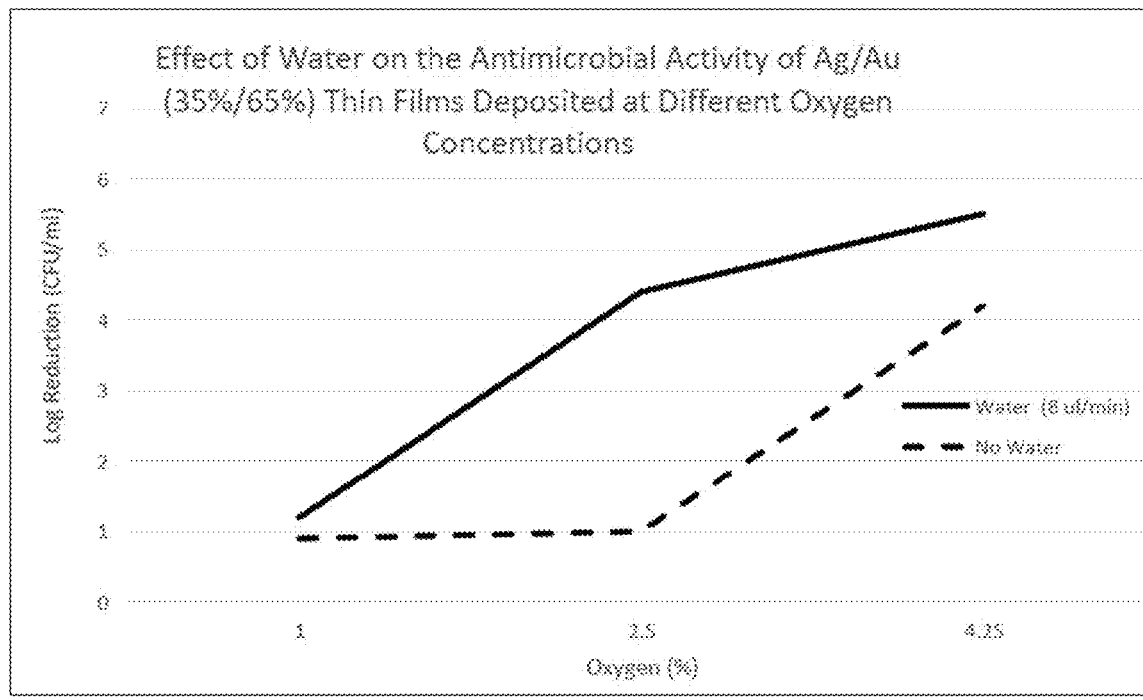
FIG. 6B shows the effect of water added to an argon working gas on the antimicrobial activity of a metal matrix composite composed of an alloy of 35% silver and 65% gold deposited in various levels of oxygen with and without water.

FIG. 6A shows the effect of water on the antimicrobial activity of Ag/Au (35%/65%) alloys deposited in Argon. The y-axis plots the log reduction of CFU per milliliter. The x-axis plots the amount of liquid water used at various flow rates in microliters per minute. FIG. 6B effect of water on the antimicrobial activity of a metal matrix composite composed of 35% silver and 65% gold thin films deposited at different oxygen concentrations. The y-axis plots the log reduction of CFU per milliliter. The x-axis plots the percentage of oxygen present in the deposition chamber. The solid trace represents the assay performance of metal matrix composites comprising 35% silver and 65% gold with a liquid water flow rate of 8 microliters per minute. The dashed trace represents the assay performance of metal matrix composites comprising 35% silver and 65% gold with no water used.

IV. Materials

Described herein are various compositions of metal matrix composite materials. In some embodiments, a metal matrix composite material comprises intergrain atoms of a metal, where crystal grains of the metal have a median size between about 2 nm and about 15 nm, wherein the intergrain atoms comprise about 50 to about 20 percent per unit surface area of the metal matrix composite material. In some embodiments, the median size of the crystal grains is between about 2 nm and about 15 nm and intergrain atoms of the metal comprise between about 50 percent per unit surface area of the material to about 20 percent per unit surface area of the material. In some embodiments, the median size of the crystal grains is between about 5 nm and about 15 nm and intergrain atoms of the metal comprise between about 40 percent per unit surface area of the material to about 20 percent per unit surface area of the material.

In some embodiments, the intergrain atoms of a second metal and crystal grains of the second metal have a median size between about 2 nm and about 15 nm, wherein the intergrain atoms of the second metal comprise about 50 to about 20 percent per unit surface area of the metal matrix composite material.

In some embodiments, the metal is silver or gold. In some embodiments, the metal is a silver and gold alloy. In some embodiments, a film of the metal matrix composite material contains metals, reaction products, unreacted oxygen and water. In some embodiments, the reaction products are oxides of the metal. In some embodiments, the metal is a noble metal.

In some embodiments, the metal matrix composite material comprises less than 20% oxygen. In some embodiments, the metal matrix composite comprises greater than 1% oxygen. In some embodiments, the metal matrix composite material comprises less than 6% oxygen. In some embodiments, the metal matrix composite comprises greater than 2% oxygen In some embodiments, a silver composite material comprises less than 6% oxygen. In some embodiments, the silver matrix composite material contains 6% oxygen, with 4% oxygen contained in silver oxide and the remaining oxygen from water and molecular oxygen. In some embodiments, the silver matrix composite material contains 60% of a material that is soluble in ammonia, where between about 38% to about 40% of the silver is contained in silver metal and between about 52 to 56% of the silver is contained in silver oxide. In such an embodiment, the silver matrix composite material comprises between about 4 to 6% oxygen in the form of silver oxide, water and molecular oxygen. In some embodiments, the metal matrix composite material contains at least 2% oxygen from silver oxide, water and molecular oxygen.

Described herein are various methods for preparing metal matrix composite materials. In some embodiments, the metal matrix composite materials are used dressings for applications at least involving wound care. In some embodiments, a dressing comprises the mesh structure made from high density polyethylene. In some embodiments, the dressing comprises an absorbent layer between two of the mesh structures made from high density polyethylene. In some embodiments, the substrate comprises a polymer. In some embodiments, the polymer is high-density polyethylene. In some embodiments, the substrates comprise a mesh structure made from high density polyethylene. FIG. 1 shows a dressing made from two mesh layers enclosing a cotton absorption layer. The mesh layers are coated with the metal matrix composite. The dressing is adhered together by ultrasonic welds.

Described herein are various methods for preparing metal matrix composite materials. In some embodiments, the metal matrix composite is removed from the substrate. In some embodiments, the metal matrix composite is removed from by at least partial dissolution in a solution. In some embodiments, the metal matrix composite is removed from by at least partial dissolution in an aqueous solution. In some embodiments, the aqueous solution exhibits a pH of about 3-10. In some embodiments the aqueous solution exhibits a pH range of about 4-9. In some embodiments the aqueous solution exhibits a pH range of about 6-8. In some embodiments, the aqueous solution exhibits a pH of about 7. In some embodiments the aqueous solution is administered to a patient by a delivery device for pulmonary applications. In some embodiments the delivery device is a nebulizer. In some embodiments, the aqueous solution is used in a bronchial alveolar lavage (BAL).

Figure 7A:
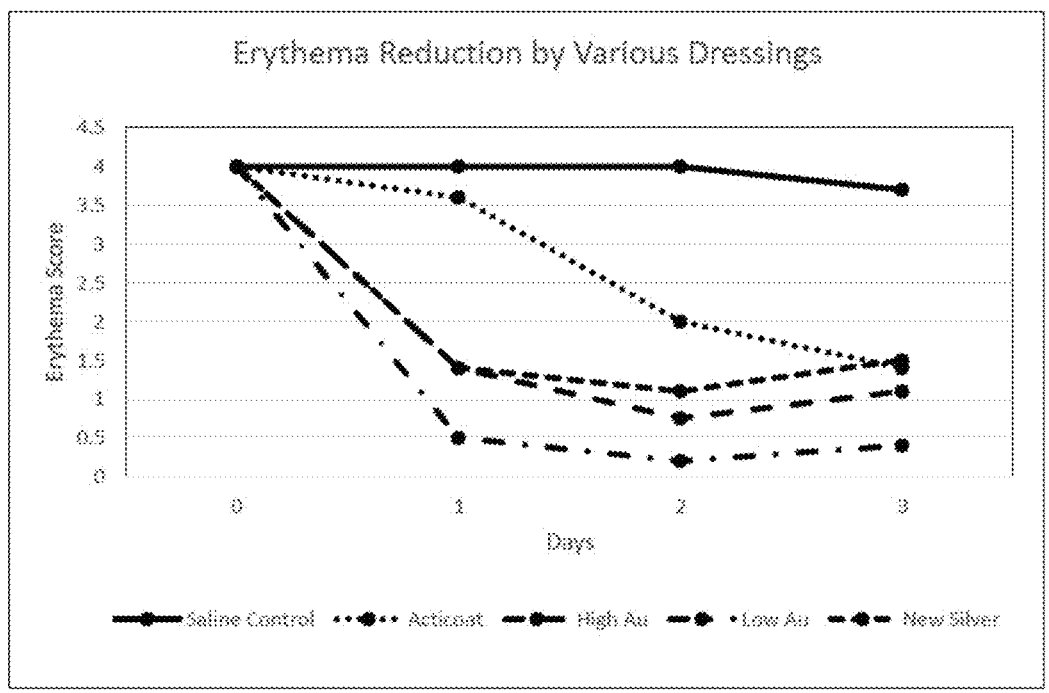
FIGS. 7A-7B show results for materials using the water-based sputtering process described herein. All such materials were observed to reduce erythema much more quickly than the Acticoat dressing did as shown in FIG. 7A. A similar result was noted with edema as shown in FIG. 7B.
Figure 7B:
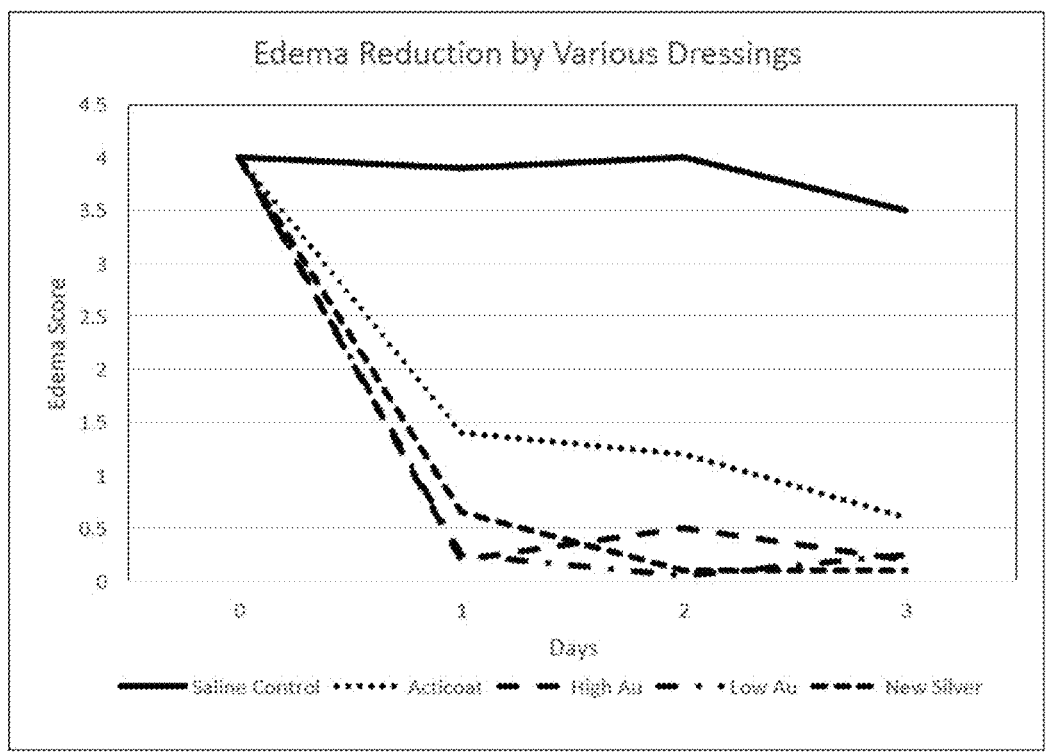

Described herein are various methods for preparing metal matrix composite materials for treatment of erythema and edema. In some embodiments, dressings comprising metal matrix composite materials prepared by the various methods and compositions described herein are used to treat Erythema or Edema. Results for such treatments are summarized in FIGS. 7A-B. Various metal matrix composite materials comprising various amounts of gold, silver, or combinations thereof, produced using the methods described herein were found to reduce erythema much more quickly than the Acticoat dressing did as shown in FIG. 7A. The y-axis of FIG. 7A plots an Erythema score and the x-axis plots time in days. The Erythema score range is from 1 to 4, where a larger number signifies a greater severity of condition. The first treatment used a saline control and is represented as a bold line series. The second treatment used Acticoat and is represented as the small-dash dashed line. The third treatment used a metal matrix composite material made by the methods described herein, contains a larger percentage of gold than silver and is represented by a large-dash dashed line. The fourth treatment used a metal matrix composite material made by the methods described herein, contains a smaller percentage of gold than silver and is represented by a large-dash-spot dashed line series. The fifth treatment used a metal matrix composite material, containing silver, oxygen, argon, water or a combination thereof, made by the methods described herein and is represented by a medium-dash dashed line series. FIG. 7B plots results for application of various dressings, containing various embodiments of metal matrix composite prepared by methods as described herein, for treatment of Edema. The results are presented in the same manner as described for FIG. 7A.

Figure 8A:
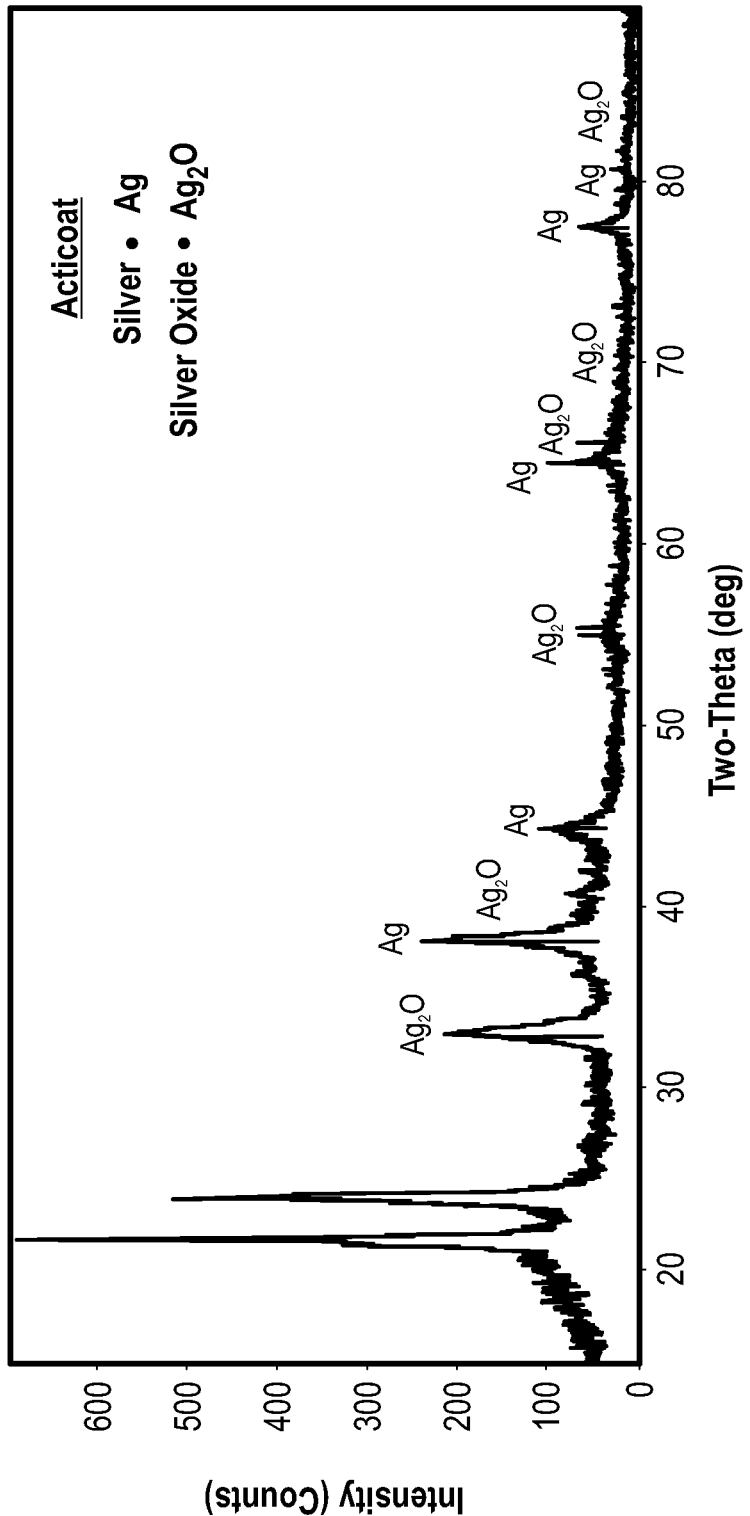
FIGS. 8A-8C show X-ray diffraction spectra for commercially available nanocrystalline material FIG. 8A and for metal matrix composite material synthesized by the methods described herein FIGS. 8B-C.
Figure 8B:
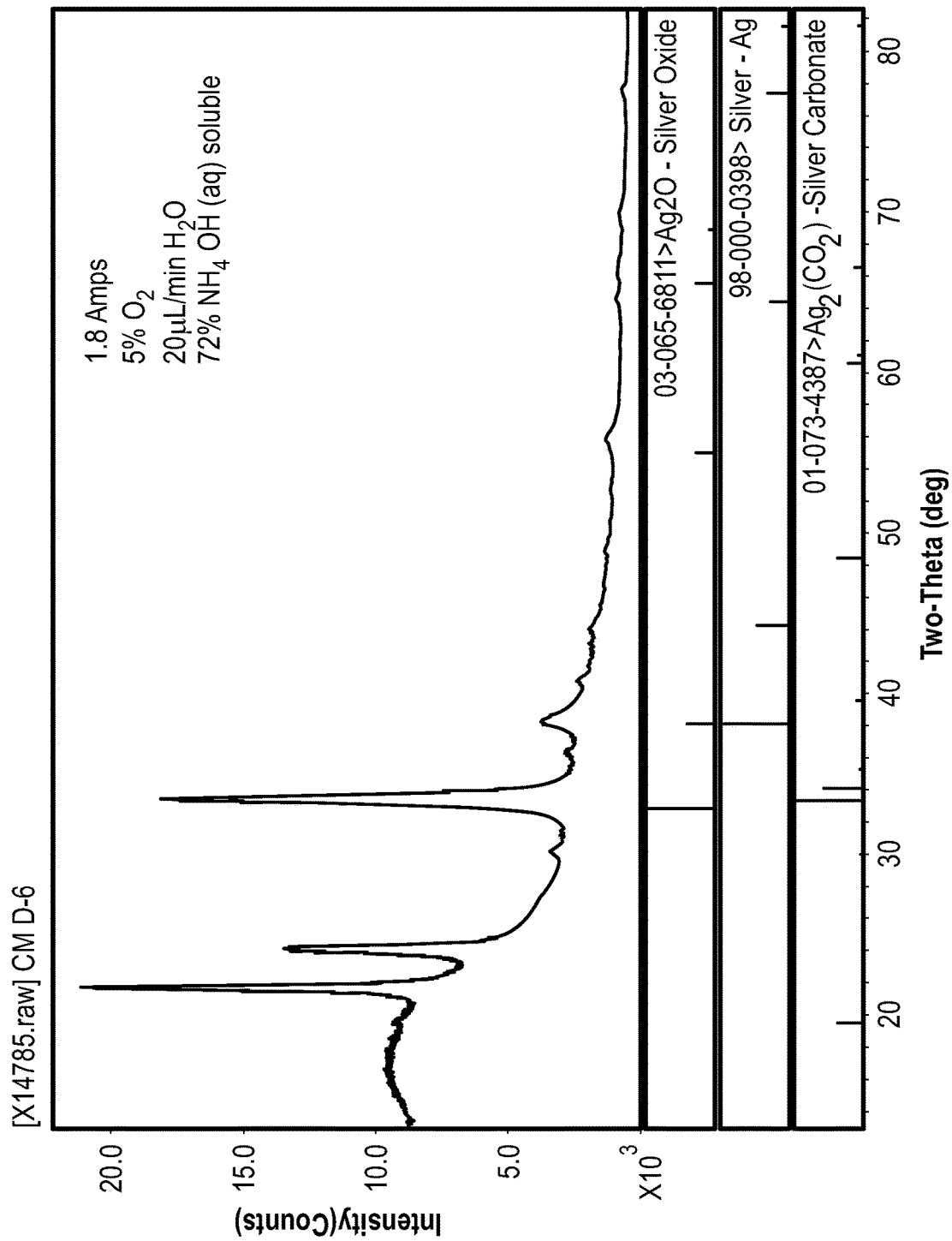
Figure 8C:
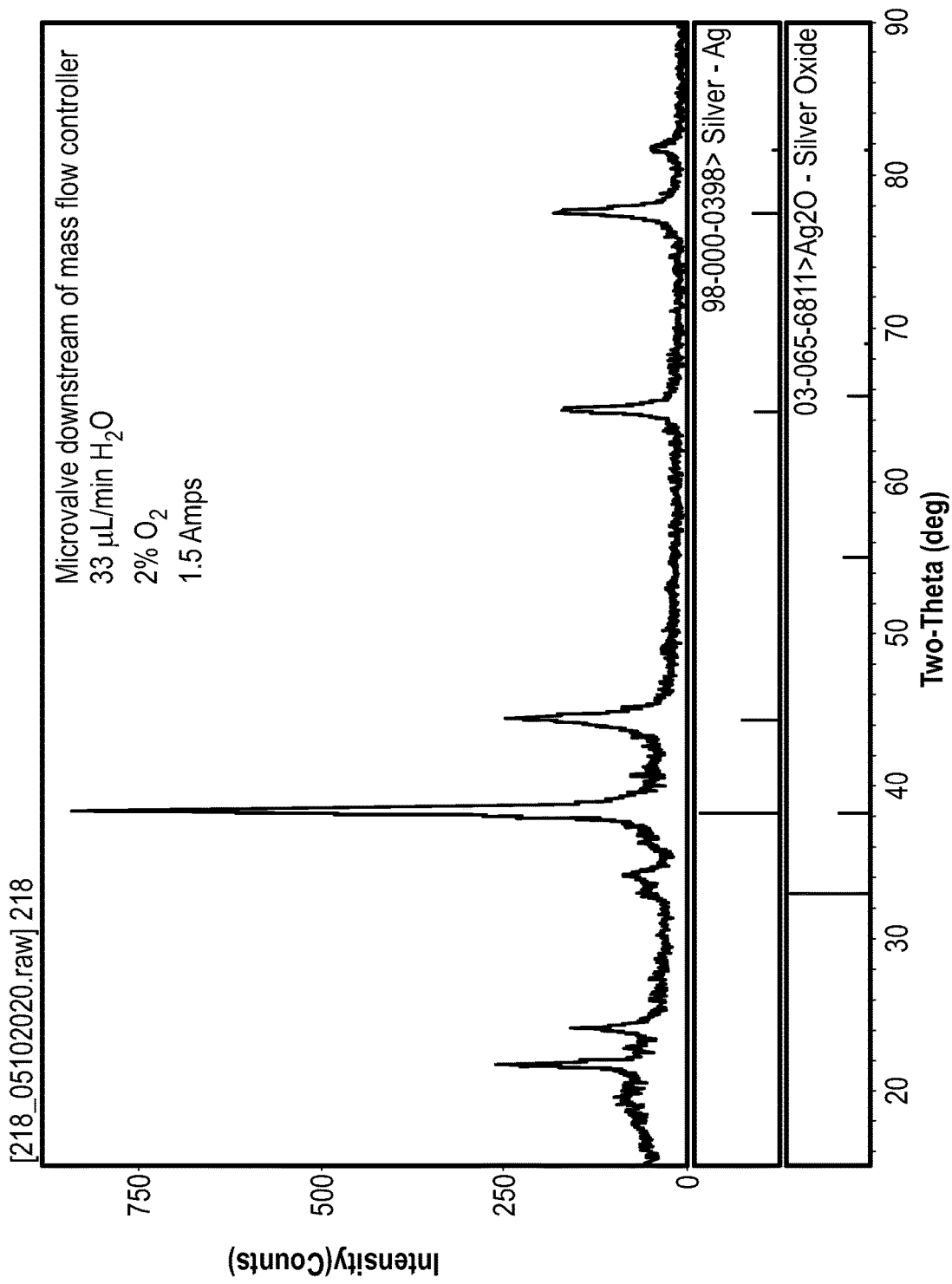

In some embodiments, x-ray diffraction is used to characterize the material. FIGS. 8A-C show X-ray diffraction spectra for commercially available nanocrystalline material FIG. 8A and for metal matrix composite material synthesized by the methods described herein FIGS. 8B-C.

NUMBERED EMBODIMENTS

The following embodiments recite non-limiting permutations of combinations of features disclosed herein. Other permutations of combinations of features are also contemplated. In particular, each of these numbered embodiments is contemplated as depending from or relating to every previous or subsequent numbered embodiment, independent of their order as listed. 1. A method for preparing a metal matrix composite material, the method comprising depositing one or more of a metal and a metal oxide from a source onto a substrate in a deposition chamber in the presence of water vapor and one or more gases, the one or more gases comprising oxygen gas, wherein the source is separated from the substrate by a distance of at least 5 centimeters, further wherein the method does not include a step of reducing internal pressure of the deposition chamber below about 10-7 torr prior to and/or during said depositing. 2. The method of embodiment 1, further wherein the base pressure during said depositing is at or greater than about 10-7 Torr. 3. The method of embodiment 1 or 2, further wherein the method does not include a step of reducing internal pressure of the deposition chamber below about 10-7 Torr within 24 hours, 12 hours, 6 hours, 3 hours prior to said depositing. 4. The method of any one of embodiments 1-3, wherein the one or more gases further comprise an inert gas. 5. The method of any one of embodiments 1-4, wherein liquid water is injected into a stream of the inert gas, outside of the deposition chamber, entering the deposition chamber as the water vapor. 6. The method of any one of embodiments 1-5, wherein the oxygen gas comprises molecular oxygen gas. 7. The method of any one of embodiments 1-6, wherein the molecular oxygen gas comprises molecular oxygen gas in any form. 8. The method of any one of embodiments 1-6, wherein the molecular oxygen gas is selected from the group consisting of O2, O3, O3+, O2+, O2-, O3, O, O+, O-, ionised ozone, metastable excited oxygen, free electrons, H2O2 and OH. 9. The method of any one of embodiments 1-8, wherein the liquid water is injected into the stream of the inert gas, upstream of an inert gas mass flow controller. 10. The method of any one of embodiments 1-9, wherein the inert gas is present between about 90 to about 99 percent, the oxygen gas is present between about 1 to about 10 percent and the water vapor is present between about 0.01 percent to about 5 percent of the total molar composition of the one or more gases. 11. The method of any one of embodiments 1-10, wherein the inert gas is present between about 94 to about 96 percent, the oxygen gas is present between about 1 to about 5 percent and the water vapor is present between about 0.01 percent to about 2 percent of the total composition of the one or more gases. 12. The method of any one of embodiments 1-11, wherein the inert gas is present between about 95 to about 96 percent, the oxygen gas is present between about 1 to about 4.5 percent and the water vapor is present between about 0.03 percent to about 1.02 percent of the one or more gases. 13. The method of any one of embodiments 1-12, wherein the liquid water is injected into the stream of the inert gas, by a syringe pump. 14. The method of any one of embodiments 1-13, wherein the liquid water is injected into the stream of inert gas, by the syringe pump at a flow rate between about 0.5 microliters per minute and about 11 microliters per minute. 15. The method of any one of embodiments 1-14, wherein the liquid water is injected into the stream of inert gas, by the syringe pump at a flow rate between about 7 microliters per minute and about 10 microliters per minute. 16. The method of any one of embodiments 1-15, wherein the liquid water is injected into the stream of inert gas, by the syringe pump at a flow rate of about 9 microliters per minute. 17. The method of any one of embodiments 1-16, wherein liquid water is injected into the stream of the inert gas upstream of the inert gas mass flow controller. 18. The method of any one of the embodiments 1-17, wherein the liquid water is injected into the stream of the inert gas downstream of the inert gas mass flow controller. 19. The method of any one of embodiments 1-18, wherein the liquid water is injected into the stream of the inert gas downstream of the inert gas mass flow controller, when the water is above 1.02 percent composition of the total composition. 20. The method of any one of embodiments 1-19, wherein steam is injected directly into the deposition chamber. 21. The method of any one of embodiments 1-20, wherein the inert gas mass flow controller controls the flow rate of the inert gas into the deposition chamber between about 100 SCCM and about 600 SCCM. 22. The method of any one of embodiments 1-21, wherein the inert gas mass flow controller controls the flow rate of the inert gas into the deposition chamber between about 350 SCCM and about 450 SCCM. 23. The method of any one of embodiments 1-22, wherein an oxygen gas mass flow controller controls the flow rate of the oxygen gas into the deposition chamber between about 0.1 SCCM and about 100 SCCM. 24. The method of any one of embodiments 1-23, wherein an oxygen gas mass flow controller controls the flow rate of the oxygen gas into the deposition chamber between about 1 SCCM and about 20 SCCM. 25. The method of any one of embodiments 1-24, wherein an oxygen gas mass flow controller controls the flow rate of the oxygen gas into the deposition chamber between about 5 SCCM and about 10 SCCM. 26. The method of any one of embodiments 1-25, wherein an oxygen gas mass flow controller controls the flow rate of the oxygen gas into the deposition chamber at about 8 SCCM. 27. The method of any one of embodiments 1-26, wherein the liquid water is heated to a temperature between about 20° C. and about 80° C. in a region between the syringe pump and the mass flow controller. 28. The method of any one of embodiments 1-27, wherein the liquid water is heated to a temperature between about 40° C. and about 60° C. in a region between the syringe pump and the mass flow controller. 29. The method of any one of embodiments 1-28, wherein the liquid water is heated to a temperature of about 50° C. in a region between the syringe pump and the mass flow controller. 30. The method of any one of embodiments 1-29, wherein the distance is between about 1 centimeter to about 20 centimeters. 31. The method of any one of embodiments 1-30, wherein the distance is between about 5 centimeters to about 15 centimeters. 32. The method of any one of embodiments 1-31, wherein the distance is about 10 centimeters. 33. The method of any one of embodiments 1-32, wherein the method does not include a step of reducing internal pressure of the deposition chamber below about 10-7, 10-6, 10-5, 10-4, 10-3, 0.01, 0.1, 1, 10, 100, 760 torr, or atmospheric pressure. 34. The method of any one of embodiments 1-33, wherein the metal is a noble metal. 35. The method of any one of embodiments 1-34, wherein the noble metal is silver, gold, platinum, palladium, or a combination thereof. 36. The method of any one of embodiments 1-35, wherein the method comprises depositing at least two metals on the substrate. 37. The method of any one of embodiments 1-36, wherein the at least two metals comprise silver and gold. 38. The method of any one of embodiments 1-37, wherein the at least two metals comprise silver and gold, wherein the silver is present at 65 percent and the gold is present at 35 percent. 39. The method of any one of embodiments 1-37, wherein the at least two metals comprise silver and gold, wherein the silver is present at 35 percent and the gold is present at 65 percent. 40. The method of any one of embodiments 1-39, wherein the method further comprises depositing additional metals or metal oxides on the substrate. 41. The method of any one of embodiments 1-40, wherein the inert gas is Argon. 42. The method of any one of embodiments 1-41, wherein internal pressure of the deposition chamber during the depositing is maintained between about 5 millitorr and about 50 millitorr. 43. The method of any one of embodiments 1-42, wherein the internal pressure of the deposition chamber during the depositing is maintained between about 35 millitorr and about 45 millitorr. 44. The method of any one of embodiments 1-43, wherein the internal pressure of the deposition chamber during the depositing is maintained at about 40 millitorr. 45. The method of any one of embodiments 1-44, wherein the substrate is a solid. 46. The method of any one of embodiments 1-45, wherein the solid comprises metal foil, glass, or silicon. 47. The method of any one of embodiments 1-46, wherein the substrate exhibits low outgassing. 48. The method of any one of embodiments 1-47, wherein the substrate is an implant. 49. The method of any one of embodiments 1-48, wherein the implant is a stent. 50. The method of any one of embodiments 1-49, wherein the stent is a metal stent. 51. The method of any one of embodiments 1-50, wherein the substrate comprises a polymer. 52. The method of any one of embodiments 1-51, wherein the polymer is high-density polyethylene. 53. The method of any one of embodiments 1-52, wherein the substrates comprises a mesh structure made from high density polyethylene. 54. The method of any one of embodiments 1-53, wherein a dressing comprises the mesh structure made from high density polyethylene. 55. The method of any one of embodiments 1-54, wherein the dressing comprises an absorbent layer between two of the mesh structures made from high density polyethylene. 56. The method of any one of embodiments 1-55, wherein the depositing comprises sputtering. 57. The method of any one of embodiments 1-56, wherein the sputtering is DC magnetron sputtering. 58. The method of any one of embodiments 1-57, wherein a sputtering power is about 190 Watts to about 950 Watts. 59. The method of any one of embodiments 1-58, wherein the sputtering power is about 380 Watts to about 760 Watts. 60. The method of any one of embodiments 1-59, wherein the sputtering power is about 570 Watts to about 684 Watts. 61. The method of any one of embodiments 1-60, wherein the sputtering power density is between about 0.7 Watts/cm2 to about 3.3 Watts/cm2. 62. The method of any one of embodiments 1-61, wherein the sputtering power density is between about 1.3 to about 2.7 Watts/cm2. 63. The method of any one of embodiments 1-62, wherein the sputtering power density is between about 2.0 to about 2.4 Watts/cm2. 64. The method of any one of embodiments 1-63, wherein the sputtering power density is about 2.4 Watts/cm2. 65. The method of any one of embodiments 1-64, wherein the inert gas is present between about 95 to about 96 percent, the oxygen gas is present between about 1 to about 4.5 percent and the water vapor is about 2.8 percent, and wherein the sputtering power density is about 2.4 W/cm2. 66. The method of any one of embodiments 1-65, wherein the metal matrix composite material is exposed to at least a 200 ppm carbon dioxide environment after the depositing. 67. A method for preparing a metal matrix composite material, the method comprising depositing one or more of a metal and a metal oxide on a substrate in a deposition chamber in the presence of one or more gases, the one or more gases comprising oxygen gas, wherein the method does not include a step of reducing internal pressure of the deposition chamber below about 10-7 torr prior to and/or during said depositing. 68. The method of embodiment 67, further wherein the method does not include a step of reducing internal pressure of the deposition chamber below about 10-7 millitorr prior to said depositing. 69. The method of embodiment 67 or 68, further wherein the method does not include a step of reducing internal pressure of the deposition chamber below about 10-7 millitorr within 24 hours, 12 hours, 6 hours, 3 hours prior to said depositing. 70. The method of any one of embodiments 67-69, wherein liquid water is injected into a stream of the inert gas, outside of the deposition chamber, entering the deposition chamber as water vapor. 71. The method of any one of embodiments 67-70, wherein the liquid water is injected into the stream of the inert gas, upstream of an inert gas mass flow controller. 72. The method of any one of embodiments 67-71, wherein the liquid water is injected into the stream of the inert gas, by a syringe pump. 73. The method of any one of embodiments 67-72, wherein the liquid water is injected into the stream of inert gas, by the syringe pump at a flow rate between about 0.5 microliters per minute and about 11 microliters per minute. 74. The method of any one of embodiments 67-73, wherein the liquid water is injected into the stream of inert gas, by the syringe pump at a flow rate between about 7 microliters per minute and about 10 microliters per minute. 75. The method of any one of embodiments 67-74, wherein the liquid water is injected into the stream of inert gas, by the syringe pump at a flow rate of about 9 microliters per minute. 76. The method of any one of embodiments 67-75, wherein an inert gas mass flow controller controls the flow rate of the inert gas into the deposition chamber between about 100 SCCM and about 600 SCCM. 77. The method of any one of embodiments 67-76, wherein the inert gas mass flow controller controls the flow rate of the inert gas into the deposition chamber between about 350 SCCM and about 450 SCCM. 78. The method of any one of embodiments 67-77, wherein an oxygen gas mass flow controller controls the flow rate of the oxygen gas into the deposition chamber between about 0.1 SCCM and about 100 SCCM. 79. The method of any one of embodiments 67-78, wherein the oxygen gas mass flow controller controls the flow rate of the oxygen gas into the deposition chamber between about 1 SCCM and about 20 SCCM. 80. The method of any one of embodiments 67-79, wherein the oxygen gas mass flow controller controls the flow rate of the oxygen gas into the deposition chamber between about 5 SCCM and about 10 SCCM. 81. The method of any one of embodiments 67-80, wherein the oxygen gas mass flow controller controls the flow rate of the oxygen gas into the deposition chamber at about 8 SCCM. 82. The method of any one of embodiments 67-81, wherein the liquid water is heated to a temperature between about 20° C. and about 80° C. in a region between the syringe pump and the mass flow controller. 83. The method of any one of embodiments 67-82, wherein the liquid water is heated to a temperature between about 40° C. and about 60° C. in a region between the syringe pump and the mass flow controller. 84. The method of any one of embodiments 67-83, wherein the liquid water is heated to a temperature of about 50° C. in a region between the syringe pump and the mass flow controller. 85. The method of any one of embodiments 67-84, wherein a distance between a source and the substrate is between about 1 centimeter to about 20 centimeters. 86. The method of any one of embodiments 67-85, wherein the distance is between about 5 centimeters to about 15 centimeters. 87. The method of any one of embodiments 67-86, wherein the distance is about 10 centimeters. 88. The method of any one of embodiments 67-87, wherein the method does not include a step of reducing internal pressure of the deposition chamber below about 10-7, 10-6, 10-5, 10-4, 10-3, 0.01, 0.1, 1, 10, 100, 760 Torr, or atmospheric pressure. 89. The method of any one of embodiments 67-88, wherein the metal is a noble metal. 90. The method of any one of embodiments 67-89, wherein the noble metal is silver, gold, platinum, palladium, or a combination thereof. 91. The method of any one of embodiments 67-90, wherein the method comprises depositing at least two metals on the substrate. 92. The method of any one of embodiments 67-91, wherein the at least two metals comprise silver and gold. 93. The method of any one of embodiments 67-92, wherein the at least two metals comprise silver and gold, wherein the silver is present at 65 percent and the gold is present at 35 percent. 94. The method of any one of embodiments 67-92, wherein the at least two metals comprise silver and gold, wherein the silver is present at 35 percent and the gold is present at 65 percent. 95. The method of any one of embodiments 67-94, wherein the method further comprises depositing additional metals or metal oxides on the substrate. 96. The method of any one of embodiments 67-95, wherein the one or more gases comprise an inert gas. 97. The method of any one of embodiments 67-%, wherein the inert gas is Argon. 98. The method of any one of embodiments 67-97, wherein the internal pressure of the deposition chamber during the depositing is maintained between about 5 millitorr and about 50 millitorr. 99. The method of any one of embodiments 67-98, wherein the internal pressure of the deposition chamber during the depositing is maintained between about 35 millitorr and about 45 millitorr. 100. The method of any one of embodiments 67-99, wherein the internal pressure of the deposition chamber during the depositing is maintained at about 40 millitorr. 101. The method of any one of embodiments 67-100, wherein the substrate is a solid. 102. The method of any one of embodiments 67-101, wherein the solid comprises metal foil, glass, or silicon. 103. The method of any one of embodiments 67-102, wherein the substrate exhibits low outgassing. 104. The method of any one of embodiments 67-103, wherein the substrate is an implant. 105. The method of any one of embodiments 67-104, wherein the implant is a stent. 106. The method of any one of embodiments 67-105, wherein the stent is a metal stent. 107. The method of any one of embodiments 67-106, wherein the substrate comprises a polymer. 108. The method of any one of embodiments 67-107, wherein the polymer is high-density polyethylene. 109. The method of any one of embodiments 67-108, wherein the substrates comprises a mesh structure made from high density polyethylene. 110. The method of any one of embodiments 67-109, wherein a dressing comprises the mesh structure made from high density polyethylene. 111. The method of any one of embodiments 67-110, wherein the dressing comprises an absorbent layer between two of the mesh structures made from high density polyethylene. 112. The method of any one of embodiments 67-111, wherein the depositing comprises sputtering. 113. The method of any one of embodiments 67-112, wherein the sputtering is DC magnetron sputtering. 114. The method of any one of embodiments 67-113, wherein a sputtering power is about 190 Watts to about 950 Watts. 115. The method of any one of embodiments 67-114, wherein the sputtering power is about 380 Watts to about 760 Watts. 116. The method of any one of embodiments 67-115, wherein the sputtering power is about 571 Watts. 117. A method for preparing a metal matrix composite material, the method comprising depositing one or more of a metal and a metal oxide on a substrate in a deposition chamber in the presence of a combination of one or more inert gases and oxygen gas, wherein the depositing of the at least one metal and metal oxide originates from a source, wherein the source is separated from the substrate by a distance of at least 5 centimeters. 118. The method of embodiment 117 wherein the method comprises, evacuating the chamber before said depositing. 119. The method of embodiment 117 or 118, wherein said evacuating comprises reducing internal pressure of the deposition chamber to no less than about 10-7, 10-6, 10-5, 10-4, 10-3, 0.01, 0.1, 1, 10, 100, 760 Torr, or atmospheric pressure. 120. The method of any one of embodiments 117-119, the method further comprising repressurizing the deposition chamber to between about 5 millitorr and about 50 millitorr. 121. The method of any one of embodiments 117-120, the method further comprising repressurizing the deposition chamber to between about 35 millitorr and about 45 millitorr. 122. The method of any one of embodiments 117-121, the method further comprising repressurizing the deposition chamber to about 40 millitorr. 123. The method of any one of embodiments 117-122, wherein liquid water is injected into a stream of the inert gas, outside of the deposition chamber, entering the deposition chamber as water vapor. 124. The method of any one of embodiments 117-123, wherein the liquid water is injected into the stream of the inert gas, upstream of an inert gas mass flow controller. 125. The method of any one of embodiments 117-124, wherein the liquid water is injected into the stream of the inert gas, by a syringe pump. 126. The method of any one of embodiments 117-125, wherein the liquid water is injected into the stream of inert gas, by the syringe pump at a flow rate between about 0.5 microliters per minute and about 11 microliters per minute. 127. The method of any one of embodiments 117-126, wherein the liquid water is injected into the stream of inert gas, by the syringe pump at a flow rate between about 7 microliters per minute and about 10 microliters per minute. 128. The method of any one of embodiments 117-127, wherein the liquid water is injected into the stream of inert gas, by the syringe pump at a flow rate of about 9 microliters per minute. 129. The method of any one of embodiments 117-128, wherein an inert gas mass flow controller controls the flow rate of the inert gas into the deposition chamber between about 100 SCCM and about 600 SCCM. 130. The method of any one of embodiments 117-129, wherein the inert gas mass flow controller controls the flow rate of the inert gas into the deposition chamber between about 350 SCCM and about 450 SCCM. 131. The method of any one of embodiments 117-130, wherein an oxygen gas mass flow controller controls the flow rate of the oxygen gas into the deposition chamber between about 0.1 SCCM and about 100 SCCM. 132. The method of any one of embodiments 117-131, wherein an oxygen gas mass flow controller controls the flow rate of the oxygen gas into the deposition chamber between about 1 SCCM and about 20 SCCM. 133. The method of any one of embodiments 117-132, wherein an oxygen gas mass flow controller controls the flow rate of the oxygen gas into the deposition chamber between about 5 SCCM and about 10 SCCM. 134. The method of any one of embodiments 117-133, wherein an oxygen gas mass flow controller controls the flow rate of the oxygen gas into the deposition chamber at about 8 SCCM. 135. The method of any one of embodiments 117-134, wherein the liquid water is heated to a temperature between about 20° C. and about 80° C. in a region between the syringe pump and the mass flow controller. 136. The method of any one of embodiments 117-135, wherein the liquid water is heated to a temperature between about 40° C. and about 60° C. in a region between the syringe pump and the mass flow controller. 137. The method of any one of embodiments 117-136, wherein the liquid water is heated to a temperature of about 50° C. in a region between the syringe pump and the mass flow controller. 138. The method of any one of embodiments 117-137, wherein the distance is between about 1 centimeter to about 20 centimeters. 139. The method of any one of embodiments 117-138, wherein the distance is between about 5 centimeters to about 15 centimeters. 140. The method of any one of embodiments 117-139, wherein the distance is about 10 centimeters. 141. The method of any one of embodiments 117-140, wherein the method does not include a step of reducing internal pressure of the deposition chamber below about 10-7, 10-6, 10-5, 10-4, 10-3, 0.01, 0.1, 1, 10, 100, 760 Torr, or atmospheric pressure. 142. The method of any one of embodiments 117-141, wherein the metal is a noble metal. 143. The method of any one of embodiments 117-142, wherein the noble metal is silver, gold, platinum, palladium, or a combination thereof 144. The method of any one of embodiments 117-143, wherein the method comprises depositing at least two metals on the substrate. 145. The method of any one of embodiments 117-144, wherein the at least two metals comprise silver and gold. 146. The method of any one of embodiments 117-145, wherein the at least two metals comprise silver and gold, wherein the silver is present at 65 percent and the gold is present at 35 percent. 147. The method of any one of embodiments 117-145, wherein the at least two metals comprise silver and gold, wherein the silver is present at 35 percent and the gold is present at 65 percent. 148. The method of any one of embodiments 117-147, wherein the method further comprises depositing additional metals or metal oxides on the substrate. 149. The method of any one of embodiments 117-148, wherein the one or more gases comprise an inert gas. 150. The method of any one of embodiments 117-149, wherein the inert gas is Argon. 151. The method of any one of embodiments 117-150, wherein internal pressure of the deposition chamber during the depositing is maintained between about 5 millitorr and about 50 millitorr. 152. The method of any one of embodiments 117-151, wherein the internal pressure of the deposition chamber during the depositing is maintained between about 35 millitorr and about 45 millitorr. 153. The method of any one of embodiments 117-152, wherein the internal pressure of the deposition chamber during the depositing is maintained at about 40 millitorr. 154. The method of any one of embodiments 117-153, wherein the substrate is a solid. 155. The method of any one of embodiments 117-154, wherein the solid comprises metal foil, glass, or silicon. 156. The method of any one of embodiments 117-155, wherein the substrate exhibits low outgassing. 157. The method of any one of embodiments 117-156, wherein the substrate is an implant. 158. The method of any one of embodiments 117-157, wherein the implant is a stent. 159. The method of any one of embodiments 117-158, wherein the stent is a metal stent. 160. The method of any one of embodiments 117-159, wherein the substrate comprises a polymer. 161. The method of any one of embodiments 117-160, wherein the polymer is high-density polyethylene. 162. The method of any one of embodiments 117-161, wherein the substrates comprises a mesh structure made from high density polyethylene. 163. The method of any one of embodiments 117-162, wherein a dressing comprises the mesh structure made from high density polyethylene. 164. The method of any one of embodiments 117-163, wherein the dressing comprises an absorbent layer between two of the mesh structures made from high density polyethylene. 165. The method of any one of embodiments 117-164, wherein the depositing comprises sputtering. 166. The method of any one of embodiments 117-165, wherein the sputtering is DC magnetron sputtering. 167. The method of any one of embodiments 117-166, wherein a sputtering power is about 190 Watts to about 950 Watts. 168. The method of any one of embodiments 117-167, wherein the sputtering power is about 380 Watts to about 760 Watts. 169. The method of any one of embodiments 117-168, wherein the sputtering power is about 571 Watts. 170. A method for preparing a metal matrix composite material, the method comprising depositing one or more of a metal and a metal oxide on a substrate in a deposition chamber in the presence of an inert gas, oxygen gas and water vapor. 171. The method of embodiment 170, wherein the water vapor originates as liquid water injected into a stream of the inert gas, outside of the deposition chamber. 172. The method of embodiment 170 or 171, wherein said injection occurs upstream of said deposition chamber. 173. The method of any one of embodiments 170-172, wherein the liquid water is injected into the stream of the inert gas, upstream of a mass flow controller. 174. The method of any one of embodiments, 170-173 wherein the mass flow controller is configured for the inert gas. 175. The method of any one of embodiments 170-174, wherein the liquid water is injected into the stream of the inert gas, by a syringe pump. 176. The method of any one of embodiments 170-175, wherein the liquid water is injected into the stream of inert gas, by the syringe pump at a flow rate between about 0.5 microliters per minute and about 11 microliters per minute. 177. The method of any one of embodiments 170-176, wherein the liquid water is injected into the stream of inert gas, by the syringe pump at a flow rate between about 7 microliters per minute and about 10 microliters per minute. 178. The method of any one of embodiments 170-177, wherein the liquid water is injected into the stream of inert gas, by the syringe pump at a flow rate of about 9 microliters per minute. 179. The method of any one of embodiments 170-178, wherein the inert gas mass flow controller controls the flow rate of the inert gas into the deposition chamber between about 100 SCCM and about 600 SCCM. 180. The method of any one of embodiments 170-179, wherein the inert gas mass flow controller controls the flow rate of the inert gas into the deposition chamber between about 350 SCCM and about 450 SCCM. 181. The method of any one of embodiments 170-180, wherein an oxygen gas mass flow controller controls the flow rate of the oxygen gas into the deposition chamber between about 0.1 SCCM and about 100 SCCM. 182. The method of any one of embodiments 170-181, wherein an oxygen gas mass flow controller controls the flow rate of the oxygen gas into the deposition chamber between about 1 SCCM and about 20 SCCM. 183. The method of any one of embodiments 170-182, wherein an oxygen gas mass flow controller controls the flow rate of the oxygen gas into the deposition chamber between about 5 SCCM and about 10 SCCM. 184. The method of any one of embodiments 170-183, wherein an oxygen gas mass flow controller controls the flow rate of the oxygen gas into the deposition chamber at about 8 SCCM. 185. The method as in any one of embodiments 170-184, wherein the liquid water is heated to a temperature between about 20° C. and about 80° C. in a region between the syringe pump and the mass flow controller. 186. The method of any one of embodiments 170-185, wherein the liquid water is heated to a temperature between about 40° C. and about 60° C. in a region between the syringe pump and the mass flow controller. 187. The method of any one of embodiments 170-186, wherein the liquid water is heated to a temperature of about 50° C. in a region between the syringe pump and the mass flow controller. 188. The method of any one of embodiments 170-187, wherein the distance is between about 1 centimeter to about 20 centimeters. 189. The method of any one of embodiments 170-188, wherein the distance is between about 5 centimeters to about 15 centimeters. 190. The method of any one of embodiments 170-189, wherein the distance is about 10 centimeters. 191. The method of any one of embodiments 170-190, wherein the method does not include a step of reducing internal pressure of the deposition chamber below about 10-7, 10-6, 10-5, 10-4, 10-3, 0.01, 0.1, 1, 10, 100, 760 Torr, or atmospheric pressure. 192. The method of any one of embodiments 170-191, wherein the metal is a noble metal. 193. The method of any one of embodiments 170-192, wherein the noble metal is silver, gold, platinum, palladium, or a combination thereof. 194. The method of any one of embodiments 170-193, wherein the method comprises depositing at least two metals on the substrate. 195. The method of any one of embodiments 170-194, wherein the at least two metals comprise silver and gold. 196. The method of any one of embodiments 170-195, wherein the at least two metals comprise silver and gold, wherein the silver is present at 65 percent and the gold is present at 35 percent. 197. The method of any one of embodiments 170-195, wherein the at least two metals comprise silver and gold, wherein the silver is present at 35 percent and the gold is present at 65 percent. 198. The method of any one of embodiments 170-197, wherein the method further comprises depositing additional metals or metal oxides on the substrate. 199. The method of any one of embodiments 170-198, wherein the one or more gases comprise an inert gas. 200. The method of any one of embodiments 170-199, wherein the inert gas is Argon. 201. The method of any one of embodiments 170-200, wherein internal pressure of the deposition chamber during the depositing is maintained between about 5 millitorr and about 50 millitorr. 202. The method of any one of embodiments 170-201, wherein the internal pressure of the deposition chamber during the depositing is maintained between about 35 millitorr and about 45 millitorr. 203. The method of any one of embodiments 170-202, wherein the internal pressure of the deposition chamber during the depositing is maintained at about 40 millitorr. 204. The method of any one of embodiments 170-203, wherein the substrate is a solid. 205. The method of any one of embodiments 170-204, wherein the solid comprises metal foil, glass, or silicon. 206. The method of any one of embodiments 170-205, wherein the substrate exhibits low outgassing. 207. The method of any one of embodiments 170-206, wherein the substrate is an implant. 208. The method of any one of embodiments 170-207 wherein the implant is a stent. 209. The method of any one of embodiments 170-208, wherein the stent is a metal stent. 210. The method of any one of embodiments 170-209, wherein the substrate comprises a polymer. 211. The method of any one of embodiments 170-210, wherein the polymer is high-density polyethylene. 212. The method of any one of embodiments 170-211, wherein the substrates comprises a mesh structure made from high density polyethylene. 213. The method of any one of embodiments 170-212, wherein a dressing comprises the mesh structure made from high density polyethylene. 214. The method of any one of embodiments 170-213, wherein the dressing comprises an absorbent layer between two of the mesh structures made from high density polyethylene. 215. The method of any one of embodiments 170-214, wherein the depositing comprises sputtering. 216. The method of any one of embodiments 170-215, wherein the sputtering is DC magnetron sputtering. 217. The method of any one of embodiments 170-216, wherein a sputtering power is about 190 Watts to about 950 Watts. 218. The method of any one of embodiments 170-217, wherein the sputtering power is about 380 Watts to about 760 Watts. 219. The method of any one of embodiments 170-218, wherein the sputtering power is about 571 Watts. 220. A metal matrix composite material, comprising intergrain atoms of a metal, a metal oxide and crystal grains of the metal, wherein the crystal grains have a median size between about 2 nm and about 15 nm, wherein the intergrain atoms comprise about 50 to about 20 percent per unit surface area of the metal matrix composite material. 221. The metal matrix composite material of embodiment 220, comprising intergrain atoms of a metal, a metal oxide, oxygen, water and crystal grains of the metal, wherein the crystal grains have a median size between about 2 nm and about 15 nm, wherein the intergrain atoms comprise about 50 to about 20 percent per unit surface area of the metal matrix composite material, and wherein the oxygen comprises at least 2 percent by weight of the metal matrix composite material. 222. The metal matrix composite material embodiments 220 or 221, comprising intergrain atoms of a metal, a metal oxide, oxygen, water and crystal grains of the metal, wherein the crystal grains have a median size between about 2 nm and about 15 nm, wherein the intergrain atoms comprise about 50 to about 20 percent per unit surface area of the metal matrix composite material, and wherein the water comprises less than 4 percent by weight of the metal matrix composite material. 223. The metal matrix composite material of any one of embodiments 220-222, wherein the median size of the crystal grains is between about 2 nm and about 15 nm and intergrain atoms of the metal comprise between about 50 percent per unit surface area of the material to about 20 percent per unit surface area of the material. 224. The metal matrix composite material of embodiments 220-223, wherein the median size of the crystal grains is between about 5 nm and about 15 nm and intergrain atoms of the metal comprise between about 40 percent per unit surface area of the material to about 20 percent per unit surface area of the material. 225. The metal matrix composite material of any one of embodiments 220-224, comprising intergrain atoms of a second metal and crystal grains of the second metal having a median size between about 2 nm and about 15 nm, wherein the intergrain atoms of the second metal comprise about 50 to about 20 percent per unit surface area of the metal matrix composite material. 226. The metal matrix composite material of any one of embodiments 220-225, comprising $Ag_2CO_3$. 227. A method for preparing a metal matrix composite material, the method comprising depositing one or more of a metal and a metal oxide on a substrate in a deposition chamber in the presence of water vapor and one or more gases, the one or more gases comprising oxygen gas, wherein the depositing of the at least one metal and metal oxide originates from a source, separated from the substrate by a distance of at least 5 centimeters, further wherein the method does not include a step of reducing internal pressure of the deposition chamber below about 10-7 torr within 24 hours, 12 hours, 6 hours, 3 hours prior to said depositing. 228. A metal matrix composite material, comprising intergrain atoms of a metal, a metal oxide, oxygen, water and crystal grains of the metal having a median size between about 2 nm and about 15 nm, wherein the intergrain atoms comprise about 50 to about 20 percent per unit surface area of the metal matrix composite material, wherein the metal matrix composite material is made by a method comprising the steps of depositing one or more of a metal and a metal oxide on a substrate in a deposition chamber in the presence of water vapor and one or more gases, the one or more gases comprising oxygen gas, wherein the depositing of the at least one metal and metal oxide originates from a source, separated from the substrate by a distance of at least 5 centimeters, further wherein the method does not include a step of reducing internal pressure of the deposition chamber below about 10-7 torr within 24 hours, 12 hours, 6 hours, 3 hours prior to said depositing. 229. The metal matrix composite material of embodiment 228, wherein internal pressure of the deposition chamber during the depositing is maintained between about 5 millitorr and about 50 millitorr. 230. The metal matrix composite material of embodiments 228 or 229, wherein the internal pressure of the deposition chamber during the depositing is maintained between about 35 millitorr and about 45 millitorr. 231. The metal matrix composite material of any one of embodiments 228-230, wherein the internal pressure of the deposition chamber during the depositing is maintained at about 40 millitorr. 232. The metal matrix composite material of any one of embodiments 228-231, wherein the oxygen gas comprises molecular oxygen gas. 233. The metal matrix composite material of embodiment 232, wherein the molecular oxygen gas comprises molecular oxygen gas in any form. 234. The metal matrix composite material of embodiment 233, wherein the molecular oxygen gas is selected from the group consisting of $O_2$, $O_3$, $O_3+$, $O_2+$, $O_2-$, $O_3$, $O$, $O+$, $O-$, ionized ozone, metastable excited oxygen, free electrons, $H_2O_2$ and $OH$.

EXAMPLES

The following examples are included for illustrative purposes only and are not intended to limit the scope of the invention.

Example 1

Working gas: 96% argon with water vapor (water column was 20 C), 4% oxygen
Power: 0.9 amps
Target: 99.99% silver
Target dimensions: 20.25"×5"×0.25"
Sputtering Distance (cathode to substrate): 10 cm
Gas flow rate: Ar+water vapor 384 SCCM: $O_2$ 16 SCCM
Working gas pressure: 40 mtorr
Water temperature: 20 C
Plasma generated color: purple
Test conditions: Dressings (3) were created from 1" square pieces sandwiched around a 1" square single layer of woven cotton gauze. (FIG. 1) They were inoculated with 250 ul of a 6 hour old culture (1.6×10 CFU) of a gram negative enteric rod shaped bacteria grown in TSB at 37 C. The dressings were incubated at 37 C for 30 minutes. The dressings were then placed in 2.25 ml volumes of a saline thioglycolate solution to inactivate the silver and dilutions were made for enumeration. A population of $5×10^4$ was recovered. The log reduction was 8.2-4.7=3.5. This indicates that the dressing was bactericidal, that is it had a greater than 3 log reduction.
Process
This is a physical vapor deposition process that uses a complex working gas mixture. Working gas composition:

Argon (80-99.9%), oxygen (0-20%) and water vapor. The water vapor is controlled by the water temperature, from 20 C, in the argon flow line which controls the vapor pressure of the water and allows more or less to be entrained in the working as is required.

Example 2

Process parameters:
Working gas: 96% argon with water vapor (water column was 20 C), 4% oxygen
Power: 0.9 amps
Target: 99.99% silver
Target dimensions: 20.25"×5"×0.25"
Sputtering Distance (cathode to substrate): 10 cm
Gas flow rate: Ar+water vapor 384 SCCM; $O_2$ 16 SCCM
Working gas pressure: 40 mtorr
Water temperature: 70 C
Plasma generated color: pink
Test conditions: Dressings (3) were created from 1" square pieces sandwiched around a 1" square single layer of woven cotton gauze. (FIG. 1) They were inoculated with 250 ul of a 6 hour old culture ($1.6 \times 10^8$ CFU) of a gram negative enteric rod shaped bacteria grown in TSB at 37 C. The dressings were incubated at 37 C for 30 minutes. The dressings were then placed in 2.25 ml volumes of a saline thioglycolate solution to inactivate the silver and dilutions were made for enumeration. A population of $7 \times 10^5$ was recovered. The log reduction was 3.4. This indicates that the dressing was bactericidal, that is it had a greater than 3 log reduction.

This is a physical vapor deposition process that uses a complex working gas mixture. Working gas composition: Argon (80-99.9%), oxygen (0-20%) and water vapor. The water vapor is controlled by the water temperature, from 70° C., in the argon flow line which controls the vapor pressure of the water and allows more or less to be entrained in the working as is required.

Example 3: The Effect of Water on the Level of Ammonium Hydroxide Soluble Silver This example is included to demonstrate that an antimicrobial coating cannot be formed by DC magnetron sputtering of a silver on a commercial high-density polyethylene (HDPE) mesh when the water is injected into the deposition chamber. The mesh was coated by DC magnetron sputtering 99.9% Ag on the surface using the following conditions. The working gases used were high purity water (100 wt % final concentration) which was added directly to the vacuum chamber through a microvalve. The water was injected into the chamber at 35 uL/min. The sputtering power was 1.5 Amps with a working gas pressure of 40 mTorr. The target to substrate distance was 10 cm. The target was rectangular and measured 12.7 cm×51.4 cm. The target was cooled and maintained at 15° C. using a chiller. The runs were 15 minutes long and the HDPE mesh was static.

The antimicrobial effect of the coating was tested using a log reduction test. The bacterial inoculum was generated in calf serum at 37° C. by inoculating 50 mL of calf serum with a 16-hour old culture of *P. aeruginosa* and incubated for 16 h. This produced a $1.05 \times 10^9$ CFU inoculum. Dressings were prepared from two silver coated pieces of HDPE (2.5×2.5 cm) with a piece (2.5×2.5 cm) of cotton gauze in between. The dressings were placed on a sterile piece of plastic (3.2×3.2 cm) in the inverted lid of a Petri dish in a Class 2 Laminar Flow hood. 200 uL of inoculum were applied to the dressings in a Petri dish which were then covered with a second piece of plastic (3.2×3.2 cm) and incubated for one hour at 37° C. The dressings, including the plastic base and cover pieces, with the bacteria were then placed in 1.8 mL of sodium thioglycolate saline (STS) to inactivate the silver, then further diluted using peptone water, and plated on Mueller-Hinton agar. Plates are checked after 24 h of incubation and the total bacterial colonies forming units were calculated.

$$1/(ID \times SD \times FD) \times 50 \times CFU = CFU/mL \qquad \text{Equation 1}$$

Where ID is the initial dilution, SD are subsequent dilutions, FD is the final dilution, 50 converts to mL and CFU is the colony forming units counted at the dilution used for the calculation.

The CFU/mL was then converted to a log number. The log reduction was calculated by subtracting the log of the recovered CFU from the log of the inoculum. A log reduction greater than 3 is considered bactericidal.

To determine the total amount of silver in the dressing, 1 square inch of dressing was dissolved in 20 mL of a 50% solution of nitric acid in distilled water for 20 minutes, then diluted in an additional 20 mL of distilled water and analyzed using Atomic Absorption Spectrophotometer (AAS).

To determine the amount of ammonium hydroxide soluble silver, which is an estimate of the amount of silver oxide in the dressing, 1 square inch of dressing was dissolved in 20 mL of ammonium hydroxide for 10 minutes, and 10 mL of this solution was diluted in 40 mL of water and analyzed using AAS.

The dressings made with 35 ul/min water contained a total Ag of 1012 ug/square inch; Ammonium hydroxide Soluble Ag of 220 ug/square inch which equated to 22% ammonium hydroxide soluble silver. The *P. aeruginosa* log reduction was <2 indicating that the silver coating deposited in a wet environment was not bactericidal in calf serum.

Simply sputtering in water does not result in the production of high levels of ammonium hydroxide soluble silver or antimicrobial activity.

Example 4: The Effect of Water (0-8 ul/min) and Argon on the Level of Ammonium Hydroxide Soluble Silver This example is included to demonstrate that an antimicrobial coating cannot be formed by DC magnetron sputtering of a silver on a commercial high-density polyethylene (HDPE) mesh w % ben the water is injected into the Ar upstream of the MFC via a syringe pump prior to entering the deposition chamber. The mesh was coated by DC magnetron sputtering 99.9% Ag on the surface using the following conditions. The working gases used were high purity commercial Ar (100 wt % final concentration) which were added to the vacuum chamber through a mass flow controller. The water was injected into the Ar stream at flow rates of 0, 2, 4, 6 and 8 uL/min. The stainless-steel piping was heated to 50° C. between the injection port and the MFC to maintain the water in a gaseous state. The sputtering power was 1.8 Amps, the flow rate for Argon was 400 SCCM, with a working gas pressure of 40 mTorr. The target to substrate distance was 10 cm. The target was rectangular and measured 12.7 cm×51.4 cm. The target was cooled and maintained at 15° C. using a chiller. The runs were 30 minutes long and the HDPE mesh was moving at 15 cm/min.

The antimicrobial effect of the coating was tested using a log reduction test. The bacterial inoculum was generated in calf serum at 37° C. by inoculating 50 mL of calf serum with a 16-hour old culture of *P. aeruginosa* and incubated for 16 h. This produced a $1.05 \times 10^9$ CFU inoculum. Dressings were prepared from two silver coated pieces of HDPE (2.5×2.5 cm) with a piece (2.5×2.5 cm) of cotton gauze in between. The dressings were placed on a sterile piece of plastic (3.2×3.2 cm) in the inverted lid of a Petri dish in a Class 2 Laminar Flow hood. 200 uL of inoculum were applied to the dressings in a Petri dish which were then covered with a second piece of plastic (3.2×3.2 cm) and incubated for one hour at 37° C. The dressings, including the plastic base and cover pieces, with the bacteria were then placed in 1.8 mL of sodium thioglycolate saline (STS) to inactivate the silver, then further diluted using peptone water, and plated on Mueller-Hinton agar. Plates are checked after 24 h of incubation and the total bacterial colonies forming units were calculated.

$$1/(ID \times SD \times FD) \times 50 \times CFU = CFU/mL \quad \text{Equation 1}$$

Where ID is the initial dilution, SD are subsequent dilutions, FD is the final dilution, 50 converts to mL and CFU is the colony forming units counted at the dilution used for the calculation.

The CFU/mL was then converted to a log number. The log reduction was calculated by subtracting the log of the recovered CFU from the log of the inoculum. A log reduction greater than 3 is considered bactericidal.

To determine the total amount of silver in the dressing, 1 square inch of dressing was dissolved in 20 mL of a 50% solution of nitric acid in distilled water for 20 minutes, then diluted in an additional 20 mL of distilled water and analyzed using Atomic Absorption Spectrophotometer (AAS).

To determine the amount of ammonium hydroxide soluble silver, which is an estimate of the amount of silver oxide in the dressing, 1 square inch of dressing was dissolved in 20 mL of ammonium hydroxide for 10 minutes, and 10 mL of this solution was diluted in 40 mL of water and analyzed using AAS.

The results are summarized in FIGS. 2A and 2B.

The dressings made with 0% $O_2$ and 8 ul/min water contained a total Ag of 4320 ug/square inch; Ammonium hydroxide Soluble Ag of 136 ug/square inch which equated to 3.2% ammonium hydroxide soluble silver. The *P. aeruginosa* log reduction was 2.2 indicating that the silver coating deposited in a wet environment was not bactericidal in calf serum.

The dressings made with 0% $O_2$ and 6 ul/min water contained a total Ag of 4160 ug/square inch; Ammonium hydroxide Soluble Ag of 150 ug/square inch which equated to 2.4% ammonium hydroxide soluble silver. The *P. aeruginosa* log reduction was 2.1 indicating that the silver coating deposited in a wet environment was not bactericidal in calf serum The dressings made with 0% $O_2$ and 4 ul/min water contained a total Ag of 4800 ug/square inch; Ammonium hydroxide Soluble Ag of 102 ug/square inch which equated to 2.1% ammonium hydroxide soluble silver. The *P. aeruginosa* log reduction was 2.1 indicating that the silver coating deposited in a wet environment was not bactericidal in calf serum The dressings made with 0% $O_2$ and 2 ul/min water contained a total Ag of 4960 ug/square inch; Ammonium hydroxide Soluble Ag of 104 ug/square inch which equated to 2.1% ammonium hydroxide soluble silver. The *P. aeruginosa* log reduction was 2.7 indicating that the silver coating deposited in a wet environment was not bactericidal in calf serum The dressings made with 0% $O_2$ and 0 ul/min water contained a total Ag of 5040 ug/square inch; Ammonium hydroxide Soluble Ag of 168 ug/square inch which equated to 3.3% ammonium hydroxide soluble silver. The *P. aeruginosa* log reduction was 2.8 indicating that the silver coating deposited in a wet environment was not bactericidal in calf serum Simply sputtering in a mixture of Argon and water does not result in the production of high levels of ammonium hydroxide soluble silver or antimicrobial activity.

Example 5: The Effect of Water (9-33 ul/min) and Argon on the Level of Ammonium Hydroxide Soluble Silver This example is included to demonstrate that an antimicrobial coating cannot be formed by DC magnetron sputtering of a silver on a commercial high-density polyethylene (HDPE) mesh when the water is injected into the Ar upstream of the MFC via a syringe pump prior to entering the deposition chamber. The mesh was coated by DC magnetron sputtering 99.9% Ag on the surface using the following conditions. The working gases used were high purity commercial Ar (100 wt % final concentration) which were added to the vacuum chamber through a mass flow controller. The water was injected into the Ar stream at flow rates of 9, 20 and 33 uL/min. The stainless-steel piping was heated to 50° C. between the injection port and the MFC to maintain the water in a gaseous state. The sputtering power was 1.5 Amps, the flow rate for Argon was 400 SCCM, with a working gas pressure of 40 mTorr. The target to substrate distance was 10 cm. The target was rectangular and measured 12.7 cm×51.4 cm. The target was cooled and maintained at 15° C. using a chiller. The runs were 30 minutes long and the HDPE mesh was moving at 15 cm/min.

The antimicrobial effect of the coating was tested using a log reduction test. The bacterial inoculum was generated in calf serum at 37° C. by inoculating 50 mL of calf serum with a 16-hour old culture of *P. aeruginosa* and incubated for 16 h. This produced a $1.05 \times 10^9$ CFU inoculum. Dressings were prepared from two silver coated pieces of HDPE (2.5×2.5 cm) with a piece (2.5×2.5 cm) of cotton gauze in between. The dressings were placed on a sterile piece of plastic (3.2×3.2 cm) in the inverted lid of a Petri dish in a Class 2 Laminar Flow hood. 200 uL of inoculum were applied to the dressings in a Petri dish which were then covered with a second piece of plastic (3.2×3.2 cm) and incubated for one hour at 37° C. The dressings, including the plastic base and cover pieces, with the bacteria were then placed in 1.8 mL of sodium thioglycolate saline (STS) to inactivate the silver, then further diluted using peptone water, and plated on Mueller-Hinton agar. Plates are checked after 24 h of incubation and the total bacterial colonies forming units were calculated.

$$1/(ID \times SD \times FD) \times 50 \times CFU = CFU/mL \quad \text{Equation 1}$$

Where ID is the initial dilution, SD are subsequent dilutions, FD is the final dilution, 50 converts to mL and CFU is the colony forming units counted at the dilution used for the calculation.

The CFU/mL was then converted to a log number. The log reduction was calculated by subtracting the log of the recovered CFU from the log of the inoculum. A log reduction greater than 3 is considered bactericidal.

To determine the total amount of silver in the dressing, 1 square inch of dressing was dissolved in 20 mL of a 50% solution of nitric acid in distilled water for 20 minutes, then diluted in an additional 20 mL of distilled water and analyzed using Atomic Absorption Spectrophotometer (AAS).

To determine the amount of ammonium hydroxide soluble silver, which is an estimate of the amount of silver oxide in the dressing, 1 square inch of dressing was dissolved in 20 mL of ammonium hydroxide for 10 minutes, and 10 mL of this solution was diluted in 40 mL of water and analyzed using AAS.

The results are summarized in FIGS. 3A and 3B.

The dressings made with 00% $O_2$ and 9 ul/min water contained a total Ag of 4320 ug/square inch; Ammonium hydroxide Soluble Ag of 136 ug/square inch which equated to 1% ammonium hydroxide soluble silver. The *P. aeruginosa* log reduction was <2 indicating that the silver coating deposited in a wet environment was not bactericidal in calf serum.

The dressings made with 0% $O_2$ and 20 ul/min water contained a total Ag of 4160 ug/square inch; Ammonium hydroxide Soluble Ag of 150 ug/square inch which equated to 3% ammonium hydroxide soluble silver. The *P. aeruginosa* log reduction was <2 indicating that the silver coating deposited in a wet environment was not bactericidal in calf serum The dressings made with 0% $O_2$ and 33 ul/min water contained a total Ag of 4800 ug/square inch; Ammonium hydroxide Soluble Ag of 102 ug/square inch which equated to 8% ammonium hydroxide soluble silver. The *P. aeruginosa* log reduction was <2 indicating that the silver coating deposited in a wet environment was not bactericidal in calf serum Simply sputtering in a mixture of Argon and water does not result in the production of high levels of ammonium hydroxide soluble silver or antimicrobial activity.

Example 6: The Effect of Water (1-9 ul/min) and Argon on the Level of Ammonium Hydroxide Soluble Silver This example is included to demonstrate that an antimicrobial coating can be formed by DC magnetron sputtering of a silver on a commercial high-density polyethylene (HDPE) mesh w % ben the water is injected into the Ar upstream of the MFC via a syringe pump prior to entering the deposition chamber. The mesh was coated by DC magnetron sputtering 99.9% Ag on the surface using the following conditions. The working gases used were high purity commercial Ar/$O_2$ (98/2 wt % final concentration) which were added to the vacuum chamber through a mass flow controller. The water was injected into the Ar stream at flow rates of 1, 3, 5, 7 and 9 uL/min. The stainless-steel piping was heated to 50° C. between the injection port and the MFC to maintain the water in a gaseous state. The sputtering power was 570 Watts (1.5 Amps at 380 Volts), the flow rate for Argon/$O_2$ was 392/8 SCCM, with a working gas pressure of 40 mTorr. The target to substrate distance was 10 cm. The target was rectangular and measured 12.7 cm×51.4 cm. The target was cooled and maintained at 15° C. using a chiller. The runs were 30 minutes long and the HDPE mesh was moving at 15 cm/min.

The antimicrobial effect of the coating was tested using a log reduction test. The bacterial inoculum was generated in calf serum at 37° C. by inoculating 50 mL of calf serum with a 16-hour old culture of *P. aeruginosa* and incubated for 16 h. This produced a $1.05 \times 10^9$ CFU inoculum. Dressings were prepared from two silver coated pieces of HDPE (2.5×2.5 cm) with a piece (2.5×2.5 cm) of cotton gauze in between. The dressings were placed on a sterile piece of plastic (3.2×3.2 cm) in the inverted lid of a Petri dish in a Class 2 Laminar Flow hood. 200 uL of inoculum were applied to the dressings in a Petri dish which were then covered with a second piece of plastic (3.2×3.2 cm) and incubated for one hour at 37° C. The dressings, including the plastic base and cover pieces, with the bacteria were then placed in 1.8 mL of sodium thioglycolate saline (STS) to inactivate the silver, then further diluted using peptone water, and plated on Mueller-Hinton agar. Plates are checked after 24 hours of incubation and the total bacterial colonies forming units were calculated.

$$1/(ID \times SD \times FD) \times 50 \times CFU = CFU/mL \qquad \text{Equation 1}$$

Where ID is the initial dilution, SD are subsequent dilutions, FD is the final dilution, 50 converts to mL and CFU is the colony forming units counted at the dilution used for the calculation.

The CFU/mL was then converted to a log number. The log reduction was calculated by subtracting the log of the recovered CFU from the log of the inoculum. A log reduction greater than 3 is considered bactericidal.

To determine the total amount of silver in the dressing, 1 square inch of dressing was dissolved in 20 mL of a 50% solution of nitric acid in distilled water for 20 minutes, then diluted in an additional 20 mL of distilled water and analyzed using Atomic Absorption Spectrophotometer (AAS).

To determine the amount of ammonium hydroxide soluble silver, which is an estimate of the amount of silver oxide in the dressing, 1 square inch of dressing was dissolved in 20 mL of ammonium hydroxide for 10 minutes, and 10 mL of this solution was diluted in 40 mL of water and analyzed using AAS.

The results are summarized in FIG. 4.

The dressings made with 2% $O_2$ and 9 ul/min water contained a total Ag of 6672 ug/square inch; Ammonium hydroxide Soluble Ag of 1290 ug/square inch which equated to 19% ammonium hydroxide soluble silver. The *P. aeruginosa* log reduction was >7 indicating that the silver coating deposited in a wet environment was bactericidal in calf serum.

The dressings made with 2% $O_2$ and 7 ul/min water contained a total Ag of 4032 ug/square inch; Ammonium hydroxide Soluble Ag of 1050 ug/square inch which equated to 26% ammonium hydroxide soluble silver. The *P. aeruginosa* log reduction was >7 indicating that the silver coating deposited in a wet environment was bactericidal in calf serum.

The dressings made with 2% $O_2$ and 5 ul/min water contained a total Ag of 5664 ug/square inch; Ammonium hydroxide Soluble Ag of 1270 ug/square inch which equated to 22% ammonium hydroxide soluble silver. The *P. aeruginosa* log reduction was >7 indicating that the silver coating deposited in a wet environment was bactericidal in calf serum.

The dressings made with 2% $O_2$ and 3 ul/min water contained a total Ag of 6856 ug/square inch; Ammonium hydroxide Soluble Ag of 1620 ug/square inch which equated to 24% ammonium hydroxide soluble silver. The *P. aeruginosa* log reduction was >7 indicating that the silver coating deposited in a wet environment was bactericidal in calf serum The dressings made with 2% $O_2$ and 1 ul/min water contained a total Ag of 4704 ug/square inch; Ammonium hydroxide Soluble Ag of 1140 ug/square inch which equated to 24% ammonium hydroxide soluble silver. The *P. aerugi-*

*nosa* log reduction was >7 indicating that the silver coating deposited in a wet environment was bactericidal in calf serum If water is added to a mixture of 98% Argon and 2% oxygen it does not result in the production of higher levels of ammonium hydroxide soluble silver.

Example 7: The Effect of Water, Oxygen and Argon on the Level of Ammonium Hydroxide Soluble Silver This example is included to demonstrate that variable antimicrobial effects can be generated by DC magnetron sputtering of a silver on a commercial high-density polyethylene (HDPE) mesh when the water is injected into the Ar upstream of the MFC via a syringe pump prior to entering the deposition chamber. The antimicrobial activity is determined by the ratios of Ar, $O_2$ and water. The mesh was coated by DC magnetron sputtering 99.9% Ag on the surface using the following conditions. The working gases used were high purity commercial Ar/$O_2$ (100/0, 99/2, 98/2, 97/3 and 96/4 wt % final concentration) which were added to the vacuum chamber through mass flow controllers—one for Ar and the other for $O_2$. The water was injected into the Ar stream at flow rates of 0 or 9 uL/min. The stainless-steel piping was heated to 50° C. between the injection port and the MFC to maintain the water in a gaseous state. The sputtering power was 570 Watts (1.5 Amps at 380 Volts), the flow rate for Argon/$O_2$ was 396/4, 392/8, 388/12 and 384/16 SCCM, with a working gas pressure of 40 mTorr. The target to substrate distance was 10 cm. The target was rectangular and measured 12.7 cm×51.4 cm. The target was cooled and maintained at 15° C. using a chiller. The runs were 30 minutes long and the HDPE mesh was moving at 15 cm/min.

The antimicrobial effect of the coating was tested using a log reduction test. The bacterial inoculum was generated in calf serum at 37° C. by inoculating 50 mL of calf serum with a 16-hour old culture of *P. aeruginosa* and incubated for 16 h. This produced a $1.05 \times 10^9$ CFU inoculum. Dressings were prepared from two silver coated pieces of HDPE (2.5×2.5 cm) with a piece (2.5×2.5 cm) of cotton gauze in between. The dressings were placed on a sterile piece of plastic (3.2×3.2 cm) in the inverted lid of a Petri dish in a Class 2 Laminar Flow hood. 200 uL of inoculum were applied to the dressings in a Petri dish which were then covered with a second piece of plastic (3.2×3.2 cm) and incubated for one hour at 37° C. The dressings, including the plastic base and cover pieces, with the bacteria were then placed in 1.8 mL of sodium thioglycolate saline (STS) to inactivate the silver, then further diluted using peptone water, and plated on Mueller-Hinton agar. Plates are checked after 24 h of incubation and the total bacterial colonies forming units were calculated.

$$1/(ID \times SD \times FD) \times 50 \times CFU = CFU/mL \qquad \text{Equation 1}$$

Where ID is the initial dilution, SD are subsequent dilutions, FD is the final dilution, 50 converts to mL and CFU is the colony forming units counted at the dilution used for the calculation.

The CFU/mL was then converted to a log number. The log reduction was calculated by subtracting the log of the recovered CFU from the log of the inoculum. A log reduction greater than 3 is considered bactericidal.

To determine the total amount of silver in the dressing, 1 square inch of dressing was dissolved in 20 mL of a 50% solution of nitric acid in distilled water for 20 minutes, then diluted in an additional 20 mL of distilled water and analyzed using Atomic Absorption Spectrophotometer (AAS).

To determine the amount of ammonium hydroxide soluble silver, which is an estimate of the amount of silver oxide in the dressing, 1 square inch of dressing was dissolved in 20 mL of ammonium hydroxide for 10 minutes, and 10 mL of this solution was diluted in 40 mL of water and analyzed using AAS.

The results are summarized in FIGS. 5A and 5B.

The dressings made with 0% $O_2$ and 9 ul/min water contained a total Ag of 3212 ug/square inch; Ammonium hydroxide Soluble Ag of 56 ug/square inch which equated to 1% ammonium hydroxide soluble silver. The *P. aeruginosa* log reduction was 2.4 indicating that the silver coating deposited in a wet environment was not bactericidal in calf serum.

The dressings made with 1% $O_2$ and 9 ul/min water contained a total Ag of 2472 ug/square inch; Ammonium hydroxide Soluble Ag of 812 ug/square inch which equated to 32% ammonium hydroxide soluble silver. The *P. aeruginosa* log reduction was 6.2 indicating that the silver coating deposited in a wet environment was bactericidal in calf serum.

The dressings made with 2% $O_2$ and 9 ul/min water contained a total Ag of 3292 ug/square inch; Ammonium hydroxide Soluble Ag of 1290 ug/square inch which equated to 39% ammonium hydroxide soluble silver. The *P. aeruginosa* log reduction was 6.0 indicating that the silver coating deposited in a wet environment was bactericidal in calf serum.

The dressings made with 3% $O_2$ and 9 ul/min water contained a total Ag of 2736 ug/square inch; Ammonium hydroxide Soluble Ag of 1730 ug/square inch which equated to 63% ammonium hydroxide soluble silver. The *P. aeruginosa* log reduction was 6.3 indicating that the silver coating deposited in a wet environment was bactericidal in calf serum.

The dressings made with 4% $O_2$ and 9 ul/min water contained a total Ag of 2988 ug/square inch; Ammonium hydroxide Soluble Ag of 2210 ug/square inch which equated to 74% ammonium hydroxide soluble silver. The *P. aeruginosa* log reduction was 6.6 indicating that the silver coating deposited in a wet environment was bactericidal in calf serum.

The dressings made with 0% $O_2$ and 0 ul/min water contained a total Ag of 2520 ug/square inch; Ammonium hydroxide Soluble Ag of 85 ug/square inch which equated to 3% ammonium hydroxide soluble silver. The *P. aeruginosa* log reduction was 2.1 indicating that the silver coating deposited in a wet environment was not bactericidal in calf serum.

The dressings made with 1% $O_2$ and 0 ul/min water contained a total Ag of 2832 ug/square inch; Ammonium hydroxide Soluble Ag of 267 ug/square inch which equated to 9% ammonium hydroxide soluble silver. The *P. aeruginosa* log reduction was 4.9 indicating that the silver coating deposited in a wet environment was bactericidal in calf serum.

The dressings made with 2% $O_2$ and 0 ul/min water contained a total Ag of 2320 ug/square inch; Ammonium hydroxide Soluble Ag of 495 ug/square inch which equated to 21% ammonium hydroxide soluble silver. The *P. aeruginosa* log reduction was 4.9 indicating that the silver coating deposited in a wet environment was bactericidal in calf serum The dressings made with 3% $O_2$ and 0 ul/min water contained a total Ag of 2932 ug/square inch; Ammonium hydroxide Soluble Ag of 653 ug/square inch which equated to 22% ammonium hydroxide soluble silver. The *P. aeruginosa* log reduction was 5.0 indicating that the silver coating deposited in a wet environment was bactericidal in calf serum.

The dressings made with 4% $O_2$ and 0 ul/min water contained a total Ag of 2644 ug/square inch; Ammonium hydroxide Soluble Ag of 698 ug/square inch which equated to 26% ammonium hydroxide soluble silver. The *P. aeruginosa* log reduction was 5.0 indicating that the silver coating deposited in a wet environment was bactericidal in calf serum.

Increasing the amount of water added to a mixture of Argon and oxygen results in significant increases in the production of ammonium hydroxide soluble silver. The increase is well beyond the additive result that would be expected based upon the activity generated by sputtering in water by itself or with water and Ar mixtures. These changes in the chemical composition of the thin films, induced by the presence of water, increase antimicrobial activity by more than a factor of 10 times which is an unexpected synergistic effect.

Example 8: Heated Column Adding Water Upstream of MFC

This example is included to demonstrate an antimicrobial coating formed by DC magnetron sputtering on a commercial high-density polyethylene (HDPE) mesh with water in the working gas. The mesh was coated by DC magnetron sputtering 99.99% pure silver on the surface using the following conditions. The working gases used were high purity commercial Ar and $O_2$ (99/1 wt % final concentration) which were added to the vacuum chamber through separate mass flow controllers. The argon was bubbled through a heated stainless-steel tall column (134 cm×4.8 cm) with 1400 mls of HPLC grade $H_2O$ before the mass flow controller. The column had a thermostatically controlled electric heater installed in the base. The outside temperature was maintained at 65° C.+/−3° C. giving an internal water temperature of 88oC+/−3° C. The sputtering power was 570 Watts (1.5 Amps at 380 Volts), the flow rate for Argon was 396 SCCM and for $O_2$ was 4 SCCM, with a working gas pressure of 40 mTorr. The target to substrate distance was 10 cm. The target was rectangular and measured 12.7 cm×51.4 cm. The target was cooled and maintained at 15° C. using a chiller. The run was 30 minutes long and the HDPE mesh was stationary.

The antimicrobial effect of the coating was tested using a log reduction test. The bacterial inoculum was generated in calf serum at 37° C. by inoculating 50 mL of calf serum with a 16-hour old culture of *P. aeruginosa* and incubated for 16 h. This produced a 1×10$^9$ CFU inoculum. Dressings were prepared from two silver coated pieces of HDPE (2.5×2.5 cm) with a piece (2.5×2.5 cm) of cotton gauze in between. The dressings were placed on a sterile piece of plastic (3.2×3.2 cm) in the inverted lid of a Petri dish in a Class 2 Laminar Flow hood. 200 uL of inoculum were applied to the dressings in a Petri dish which were then covered with a second piece of plastic (3.2×3.2 cm) and incubated for one hour at 37° C. The dressings, including the plastic base and cover pieces, with the bacteria were then placed in 1.8 mL of sodium thioglycolate saline (STS) to inactivate the silver, then further diluted using peptone water, and plated on Mueller-Hinton agar. Plates are checked after 24 h of incubation and the total bacterial colonies forming units were calculated.

$$1/(ID \times SD \times FD) \times 50 \times CFU = CFU/mL \quad \text{Equation 1}$$

Where ID is the initial dilution, SD are subsequent dilutions, FD is the final dilution, 50 converts to mL and CFU is the colony forming units counted at the dilution used for the calculation.

The CFU/mL was then converted to a log number. The log reduction was calculated by subtracting the log of the recovered CFU from the log of the inoculum. A log reduction greater than 3 is considered bactericidal.

To determine the total amount of silver in the dressing, 1 square inch of dressing was dissolved in 20 mL of a 50% solution of nitric acid in distilled water for 20 minutes, then diluted in an additional 20 mL of distilled water and analyzed using Atomic Absorption Spectrophotometer (AAS).

To determine the amount of ammonium hydroxide soluble silver, which is an estimate of the amount of silver oxide in the dressing, 1 square inch of dressing was dissolved in 20 mL of ammonium hydroxide for 10 minutes, and 10 mL of this solution was diluted in 40 mL of water and analyzed using AAS.

The dressings contained a total Ag of 5144 ug/square inch; Ammonium hydroxide Soluble Ag of 2109 ug/square inch which equated to 41% ammonium hydroxide soluble silver. The *P. aeruginosa* log reduction was 6.9 indicating that the silver coating was bactericidal in calf serum.

Example 9: Heated Column Adding Water Upstream of MFC

This example is included to demonstrate an antimicrobial coating formed by DC magnetron sputtering on a commercial high-density polyethylene (HDPE) mesh was not affected by the volume of water through which the Ar passed through prior to entering the deposition chamber. The mesh was coated by DC magnetron sputtering 99.99% pure silver on the surface using the following conditions. The working gases used were high purity commercial Ar and O2 (99/1 wt % final concentration) which were added to the vacuum chamber through separate mass flow controllers. The argon was bubbled through a heated stainless-steel tall column (134 cm×4.8 cm) with 1500 mls of HPLC grade $H_2O$ before the mass flow controller. The column had a thermostatically controlled electric heater installed in the base. The outside temperature was maintained at 65° C.+/−3° C. giving an internal water temperature of 88° C.+/−3° C. The sputtering power was 571 Watts (1.5 Amps at 380 Volts), the flow rate for Argon was 396 SCCM and for $O_2$ was 4 SCCM, with a working gas pressure of 40 mTorr. The target to substrate distance was 10 cm. The target was rectangular and measured 12.7 cm×51.4 cm. The target was cooled and maintained at 15° C. using a chiller. The run was 30 minutes long and the HDPE mesh was stationary.

The antimicrobial effect of the coating was tested using a log reduction test. The bacterial inoculum was generated in calf serum at 37° C. by inoculating 50 mL of calf serum with a 16-hour old culture of *P. aeruginosa* and incubated for 16 h. This produced a 1×10$^9$ CFU inoculum. Dressings were prepared from two silver coated pieces of HDPE (2.5×2.5 cm) with a piece (2.5×2.5 cm) of cotton gauze in between. The dressings were placed on a sterile piece of plastic (3.2×3.2 cm) in the inverted lid of a Petri dish in a Class 2 Laminar Flow hood. 200 uL of inoculum were applied to the dressings in a Petri dish which were then covered with a second piece of plastic (3.2×3.2 cm) and incubated for one hour at 37° C. The dressings, including the plastic base and cover pieces, with the bacteria were then placed in 1.8 mL of sodium thioglycolate saline (STS) to inactivate the silver, then further diluted using peptone water, and plated on Mueller-Hinton agar. Plates are checked after 24 h of incubation and the total bacterial colonies forming units were calculated.

$$1/(ID \times SD \times FD) \times 50 \times CFU = CFU/mL \quad \text{Equation 1}$$

Where ID is the initial dilution, SD are subsequent dilutions, FD is the final dilution. 50 converts to mL and CFU is the colony forming units counted at the dilution used for the calculation.

The CFU/mL was then converted to a log number. The log reduction was calculated by subtracting the log of the recovered CFU from the log of the inoculum. A log reduction greater than 3 is considered bactericidal.

To determine the total amount of silver in the dressing, 1 square inch of dressing was dissolved in 20 mL of a 50% solution of nitric acid in distilled water for 20 minutes, then diluted in an additional 20 mL of distilled water and analyzed using Atomic Absorption Spectrophotometer (AAS).

To determine the amount of ammonium hydroxide soluble silver, which is an estimate of the amount of silver oxide in the dressing, 1 square inch of dressing was dissolved in 20 mL of ammonium hydroxide for 10 minutes, and 10 mL of this solution was diluted in 40 mL of water and analyzed using AAS.

The dressings contained a total Ag of 5320 ug/square inch; Ammonium hydroxide Soluble Ag of 2430 ug/square inch which equated to 46% ammonium hydroxide soluble silver. The *P. aeruginosa* log reduction was >6 indicating that the silver coating was bactericidal in calf serum.

Example 10: Water Injection Downstream of MFC Through Microvalve

This example is included to demonstrate an antimicrobial coating formed by DC magnetron sputtering on a commercial high-density polyethylene (HDPE) mesh where the water was added via a microvalve after the MFC and prior to entering the deposition chamber. The mesh was coated by DC magnetron sputtering 99.99% pure silver on the surface using the following conditions. The working gases used were high purity commercial Ar and $O_2$ (98/2 wt % final concentration) which were added to the vacuum chamber through separate mass flow controllers. The 21° C. HPLC grade water was added to the Ar/$O_2$ through a Burette with a microvalve at a flow rate 51.6 ul/min. The sputtering power was 571 Watts (1.5 Amps at 380 Volts), the flow rate for Argon was 392 SCCM and for $O_2$ was 8 SCCM, with a working gas pressure of 40 mTorr. The target to substrate distance was 10 cm. The target was rectangular and measured 12.7 cm×51.4 cm. The target was cooled and maintained at 15° C. using a chiller. The run was 30 minutes long and the HDPE mesh was stationary.

The antimicrobial effect of the coating was tested using a log reduction test. The bacterial inoculum was generated in calf serum at 37° C. by inoculating 50 mL of calf serum with a 16-hour old culture of *P. aeruginosa* and incubated for 16 h. This produced a $1 \times 10^9$ CFU inoculum. Dressings were prepared from two silver coated pieces of HDPE (2.5×2.5 cm) with a piece (2.5×2.5 cm) of cotton gauze in between. The dressings were placed on a sterile piece of plastic (3.2×3.2 cm) in the inverted lid of a Petri dish in a Class 2 Laminar Flow hood. 200 uL of inoculum were applied to the dressings in a Petri dish which were then covered with a second piece of plastic (3.2×3.2 cm) and incubated for one hour at 37° C. The dressings, including the plastic base and cover pieces, with the bacteria were then placed in 1.8 mL of sodium thioglycolate saline (STS) to inactivate the silver, then further diluted using peptone water, and plated on Mueller-Hinton agar. Plates are checked after 24 h of incubation and the total bacterial colonies forming units were calculated.

$$1/(ID \times SD \times FD) \times 50 \times CFU = CFU/mL \quad \text{Equation 1}$$

Where ID is the initial dilution, SD are subsequent dilutions, FD is the final dilution, 50 converts to mL and CFU is the colony forming units counted at the dilution used for the calculation.

The CFU/mL was then converted to a log number. The log reduction was calculated by subtracting the log of the recovered CFU from the log of the inoculum. A log reduction greater than 3 is considered bactericidal.

To determine the total amount of silver in the dressing, 1 square inch of dressing was dissolved in 20 mL of a 50% solution of nitric acid in distilled water for 20 minutes, then diluted in an additional 20 mL of distilled water and analyzed using Atomic Absorption Spectrophotometer (AAS).

To determine the amount of ammonium hydroxide soluble silver, which is an estimate of the amount of silver oxide in the dressing, 1 square inch of dressing was dissolved in 20 mL of ammonium hydroxide for 10 minutes, and 10 mL of this solution was diluted in 40 mL of water and analyzed using AAS.

The dressings contained a total Ag of 4108 ug/square inch; Ammonium hydroxide Soluble Ag of 710 ug/square inch which equated to 17.2% ammonium hydroxide soluble silver. The *P. aeruginosa* log reduction was 7.5 indicating that the silver coating was bactericidal in calf serum.

Example 11: Water Injection Downstream of MFC Through Microvalve

This example is included to demonstrate an antimicrobial coating formed by DC magnetron sputtering on a commercial high-density polyethylene (HDPE) mesh where the water was added via a microvalve after the MFC and prior to entering the deposition chamber. The mesh was coated by DC magnetron sputtering 99.99% pure silver on the surface using the following conditions. The working gases used were high purity commercial Ar and $O_2$ (98/2 wt % final concentration) which were added to the vacuum chamber through separate mass flow controllers. The 21° C. HPLC grade water was added to the Ar/$O_2$ through a Burette with a microvalve at a flow rate 9.1 ul/min. The sputtering power was 571 Watts (1.5 Amps at 380 Volts), the flow rate for Argon was 392 SCCM and for $O_2$ was 8 SCCM, with a working gas pressure of 40 mTorr. The target to substrate distance was 10 cm. The target was rectangular and measured 12.7 cm×51.4 cm. The target was cooled and maintained at 15° C. using a chiller. The run was 30 minutes long and the HDPE mesh was stationary.

The antimicrobial effect of the coating was tested using a log reduction test. The bacterial inoculum was generated in calf serum at 37° C. by inoculating 50 mL of calf serum with a 16-hour old culture of *P. aeruginosa* and incubated for 16 h. This produced a $1 \times 10^9$ CFU inoculum. Dressings were prepared from two silver coated pieces of HDPE (2.5×2.5 cm) with a piece (2.5×2.5 cm) of cotton gauze in between. The dressings were placed on a sterile piece of plastic (3.2×3.2 cm) in the inverted lid of a Petri dish in a Class 2 Laminar Flow hood. 200 uL of inoculum were applied to the dressings in a Petri dish which were then covered with a second piece of plastic (3.2×3.2 cm) and incubated for one hour at 37° C. The dressings, including the plastic base and cover pieces, with the bacteria were then placed in 1.8 mL of sodium thioglycolate saline (STS) to inactivate the silver, then further diluted using peptone water, and plated on Mueller-Hinton agar. Plates are checked after 24 h of incubation and the total bacterial colonies forming units were calculated.

$$1/(ID \times SD \times FD) \times 50 \times CFU = CFU/mL \qquad \text{Equation 1}$$

Where ID is the initial dilution, SD are subsequent dilutions, FD is the final dilution, 50 converts to mL and CFU is the colony forming units counted at the dilution used for the calculation.

The CFU/mL was then converted to a log number. The log reduction was calculated by subtracting the log of the recovered CFU from the log of the inoculum. A log reduction greater than 3 is considered bactericidal.

To determine the total amount of silver in the dressing, 1 square inch of dressing was dissolved in 20 mL of a 50% solution of nitric acid in distilled water for 20 minutes, then diluted in an additional 20 mL of distilled water and analyzed using Atomic Absorption Spectrophotometer (AAS).

To determine the amount of ammonium hydroxide soluble silver, which is an estimate of the amount of silver oxide in the dressing, 1 square inch of dressing was dissolved in 20 mL of ammonium hydroxide for 10 minutes, and 10 mL of this solution was diluted in 40 mL of water and analyzed using AAS.

The dressings contained a total Ag of 3196 ug/square inch; Ammonium hydroxide Soluble Ag of 830 ug/square inch which equated to 26% ammonium hydroxide soluble silver. The *P. aeruginosa* log reduction was 7.5 indicating that the silver coating was bactericidal in calf serum.

Example 12: Water Injection Upstream of MFC Via Syringe Pump

This example is included to demonstrate an antimicrobial coating formed by DC magnetron sputtering on a commercial high-density polyethylene (HDPE) mesh when the water is injected into the Ar upstream of the MFC via a syringe pump prior to entering the deposition chamber. The mesh was coated by DC magnetron sputtering 99.99% pure silver on the surface using the following conditions. The working gases used were high purity commercial Ar and $O_2$ (98/2 wt % final concentration) which were added to the vacuum chamber through separate mass flow controllers. The water was injected into the Ar stream at flow rates of 1, 3, 5, 7 and 9 uL/min. The stainless-steel piping was heated to 50° C. between the injection port and the MFC to maintain the water in a gaseous state. The sputtering power was 571 Watts (1.5 Amps at 380 Volts), the flow rate for Argon was 392 SCCM and for $O_2$ was 8 SCCM, with a working gas pressure of 40 mTorr. The target to substrate distance was 10 cm. The target was rectangular and measured 12.7 cm×51.4 cm. The target was cooled and maintained at 15° C. using a chiller. The runs were 30 minutes long and the HDPE mesh was stationary.

The antimicrobial effect of the coating was tested using a log reduction test. The bacterial inoculum was generated in calf serum at 37° C. by inoculating 50 mL of calf serum with a 16-hour old culture of *P. aeruginosa* and incubated for 16 h. This produced a 1×10$^9$ CFU inoculum. Dressings were prepared from two silver coated pieces of HDPE (2.5×2.5 cm) with a piece (2.5×2.5 cm) of cotton gauze in between. The dressings were placed on a sterile piece of plastic (3.2×3.2 cm) in the inverted lid of a Petri dish in a Class 2 Laminar Flow hood. 200 uL of inoculum were applied to the dressings in a Petri dish which were then covered with a second piece of plastic (3.2×3.2 cm) and incubated for one hour at 37° C. The dressings, including the plastic base and cover pieces, with the bacteria were then placed in 1.8 mL of sodium thioglycolate saline (STS) to inactivate the silver, then further diluted using peptone water, and plated on Mueller-Hinton agar. Plates are checked after 24 h of incubation and the total bacterial colonies forming units were calculated.

$$1/(ID \times SD \times FD) \times 50 \times CFU = CFU/mL \qquad \text{Equation 1}$$

Where ID is the initial dilution, SD are subsequent dilutions, FD is the final dilution, 50 converts to mL and CFU is the colony forming units counted at the dilution used for the calculation.

The CFU/mL was then converted to a log number. The log reduction was calculated by subtracting the log of the recovered CFU from the log of the inoculum. A log reduction greater than 3 is considered bactericidal.

To determine the total amount of silver in the dressing, 1 square inch of dressing was dissolved in 20 mL of a 50% solution of nitric acid in distilled water for 20 minutes, then diluted in an additional 20 mL of distilled water and analyzed using Atomic Absorption Spectrophotometer (AAS).

To determine the amount of ammonium hydroxide soluble silver, which is an estimate of the amount of silver oxide in the dressing, 1 square inch of dressing was dissolved in 20 mL of ammonium hydroxide for 10 minutes, and 10 mL of this solution was diluted in 40 mL of water and analyzed using AAS.

The dressings made with 9 ul/min water contained a total Ag of 6672 ug/square inch; Ammonium hydroxide Soluble Ag of 1050 ug/square inch which equated to 19% ammonium hydroxide soluble silver. The *P. aeruginosa* log reduction was >8.3 indicating that the silver coating was bactericidal in calf serum.

The dressings made with 7 ul/min water contained a total Ag of 4032 ug/square inch; Ammonium hydroxide Soluble Ag of 1050 ug/square inch which equated to 26% ammonium hydroxide soluble silver. The *P. aeruginosa* log reduction was >8.3 indicating that the silver coating was bactericidal in calf serum.

The dressings made with 5 ul/min water contained a total Ag of 5664 ug/square inch; Ammonium hydroxide Soluble Ag of 1270 ug/square inch which equated to 22% ammonium hydroxide soluble silver. The *P. aeruginosa* log reduction was >8.3 indicating that the silver coating was bactericidal in calf serum.

The dressings made with 3 ul/min water contained a total Ag of 6856 ug/square inch; Ammonium hydroxide Soluble Ag of 1620 ug/square inch which equated to 24% ammonium hydroxide soluble silver. The *P. aeruginosa* log reduction was >8.3 indicating that the silver coating was bactericidal in calf serum.

The dressings made with 1 ul/min water contained a total Ag of 4704 ug/square inch; Ammonium hydroxide Soluble Ag of 1140 ug/square inch which equated to 24% ammonium hydroxide soluble silver. The *P. aeruginosa* log reduction was >8.3 indicating that the silver coating was bactericidal in calf serum.

Example 13. Water Injection Upstream of MFC Via Syringe Pump Data with a 65% Ag/35% Au Alloy This example is included to demonstrate an antimicrobial coating formed by DC magnetron sputtering of a silver/gold alloy on a commercial high-density polyethylene (HDPE) mesh when the water is injected into the Ar upstream of the MFC via a syringe pump prior to entering the deposition chamber. The mesh was coated by DC magnetron sputtering 65% Ag/35% Au silver on the surface using the following conditions. The working gases used were high purity commercial Ar and $O_2$ (96/4 wt % final concentration or 95.5/4.5 wt %) which were added to the vacuum chamber through separate mass flow controllers. The water was injected into the Ar stream at a flow rate of 8 uL/min. The stainless-steel piping was heated to 50° C. between the injection port and the MFC to maintain the water in a gaseous state. The sputtering power was 1.8 Amps, the flow rate for Argon was 384 SCCM and for $O_2$ was 16 SCCM or 382 SCCM and for $O_2$ was 18 SCCM, with a working gas pressure of 40 mTorr. The target to substrate distance was 10 cm. The target was rectangular and measured 12.7 cm×51.4 cm. The target was cooled and maintained at 15° C. using a chiller. The runs were 30 minutes long and the HDPE mesh was moving at 1.5 cm/min.

The antimicrobial effect of the coating was tested using a log reduction test. The bacterial inoculum was generated in calf serum at 37° C. by inoculating 50 mL of calf serum with a 16-hour old culture of *P. aeruginosa* and incubated for 16 h. This produced a $1.05 \times 10^9$ CFU inoculum. Dressings were prepared from two silver/gold alloy coated pieces of HDPE (2.5×2.5 cm) with a piece (2.5×2.5 cm) of cotton gauze in between. The dressings were placed on a sterile piece of plastic (3.2×3.2 cm) in the inverted lid of a Petri dish in a Class 2 Laminar Flow hood. 200 uL of inoculum were applied to the dressings in a Petri dish which were then covered with a second piece of plastic (3.2×3.2 cm) and incubated for one hour at 37° C. The dressings, including the plastic base and cover pieces, with the bacteria were then placed in 1.8 mL of sodium thioglycolate saline (STS) to inactivate the silver, then further diluted using peptone water, and plated on Mueller-Hinton agar. Plates are checked after 24 h of incubation and the total bacterial colonies forming units were calculated.

$$1/(ID \times SD \times FD) \times 50 \times CFU = CFUmL \qquad \text{Equation 1}$$

Where ID is the initial dilution, SD are subsequent dilutions, FD is the final dilution, 50 converts to mL and CFU is the colony forming units counted at the dilution used for the calculation.

The CFU/mL was then converted to a log number. The log reduction was calculated by subtracting the log of the recovered CFU from the log of the inoculum. A log reduction greater than 3 is considered bactericidal.

To determine the total amount of silver in the dressing, 1 square inch of dressing was dissolved in 20 mL of a 50% solution of nitric acid in distilled water for 20 minutes, then diluted in an additional 20 mL of distilled water and analyzed using Atomic Absorption Spectrophotometer (AAS).

To determine the amount of ammonium hydroxide soluble silver, which is an estimate of the amount of silver oxide in the dressing, 1 square inch of dressing was dissolved in 20 mL of ammonium hydroxide for 10 minutes, and 10 mL of this solution was diluted in 40 mL of water and analyzed using AAS.

To determine the total amount of gold in the dressing, 1 square inch of dressing was dissolved in 20 mL of aqua regia in distilled water for 20 minutes, then diluted in an additional 20 mL of distilled water and analyzed using Atomic Absorption Spectrophotometer (AAS).

The dressings made with 4% $O_2$ and 8 ul/min water contained a total Ag of 2956 ug/square inch; Ammonium Hydroxide Soluble Ag of 1150 ug/square inch which equated to 38.9% ammonium hydroxide soluble silver. The gold level in the dressing was 1520 ug/square inch or 34% of the coating. The *P. aeruginosa* log reduction was 5.4 indicating that the silver/gold coating deposited in a wet environment was bactericidal in calf serum.

The dressings made with 4.5% $O_2$ 8 ul/min water contained a total Ag of 2896 ug/square inch; Ammonium hydroxide Soluble Ag of 1740 ug/square inch which equated to 60% ammonium hydroxide soluble silver. The gold level in the dressing was 1488 ug/square inch or 34% of the coating. The *P. aeruginosa* log reduction was 5.4 indicating that the silver/gold coating deposited in a wet environment was bactericidal in calf serum.

Example 14. Water Injection Upstream of MFC Via Syringe Pump Data with a 35% Ag/65% Au Alloy This example is included to demonstrate an antimicrobial coating formed by DC magnetron sputtering of a silver/gold alloy on a commercial high-density polyethylene (HDPE) mesh when the water is injected into the Ar upstream of the MFC via a syringe pump prior to entering the deposition chamber. The mesh was coated by DC magnetron sputtering 35% Ag/65% Au on the surface using the following conditions. The working gases used were high purity commercial Ar and O2 (99/1, 97.5/2.5 and 95.75 wt % final concentration) which were added to the vacuum chamber through separate mass flow controllers. The water was injected into the Ar stream at flow rates of 2, 4 or 8 uL/min. The stainless-steel piping was heated to 50° C. between the injection port and the MFC to maintain the water in a gaseous state. The sputtering power was 684 Watts (1.8 Amps at 380 Volts), the flow rate for Argon was 396, 390 and 383 SCCM and for $O_2$ was 4, 10 and 17 SCCM, with a working gas pressure of 40 mTorr. The target to substrate distance was 10 cm. The target was rectangular and measured 12.7 cm×51.4 cm. The target was cooled and maintained at 15° C. using a chiller. The runs were 30 minutes dynamic runs (web speed 1.56 cm/min).

The antimicrobial effect of the coating was tested using a log reduction test. The bacterial inoculum was generated in calf serum at 37° C. by inoculating 50 mL of calf serum with a 16-hour old culture of *P. aeruginosa* and incubated for 16 h. This produced a $3.5 \times 10^9$ CFU inoculum. Dressings were prepared from two silver/gold alloy coated pieces of HDPE (2.5×2.5 cm) with a piece (2.5×2.5 cm) of cotton gauze in between. The dressings were placed on a sterile piece of plastic (3.2×3.2 cm) in the inverted lid of a Petri dish in a Class 2 Laminar Flow hood. 250 uL of inoculum were applied to the dressings in a Petri dish which were then covered with a second piece of plastic (3.2×3.2 cm) and incubated for one hour at 37° C. The dressings, including the plastic base and cover pieces, with the bacteria were then placed in 2.25 mL of sodium thioglycolate saline (STS) to inactivate the silver, then further diluted using peptone water, and plated on Mueller-Hinton agar. Plates are checked after 24 h of incubation and the total bacterial colonies forming units were calculated.

$$1/(ID \times SD \times FD) \times 50 \times CFU = CFUmL \qquad \text{Equation 1}$$

Where ID is the initial dilution, SD are subsequent dilutions, FD is the final dilution, 50 converts to mL and CFU is the colony forming units counted at the dilution used for the calculation.

The CFU/mL was then converted to a log number. The log reduction was calculated by subtracting the log of the recovered CFU from the log of the inoculum. A log reduction greater than 3 is considered bactericidal.

The data is summarized in FIGS. 6A and 6B.

The dressings made with 1% $O_2$ and 0 ul/min water had a log reduction of 0.9 on *P. aeruginosa* indicating that the silver/gold coating deposited in a wet environment was not bactericidal in calf serum.

The dressings made with 2.5% $O_2$ and 0 ul/min water had a log reduction of 1.0 on *P. aeruginosa* indicating that the silver/gold coating deposited in a wet environment was not bactericidal in calf serum.

The dressings made with 4.25% $O_2$ and 0 ul/min water had a log reduction of 4.2 on *P. aeruginosa* indicating that the silver/gold coating deposited in a wet environment was bactericidal in calf serum.

The dressings made with 0% $O_2$ and 2 ul/min water had a log reduction of 1.0 on *P. aeruginosa* indicating that the silver/gold coating deposited in a wet environment was not bactericidal in calf serum.

The dressings made with 0% $O_2$ and 4 ul/min water had a log reduction of 0.9 on *P. aeruginosa* indicating that the silver/gold coating deposited in a wet environment was not bactericidal in calf serum.

The dressings made with 0% $O_2$ and 8 ul/min water had a log reduction of 0.9 on *P. aeruginosa* indicating that the silver/gold coating deposited in a wet environment was not bactericidal in calf serum.

The dressings made with 1% $O_2$ and 8 ul/min water had a log reduction of 1.2 on *P. aeruginosa* indicating that the silver/gold coating deposited in a wet environment was not bactericidal in calf serum.

The dressings made with 2.5% $O_2$ and 8 ul/min water had a log reduction of 4.4 on *P. aeruginosa* indicating that the silver/gold coating deposited in a wet environment was bactericidal in calf serum.

The dressings made with 4.25% $O_2$ and 8 ul/min water had a log reduction of 5.5 on *P. aeruginosa* indicating that the silver/gold coating deposited in a wet environment was bactericidal in calf serum.

Water has a very limited effect on its own while oxygen at higher concentrations (4.25%) has some antimicrobial activity. If water (8 ul/min) is added to the Ar/$O_2$ working gas a synergistic effect is observed and the materials produced have antimicrobial activity more than 10 times greater than the Ar/$O_2$ working gas by itself.

Example 15: Demonstration of Different Sputtering Powers

This example is included to demonstrate an antimicrobial coating formed by DC magnetron sputtering on a commercial high-density polyethylene (HDPE) mesh when the water is injected into the Ar upstream of the MFC via a syringe pump prior to entering the deposition chamber. The mesh was coated by DC magnetron sputtering 99.99% pure silver on the surface using the following conditions. The working gases used were high purity commercial Ar and $O_2$ (95.75/4.25 wt % final concentration) which were added to the vacuum chamber through separate mass flow controllers. The water was injected into the Ar stream at a flow rate of 6 uL/min. The stainless-steel piping was heated to 50° C. between the injection port and the MFC to maintain the water in a gaseous state. The sputtering power was to values of 684, 342, and 190 Watts (1.8, 0.9 or 0.5 Amps at 380 Volts); the flow rate for Argon was 383 SCCM; the flow rate for $O_2$ was 17 SCCM and the working gas pressures were of 50, 40 or 13 mTorr for each respective run. The target to substrate distance was 10 cm. The target was rectangular and measured 12.7 cm×51.4 cm. The target was cooled and maintained at 15° C. using a chiller. The runs were 30 minutes long and the HDPE mesh was stationary.

The antimicrobial effect of the coating was tested using a log reduction test. The bacterial inoculum was generated in calf serum at 37° C. by inoculating 50 mL of calf serum with a 16-hour old culture of *P. aeruginosa* and incubated for 16 h. This produced a $1\times10^9$ CFU inoculum. Dressings were prepared from two silver coated pieces of HDPE (2.5×2.5 cm) with a piece (2.5×2.5 cm) of cotton gauze in between. The dressings were placed on a sterile piece of plastic (3.2×3.2 cm) in the inverted lid of a Petri dish in a Class 2 Laminar Flow hood. 200 uL of inoculum were applied to the dressings in a Petri dish which were then covered with a second piece of plastic (3.2×3.2 cm) and incubated for one hour at 37° C. The dressings, including the plastic base and cover pieces, with the bacteria were then placed in 1.8 mL of sodium thioglycolate saline (STS) to inactivate the silver, then further diluted using peptone water, and plated on Mueller-Hinton agar. Plates are checked after 24 h of incubation and the total bacterial colonies forming units were calculated.

$$1/(ID \times SD \times FD) \times 50 \times CFU = CFUmL \qquad \text{Equation 1}$$

Where ID is the initial dilution, SD are subsequent dilutions, FD is the final dilution, 50 converts to mL and CFU is the colony forming units counted at the dilution used for the calculation.

The CFU/mL was then converted to a log number. The log reduction was calculated by subtracting the log of the recovered CFU from the log of the inoculum. A log reduction greater than 3 is considered bactericidal.

The log reduction data is summarized in TABLE 1. The most active dressings, by an order of magnitude, were those deposited at 40 mTorr followed by 50 mTorr, and 13 mTorr. Working gas pressure in the system effects the antimicrobial activity of the sputtered thin films but in the range between 13 and 50 mTorr all films were at least bactericidal (greater than a 3 log reduction). In these examples the power was reduced as the gas pressure was reduced to maintain an ammonium hydroxide soluble silver content of >35%. As the pressure is reduced the mean free distance between gas atoms increases and, if the sputtered flux is high, the deposited films will be primarily metallic. That is without multiple collisions between the working gas and the sputtered flux the oxidation reaction time in the gas phase is reduced leading to the deposition of metallic films.

TABLE 1 summarizes ammonium hydroxide soluble silver for various sputter power levels.

| Sputter Power (Watts) | Oxygen (%) | Water (uL/min) | Pressure (mTorr) | Log reduction (*P. aerusinosa*) | $NH_4OH$ soluble Ag (%) |
|---|---|---|---|---|---|
| 684 | 4.25 | 6 | 40 | 5.5 | 35 |
| 684 | 4.25 | 6 | 50 | 4.2 | 48 |
| 342 | 4.25 | 6 | 13 | 4.1 | 35 |
| 190 | 4.25 | 6 | 13 | 3.2 | 35 |

Example 16: Demonstration of Various Target—Substrate Distances

This example is included to demonstrate the effect of cathode-substrate distance on an antimicrobial coating formed by DC magnetron sputtering on a commercial high-density polyethylene (HDPE) mesh when the water is injected into the Ar upstream of the MFC via a syringe pump prior to entering the deposition chamber. The mesh was coated by DC magnetron sputtering 99.99% pure silver on the surface using the following conditions. The working gases used were high purity commercial Ar and $O_2$ (95.75/4.25 wt % final concentration) which were added to the vacuum chamber through separate mass flow controllers. The water was injected into the Ar stream at a flow rate of 9 uL/min. The stainless-steel piping was heated to 50° C. between the injection port and the MFC to maintain the water in a gaseous state. The sputtering power was 1.8 Amps, the flow rate for Argon was 383 SCCM and for $O_2$ was 17 SCCM, with a working gas pressure of 40 mTorr. The target to substrate distance was 10 cm. The target was rectangular and measured 12.7 cm×51.4 cm. The target was cooled and maintained at 15° C. using a chiller. The runs were 30 minutes long and the HDPE mesh was stationary.

The antimicrobial effect of the coating was tested using a log reduction test. The bacterial inoculum was generated in calf serum at 37° C. by inoculating 50 mL of calf serum with a 16-hour old culture of *P. aeruginosa* and incubated for 16 h. This produced a $1\times10^9$ CFU inoculum. Dressings were prepared from two silver coated pieces of HDPE (2.5×2.5 cm) with a piece (2.5×2.5 cm) of cotton gauze in between. The dressings were placed on a sterile piece of plastic (3.2×3.2 cm) in the inverted lid of a Petri dish in a Class 2 Laminar Flow hood. 200 uL of inoculum were applied to the dressings in a Petri dish which were then covered with a second piece of plastic (3.2×3.2 cm) and incubated for one hour at 37° C. The dressings, including the plastic base and cover pieces, with the bacteria were then placed in 1.8 mL of sodium thioglycolate saline (STS) to inactivate the silver, then further diluted using peptone water, and plated on Mueller-Hinton agar. Plates are checked after 24 h of incubation and the total bacterial colonies forming units were calculated.

$$1/(ID \times SD \times FD) \times 50 \times CFU = CFU/mL \quad \text{Equation 1}$$

Where ID is the initial dilution, SD are subsequent dilutions, FD is the final dilution, 50 converts to mL and CFU is the colony forming units counted at the dilution used for the calculation.

The CFU/mL was then converted to a log number. The log reduction was calculated by subtracting the log of the recovered CFU from the log of the inoculum. A log reduction greater than 3 is considered bactericidal.

The data is summarized in TABLE 2. As the target substrate-distance is reduced the mean number of collisions between sputtered atoms and argon is reduced leaving the flux energetic. Without multiple collisions between the working gas and the sputtered flux the oxidation reaction time in the gas phase is also reduced leading to the deposition of metallic films. The combination of these two issues resulted in the web being exposed to a temperature greater than its metaling point causing a failure.

TABLE 2 summarizes assay effects in log reduction of *P. aeruginosa* relative to various target to substrate distances.

Example 17: Anti-Inflammatory Effects

This example was included to demonstrate an anti-inflammatory coating formed by DC magnetron sputtering on a commercial high-density polyethylene (HDPE) mesh when the water is injected into the Ar upstream of the MFC via a syringe pump prior to entering the deposition chamber. The mesh was coated by DC magnetron sputtering 99.99% pure silver, 65% Ag/35% Au or 20% Ag/80% Au on the surface using the following conditions. The working gases used were high purity commercial Ar and $O_2$ (95.75/4.25 wt % final concentration) which were added to the vacuum chamber through separate mass flow controllers. The water was injected into the Ar stream at a flow rate of 9 uL/min. The stainless-steel piping was heated to 50° C. between the injection port and the MFC to maintain the water in a gaseous state. The sputtering power was 1.8 Amps, the flow rate for Argon was 383 SCCM and for $O_2$ was 17 SCCM, with a working gas pressure of 40 mTorr. The target to substrate distance was 10 cm. The target was rectangular and measured 12.7 cm×51.4 cm. The target was cooled and maintained at 15° C. using a chiller. The runs were 6 hours long and the HDPE mesh was moving at 0.69 in/min.

The anti-inflammatory effect of the coating was tested using a DNCB (dinitrochlorobenzene) induced inflammatory response in large white pigs. Dressings were prepared from two silver coated pieces of HDPE (8×12 in) with a piece (8×12 in) of polyester gauze in between.

Large white Yorkshire/landrace animals (Female, 10-15 Kg start weight) are selected for this work as their skin is most like humans and they have a similar anti-inflammatory response. Three animals are assigned to each test or control group for a total of 9 different groups. The test was run in triplicate. Briefly, animals are inducted into the trial at day −17 and allowed to acclimate to the test facility. At day −13 the left side of the pigs are shaved. Each treated pig shall have approximately 3 mL of 10% v/v 1,2-dinitrochlorobenzene (DNCB) in 4:1 acetone-olive oil painted over the shaved area of about 25 cm×15 cm, which is caudal to the scapula running over the rib cage and 5 cm off the dorsal median line (representing ~5% of the total body surface area). This procedure was repeated on days −7, and −3. On day −1 all pigs receive fentanyl patches to mitigate discomfort without impacting the inflammation in the skin. Animals in group '0' the control group, receive a saline placebo for treatment. To prevent injuries to animal handling staff and cross contamination to the animal, the DNCB treatment was performed under full anesthesia and treatment sites are covered with Opsite® secured with Elastoplast. After the final application of DNCB the animals were placed under general anesthesia. On day 0, visual observations were made along with digital images. On Days 1, 2, and 3 the pigs were assessed for erythema and edema. Treatments were reapplied. All dressings were further secured with Opsite® to maintain moisture control and secured with Elastoplast.

| Target-Substrate Distance (cm) | Amps | Water flow (uL/min) | Oxygen (%) | Argon (%) | Total Silver (mg/inch²) | $NH_4OH$ Soluble silver (%) | Log Reduction (*P. aeruginosa*) |
|---|---|---|---|---|---|---|---|
| 10 | 1.8 | 9 | 4.25 | 95.75 | 3.460 | 48.2 | 7 |
| 5 | 1.8 | 9 | 4.25 | 95.75 | —* | —* | —* |

—* no data as HDPE web failed 4 minutes into the run.

Each animal was treated with a fentanyl patch for pain management. Assessments and dressing changes were performed on days 1 and 2. On day 3, after assessment, the pigs were euthanized, and a full necropsy was performed. Clinical observations on days 0 to 3, pictures of the rashes were taken. Erythema and edema were graded on a scale of 0 to 4. Control animals included saline no DNCB, saline and DNCB or Acticoat and DNCB treatments.

The results are summarized in FIGS. 7A-B. The materials produced using the new water based sputtering process all reduced erythema much more quickly than the Acticoat dressing did as shown in FIG. 7A. A similar result was noted with edema as shown in FIG. 7B.

Example 18: Treatment of Heroes Virus

This example demonstrates an antimicrobial coating formed by DC magnetron sputtering on a commercial high-density polyethylene (HDPE) mesh when the water was injected into the Ar upstream of the MFC via a syringe pump prior to entering the deposition chamber. The mesh was coated by DC magnetron sputtering 99.99% pure silver, on the surface using the following conditions. The working gases used are high purity commercial Ar and $O_2$ (95.75/4.25 wt % final concentration) which are added to the vacuum chamber through separate mass flow controllers. The water was injected into the Ar stream at a flow rate of 9 uL/min. The stainless-steel piping was heated to 50° C. between the injection port and the MFC to maintain the water in a gaseous state. The sputtering power was 1.8 Amps, the flow rate for Argon was 383 SCCM and for $O_2$ was 17 SCCM, with a working gas pressure of 40 mTorr. The target to substrate distance was 10 cm. The target was rectangular and measured 12.7 cm×51.4 cm. The target was cooled and maintained at 15° C. using a chiller. The runs are 6 hours long and the HDPE mesh was moving at 0.69 in/min.

A solution was made by placing 4 square inches of coated HDPE mesh in 15 mL of water and incubating it for 6 hours at 37° C. The solution was used to treat a Herpes simplex I infection on the lips and nose of a patient. The internal nares are blistered, and the patient's lower lip was burning and tingling which is indicative of a new cold sore. The treatment involved using a cotton Q-tip to paint the lip and internal nares prior to bed. Six hours later the treatment was repeated. Twelve hours later there was no burning or tingling sensation on the lip and the pain associated with touching the internal nares was dramatically reduced. The treatment was used twice more and twenty-four hours later there was no pain on the lips or on the nares. This treatment had controlled this Herpes simplex I outbreak on this patient demonstrating the antiviral activity of the nanosilver derived solution.

Example 19: Treatment of Human Papilloma Virus

This example is included to demonstrate an antimicrobial coating formed by DC magnetron sputtering on a commercial high-density polyethylene (HDPE) mesh when the water was injected into the Ar upstream of the MFC via a syringe pump prior to entering the deposition chamber. The mesh was coated by DC magnetron sputtering 99.99% pure silver, on the surface using the following conditions. The working gases used were high purity commercial Ar and $O_2$ (95.75/4.25 wt % final concentration) which were added to the vacuum chamber through separate mass flow controllers. The water was injected into the Ar stream at a flow rate of 9 uL/min. The stainless-steel piping was heated to 50° C. between the injection port and the MFC to maintain the water in a gaseous state. The sputtering power was 1.8 Amps, the flow rate for Argon was 383 SCCM and for $O_2$ was 17 SCCM, with a working gas pressure of 40 mTorr. The target to substrate distance was 10 cm. The target was rectangular and measured 12.7 cm×51.4 cm. The target was cooled and maintained at 15° C. using a chiller. The runs were 6 hours long and the HDPE mesh was moving at 0.69 in/min.

A patient had a recurring verruca plantar is on the ball of his right foot. The affected area was treated with a dressing made of the silver coated HDPE and cotton gauze. The cotton gauze was moistened with sterile water and placed over the silver coated HDPE on the infected site. It was covered with a transparent film dressing to keep the site moist. The dressing was changed every 3 days for 2 weeks after which the verruca plantar is thickened skin peeled off leaving new healthy tissue. The verruca had not returned after 6 months demonstrating that the dressing had effectively controlled the Human papilloma virus that had caused the infection. The results are summarized in FIGS. 7A-B. The materials produced using the new water based sputtering process all reduced erythema much more quickly than the Acticoat dressing did. A similar result was noted with edema.

Example 20: Composition of Working Gas

The purpose of this example is to present various compositions of working gases of examples described herein. TABLE 3 presents the composition of working gases when the flow rate of the working gas is at 400 SCCM.

TABLE 3

Composition of working gases at a flow rate of 400 SCCM.

| Current Working Gas Component | 1.5 Amps Composition (%) | 1.8 Amps Composition (%) |
|---|---|---|
| Argon | 93.2 | 92.95 |
| Oxygen | 4 | 4.25 |
| Water | 2.8 | 2.8 |
| Total | 100 | 100 |

The range of water used in the examples described herein ranged between about 2.8% up to 11.2% with oxygen levels ranging from 1 to 4.5%, where the working gas flow rate was 400 SCCM. As oxygen increased, the ammonia soluble content increased synergistically. Beyond 3% of water, a higher temperature was needed to keep the water in gas form. However, the mass flow controllers used in these experiments do not tolerate temperatures above 50 C. An alternative to high temperature needed to produce water vapor is direct injecting steam into the deposition chamber.

Example 21: Calculation of Sputter Power Density

The purpose of this example is to demonstration a calculation for sputter power density at various levels. The power of the sputter system used in the examples described herein is controlled by varying the current. Currents for examples as described varied from 0.1 to 2.5 Amps (A). The voltage of the system is about 380 volts (V). The active area of the sputter target, or etch track ring area, was measured to be 284.39 $cm^2$. Power in watts (W) was calculated by multiplying voltage (V) by current (A). Power density (W/$cm^2$)

was calculated by dividing power (W) by the active area of the target. Various power densities were calculated as shown in TABLE 4.

TABLE 4

Power densities.

| Amps (A) | Voltage (V) | Power (W) | Target Active Area (cm$^2$) | Power Density (W/cm$^2$) |
|---|---|---|---|---|
| 0.1 | 380 | 38 | 284.39 | 0.1 |
| 0.5 | 380 | 190 | 284.39 | 0.7 |
| 0.9 | 380 | 342 | 284.39 | 1.2 |
| 1.0 | 380 | 380 | 284.39 | 1.3 |
| 1.5 | 380 | 570 | 284.39 | 2.0 |
| 1.8 | 380 | 684 | 284.39 | 2.4 |
| 2.0 | 380 | 760 | 284.39 | 2.7 |
| 2.5 | 380 | 950 | 284.39 | 3.3 |

Example 22

This example demonstrates that a silver-based metal matrix composite material, produced by methods described herein, when exposed to a $CO_2$ containing environment, comprises crystalline silver carbonate $Ag_2CO_3(s)$. This is confirmed by X-ray diffraction comparison to other nanocrystalline materials. As an example, a commercially available nanocrystalline material, Acticoat, was characterized by x-ray diffraction as shown in FIG. 8A. The material did not display a spectral peak indicative of silver carbonate. However, a silver-based metal matrix composite material produced by methods as described herein did display an x-ray diffraction spectral peak, confirming silver carbonate as seen in FIG. 8BC. FIG. 8A shows x-ray diffraction spectra of a sample that was exposed to atmosphere, where $CO_2$ is present at 400 ppm, after the depositing and before X-ray diffraction for a period of no longer than tens of minutes. For this sample, water was injected upstream of the mass flow controller at 50° C., power was set at 1.8 A at 380 V. and the water flow rate was 20 uL water/min. Target active area, or etch track area, was measured to be 284.39 cm$^2$. The sample was determined to have 70% ammonia soluble. A prominent x-ray diffraction spectral peak, confirming sliver carbonate is observed at 32.8 degrees as shown in FIG. 8B. A second sample, was synthesized in a process as described herein utilizing a microvalve upstream of the mass flow controller to inject water at 33 uLwater/min, oxygen gas was present at 2% of the total working gas composition and sputtering power was set at 1.5 A at 380 V. Target active area, or etch track area, was measured to be 284.39 cm$^2$. FIG. 8C shows two peaks, one at 32.2 confirming silver oxide and one peak at 32.8 confirming silver carbonate. The presence of silver carbonate in the material prepared by methods described herein, upon exposure to a $CO_2$ environment, as compared to the commercially available silver nanocrystalline material infers a difference in structure.

The invention claimed is:

1. A metal matrix composite material, comprising intergrain atoms of a metal, a metal oxide and crystal grains of the metal, wherein the crystal grains have a median size between about 2 nm and about 15 nm, wherein the intergrain atoms comprise about 50 to about 20 percent per unit surface area of the metal matrix composite material.

2. The metal matrix composite material of claim 1, comprising intergrain atoms of a metal, a metal oxide, oxygen, water and crystal grains of the metal, wherein the crystal grains have a median size between about 2 nm and about 15 nm, wherein the intergrain atoms comprise about 50 to about 20 percent per unit surface area of the metal matrix composite material, and wherein the oxygen comprises at least 2 percent by weight of the metal matrix composite material.

3. The metal matrix composite material of claim 1, comprising intergrain atoms of a metal, a metal oxide, oxygen, water and crystal grains of the metal, wherein the crystal grains have a median size between about 2 nm and about 15 nm, wherein the intergrain atoms comprise about 50 to about 20 percent per unit surface area of the metal matrix composite material, and wherein the water comprises less than 4 percent by weight of the metal matrix composite material.

4. The metal matrix composite material of claim 1, wherein the median size of the crystal grains is between about 2 nm and about 15 nm and intergrain atoms of the metal comprise between about 50 percent per unit surface area of the metal matrix composite material to about 20 percent per unit surface area of the metal matrix composite material.

5. The metal matrix composite material of claim 1, wherein the median size of the crystal grains is between about 5 nm and about 15 nm and intergrain atoms of the metal comprise between about 40 percent per unit surface area of the metal matrix composite material to about 20 percent per unit surface area of the metal matrix composite material.

6. The metal matrix composite material of claim 1, comprising intergrain atoms of a second metal and crystal grains of the second metal having a median size between about 2 nm and about 15 nm, wherein the intergrain atoms of the second metal comprise about 50 to about 20 percent per unit surface area of the metal matrix composite material.

7. The metal matrix composite material of claim 1, comprising $Ag_2CO_3$.

8. The metal matrix composite material of claim 1, further comprising a second metal.

9. The metal matrix composite material of claim 1, wherein the metal is a noble metal.

10. The metal matrix composite material of claim 9, wherein the noble metal comprises silver, gold, platinum, palladium, or any combination thereof.

11. The metal matrix composite material of claim 8, wherein the metal is silver and the second metal is gold.

12. The metal matrix composite material of claim 1, further comprising an alloy comprising silver and gold.

13. The metal matrix composite material of claim 11, wherein the silver comprises about 65 percent by weight of the metal matrix composite material and the gold comprises about 35 percent by weight of the metal matrix composite material.

14. The metal matrix composite material of claim 11, wherein the silver comprises about 35 percent by weight of the metal matrix composite material and the gold comprises about 65 percent by weight of the metal matrix composite material.

15. The metal matrix composite material of claim 1, further comprising a metal hydroxide.

16. The metal matrix composite material of claim 15, wherein the metal comprises silver, the metal oxide comprises silver oxide and the metal hydroxide comprises silver hydroxide.

17. The metal matrix composite material of claim 1, further comprising a film, the film comprising the metal, reaction products, unreacted oxygen, water or any combination thereof.

18. The metal matrix composite material of claim 17, wherein the reaction products are oxides of the metal.

19. The metal matrix composite material of claim 1, further comprising oxygen in an amount less than about 20 percent by weight of the metal matrix composite material.

20. The metal matrix composite material of claim 1, further comprising oxygen in an amount greater than about 1 percent by weight of the metal matrix composite material.

21. The metal matrix composite material of claim 1, further comprising oxygen in an amount greater than about 6 percent by weight of the metal matrix composite material.

22. The metal matrix composite material of claim 1, further comprising oxygen in an amount no greater than about 2 percent by weight of the metal matrix composite material.

23. The metal matrix composite material of claim 21, wherein the metal comprises silver.

24. The metal matrix composite material of claim 1, further comprising oxygen in an amount about 6 percent by weight of the metal matrix composite material, wherein oxygen in an amount about 4 percent by weight is contained in silver oxide and the remaining oxygen contained in water and molecular oxygen.

25. The metal matrix composite material of claim 1, further comprising oxygen in an amount between about 2 percent to about 6 percent by weight of the metal matrix composite material, wherein the oxygen is contained in silver oxide, water, molecular oxygen or any combination thereof.

26. The metal matrix composite material of claim 1, further comprising oxygen in an amount between about 4 percent to about 6 percent by weight of the metal matrix composite material, wherein the oxygen is contained in silver oxide, water, molecular oxygen or any combination thereof.

27. A dressing configured for applications at least involving wound care, comprising the metal matrix composite material of claim 1.

28. The dressing of claim 27, comprising a mesh structure made from high density polyethylene.

* * * * *